United States Patent [19]
Hamada et al.

[11] Patent Number: 6,072,956
[45] Date of Patent: Jun. 6, 2000

[54] FOCUS DETECTOR

[75] Inventors: Masataka Hamada, Osakasayama; Akio Kinba, Suita; Hideo Kajita, Osaka, all of Japan

[73] Assignee: Minolta Co., Ltd., Osaka, Japan

[21] Appl. No.: 09/327,492

[22] Filed: Jun. 8, 1999

Related U.S. Application Data

[62] Division of application No. 09/144,969, Sep. 1, 1998, abandoned.

[30] Foreign Application Priority Data

| Feb. 9, 1997 | [JP] | Japan | 9-237525 |
| Mar. 30, 1998 | [JP] | Japan | 10-84563 |
| Mar. 30, 1998 | [JP] | Japan | 10-84564 |
| Mar. 30, 1998 | [JP] | Japan | 10-84565 |
| Mar. 30, 1998 | [JP] | Japan | 10-84566 |

[51] Int. Cl.$^7$ .................................................. G03B 13/36
[52] U.S. Cl. ........................................... 396/104; 396/123
[58] Field of Search ............................... 396/92, 91, 104, 396/121, 122, 123, 124

[56] References Cited

U.S. PATENT DOCUMENTS 5,576,797 11/1996 Kusaka et al. ............................ 396/121
5,659,812 8/1997 Uchiyama ............................ 396/104

FOREIGN PATENT DOCUMENTS 55-118019  9/1980  Japan.

*Primary Examiner*—W. B. Perkey
*Attorney, Agent, or Firm*—Burns, Doane, Swecker & Mathis, LLP

[57] ABSTRACT

A focus detector used in an AF-SLR camera has a plurality of focusing sensors disposed not only in the center but also in a region distant from the center of the frame. A first focusing sensor group of the focusing sensors which are disposed in a first region where light flux passing through a pupil of a lens having an F-number larger than a predetermined F-number such as F2.8 is always used without reference to the F-number of the lens. A second focusing sensor group of focusing sensors which are disposed in a second region where light flux passing through a pupil of a lens having an F-number equal to or smaller than the predetermined F-number and having a higher accuracy for focus detection is used only when the F-number of the lens is equal to or smaller than the predetermined F-number.

14 Claims, 43 Drawing Sheets

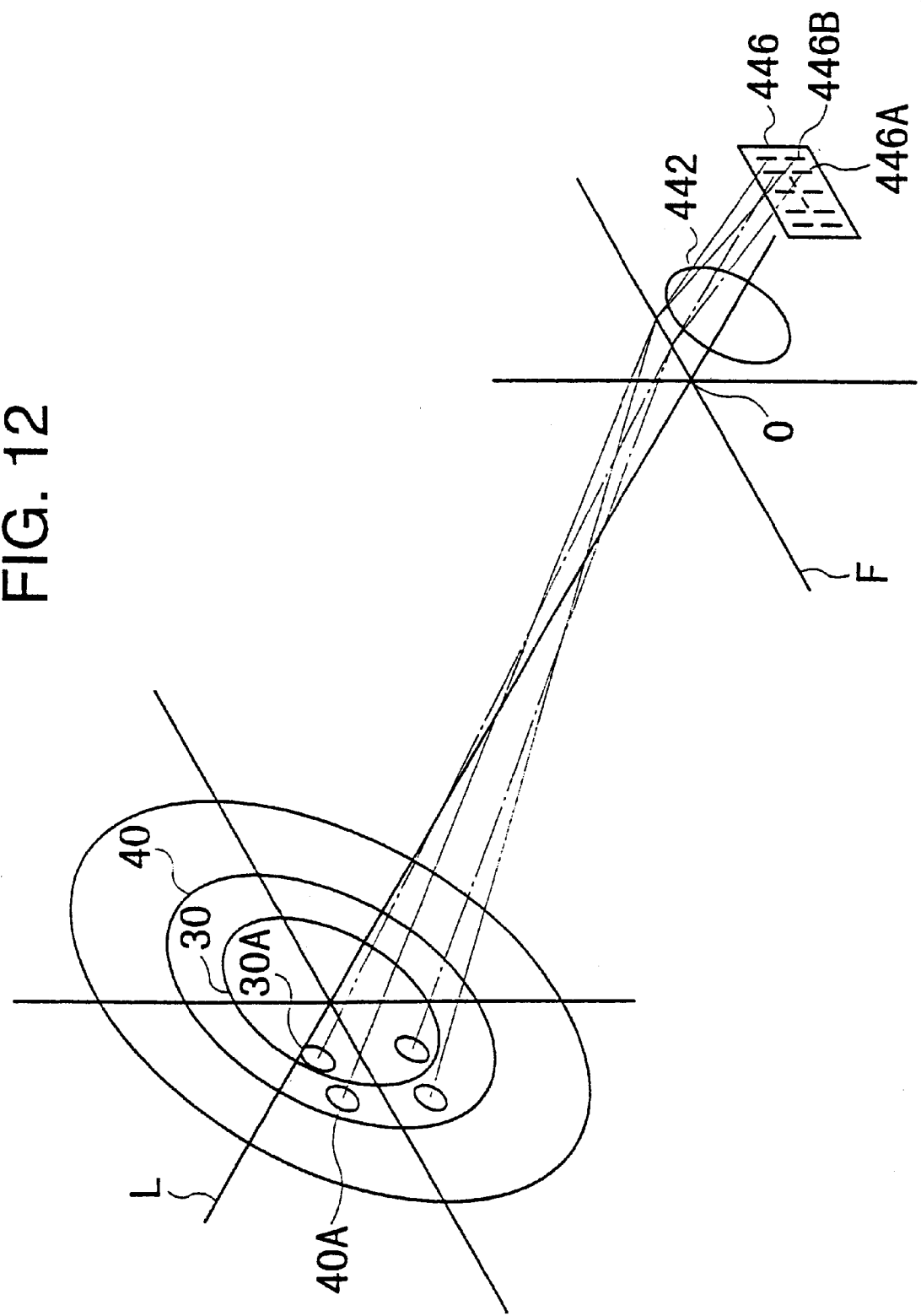

FOCUS DETECTOR

This application is a divisional of Application Ser. No. 09/144,969, filed Sep. 1, 1998, now abandoned.

This application is based on patent applications No.9-237525, No.10-084563, No.10-084564, No.10-084565 and No.10-084566 filed in Japan, the contents of which are hereby incorporated by references.

BACKGROUND OF THE INVENTION

1. Field of the Invention

This invention relates to a focus detector used in an optical equipment using an optical lens system such as an automatic focusing type single lens reflex camera (hereinafter abbreviated as AF-SLR camera).

2. Description of the Prior Art

A conventional focus detector for detecting a focus of an optical lens system is described with reference to FIGS. 50 and 51.

As can be seen from FIG. 50, the focus detector 20 is disposed behind an equivalent focal plane 11 of an optical lens system 10. The focus detector 20 comprises a condenser lens 21, an aperture mask 22, a pair of reforming lenses 23, a pair of photoelectric transfer device arrays 24 such as CCD (Charge Coupled Device) and an operation circuit 25 for calculating a quantity of defocus and for detecting a direction of movement of the optical lens system 10. The quantity of defocus is defined as a distance between an actual focus of the optical lens system 10 and the equivalent focal plane 11.

The quantity of defocus and the direction of the movement of the optical lens system are obtained from a relation of positions of two images focused on the photoelectric transfer device arrays 24. When the focus of the optical lens system 10 is coincides with an object, that is an image of the object is focused on the equivalent focal plane 11, a distance between the images respectively focused on the photoelectric transfer device arrays 24 becomes a constant value L0. When the image of the object is focused behind the equivalent focal plane 11, the distance between the images on the photoelectric transfer device arrays 24 is shorter than the constant value L0. Alternatively, when the image of the object is focused before the equivalent focal plane 11, the distance between the images on the photoelectric transfer device arrays 24 is longer than the constant distance L0. Thus, it is possible to know whether the image of the object is focused on the focal plane or not from the distance between the ima es focused on the photoelectric transfer device arrays 24. Furthermore, when the image of the object is not focused on the focal plane, the quantity of defocus which is a displacement for moving the optical lens system 10 and the direction of the movement of the optical lens system 10 can be obtained from the value of the distance.

In an AF-SLR camera system, many kinds of interchangeable lenses (which are finished goods including an optical lens system, an aperture mechanism and a lens moving mechanism) can be mounted on a camera body. In FIG. 51, solid lines designate optical paths of an optical lens system 10a having a relatively smaller open aperture F-number such as F2.3 or F4. Alternatively, dotted chain lines designate optical paths of an optical lens system 10b having a relatively larger open aperture F-number such as F5.6 or F6.7. As can be seen from FIG. 51, a diameter of a pupil of the optical lens system 10b having the larger open aperture F-number is smaller than that of the optical lens system 10a having the smaller open aperture F-number.

In order to automatically control the focus of the optical lens system of the AF-type interchangeable lens which can be mounted on the AF-SLR camera body, a pair of openings 22a of the aperture mask 22 are positioned near the optical axis corresponding to the diameter of the pupil of the optical lens system having the largest open aperture F-number (for example F6.7) in a group of interchangeable lenses. Thus, even when an AF-type interchangeable lens having the smaller open aperture F-number such as F2.8 or F4 is mounted on the camera body, focus detection is executed by using light flux which passes near the optical axis of the optical lens system. Light flux passing farther from the optical axis is wasted.

In a recent AF-SLR camera, a plurality of focusing areas are disposed in a frame for focusing objects positioned not only in the center portion of the frame but also in regions distant from the center of the frame. An arrangement of the focusing areas is shown in FIG. 52. In FIG. 52, a rectangular frame 25 designates a frame on the focal plane of a camera body or a frame of the focusing screen of a viewfinder. A first circular region 30 having a smaller diameter designates a region where light flux emitted from an object and passing through a pupil of an optical lens system having a larger F-number can reach. A second circular region 40 having a larger diameter designates a region where light flux emitted from an object and passing through a pupil of an optical lens system having a smaller F-number can reach.

Generally, when the position of the image focused on the photoelectric transfer device array 24 is distant from the optical axis, the movement of the image responding to the movement of the focus of the optical lens system 10 becomes larger. Thus, it is preferable that the light flux passing through the region positioned far from the optical axis is used to increase the accuracy of the focus detection. In addition, as the open aperture F-number of the optical lens system 10 becomes smaller, the the blur of the image due to the defocus becomes more significant. Thus, it is necessary to detect the focus of the optical lens system 10 accurately when the open aperture F-number of the optical lens system 10 is small.

SUMMARY OF THE INVENTION

A purpose of this invention is to provide a focal position detector which can accurately detect the focus of the optical lens system responding to the open aperture F-number of the optical lens system.

A focus detector of this invention detects a focus of an optical lens system using light flux passing through a pupil of the optical lens system. The focus detector comprises a first focusing sensor group including at least one focusing sensor disposed in a first region where light flux passing through the pupil of the optical lens system having a first predetermined F-number can reach, and a second focusing sensor group including at least one focusing sensor disposed in a second region where light flux passing through the pupil of the optical lens system having a second predetermined F-number smaller than the first predetermined F-number can reach. The focus detector further comprises an F-number reader for reading out an F-number of the optical lens system and a controller for selecting at least one focusing sensor group from the first focusing sensor group and the second focusing sensor group which is to be used for detecting a focus of the optical lens system corresponding to the F-number of the optical lens system and for detecting the focus of the optical lens system by using the selected focusing sensor group. Thereby, when the F-number of the optical lens system is larger or smaller than a predetermined value, first or second sensor arrays corresponding to the F-number are selected accordingly.

BRIEF DESCRIPTION OF THE DRAWINGS

FIG. 12 is a perspective view showing a condition that the light flux passing through the pupil of the optical lens system reach to the sensor in the sixth modification;

DETAILED DESCRIPTION OF THE PREFERRED EMBODIMENTS OF THE INVENTION

Figure 1:
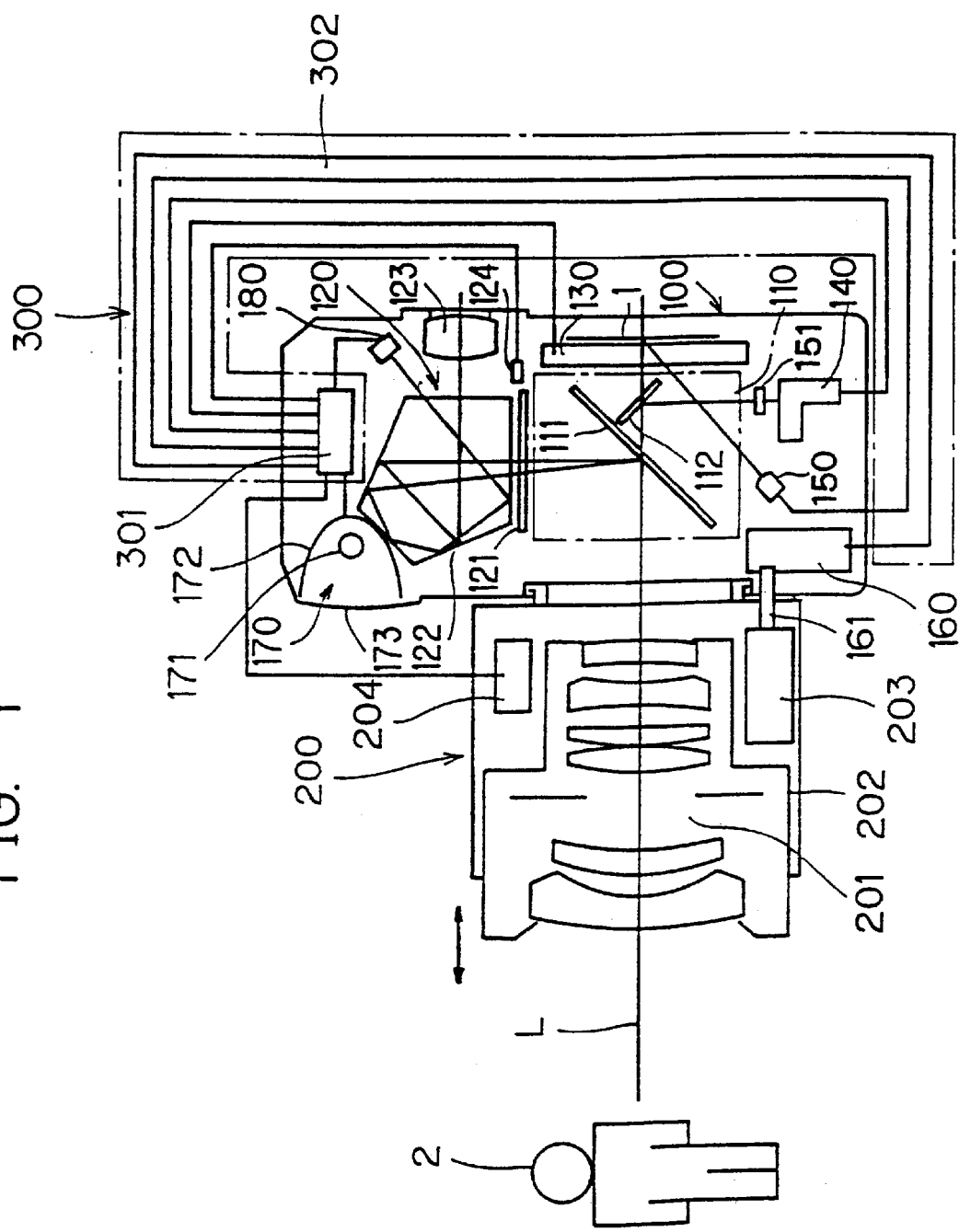
FIG. 1 is a block diagram of an AF-SLR camera which uses a focus detector of an embodiment of this invention.

An embodiment of a focus detector of this invention is described. A block diagram of an AF-SLR camera which uses the focus detector of the embodiment of this invention is shown in FIG. 1. A mirror unit 110 is provided in the center portion of a camera body 100. The mirror unit 110 comprises a main mirror 111 crossing an optical axis L at angle of 45 degrees and a supplemental mirror 112 provided on and perpendicular to a rear face of the main mirror 111. A viewfinder 120 is provided above the mirror unit 110. The viewfinder 120 comprises a focusing glass 121, a pentagonal prism 122, an eyepiece 123 and a display device 124. A flash unit 170 for lightening a flash light is provided above the viewfinder 120.

A focus detector 140, a first light sensor 150, an AF driving unit 160 and a relay lens 151 are provided below the mirror unit 110. A shutter unit 130 is provided between the mirror unit 110 and the focal plane (or film plane) 1. A flexible printed circuit substrate 300 including an AF-CPU 301 and wiring 302 is provided in an inner space of the camera body 100. The relay lens 151 is not necessarily used as described below.

An interchangeable lens 200 comprises an optical lens system 201, a lens barrel 202 for holding the optical lens system 201, a lens driving mechanism 203 for moving the lens barrel 202 with the optical lens system 201 in a direction parallel to the optical axis L and a lens CPU 204 memorizing a focal length, an open aperture F-number, an F-number for automatic focusing and minimum aperture F-number of the optical lens system 201 and transferring the data of the interchangeable lens 200 to the AF-CPU 301.

The F-number for automatic focusing is a concept used in the automatic focusing control of the optical lens system 201, which does not necessarily coincide with the open aperture F-number. For example, the F-number for automatic focusing of a macro lens 50 mm/F2.8 for closing-up is F5.6. In this invention, the term "F-number" includes both meanings of the open aperture F-number and the F-number for automatic focusing.

The main mirror 111 reflects most of the light flux passing through the optical lens system 201 to the focusing glass 121 and transmits the remainder. The supplemental mirror 112 reflects the light flux transmitting the main mirror 111 to the focus detector 140. The pentagonal prism 122 turns the right and left of the image on the focusing glass 121 reversely and reflects the image to the eyepiece 123.

A second light sensor 180 is provided in the vicinity of an exit surface of the pentagonal prism 122. The second light sensor 180 includes condenser lenses and photoelectric transfer devices such as photodiode and outputs a signal corresponding to a luminance of an object 2 to the AF-CPU 301. The display device 124 includes light emitting devices such as LED and liquid crystal display device and displays information regarding the condition of focusing (whether the focus of the optical lens system 201 coincides with the object 2 or not) and values of shutter speed and aperture (F-number).

The flash unit 170 includes a charging circuit (not shown in the figure) for charging electrical energy in a capacitor, a luminescent tube such as xenon tube 171 for transforming the electrical energy into light, a reflector 172 for reflecting the flash light from the luminescent tube 171 forward of, and a Fresnel lens 173 for diverging or condensing the flash light. The first light sensor 150 includes a condenser lens and a photoelectric transfer device such as photodiode. The first light sensor 150 detects an amount of light reflected from the film surface 1 during the flash lighting by the flash unit 170 and outputs a signal corresponding to the amount of the light. The AF-CPU 301 stops the flash lighting of the flash unit 170 when the amount of the light reaches to a predetermined value based on the signal from the first light sensor 150.

The AF driving unit 160 includes an actuator such as a DC motor, a stepping motor or an ultrasonic motor, an encoder for detecting direction and rotation speed of the actuator and outputting signals corresponding to them and a reduction gear train for reducing the rotation of the actuator. The AF drive unit 160 is engaged with the lens driving mechanism 203 via an output shaft 161. The lens driving mechanism 203 includes a helicoid and a gear train for rotating the helicoid and moves the integration of the optical lens system 201 and the lens barrel 202 in a direction parallel to the optical axis L by the driving force of the actuator of the AF driving unit 160. The direction and displacement of the optical lens system 201 and the lens barrel 202 are controlled by the rotation direction and the rotation number of the actuator.

Figure 2:
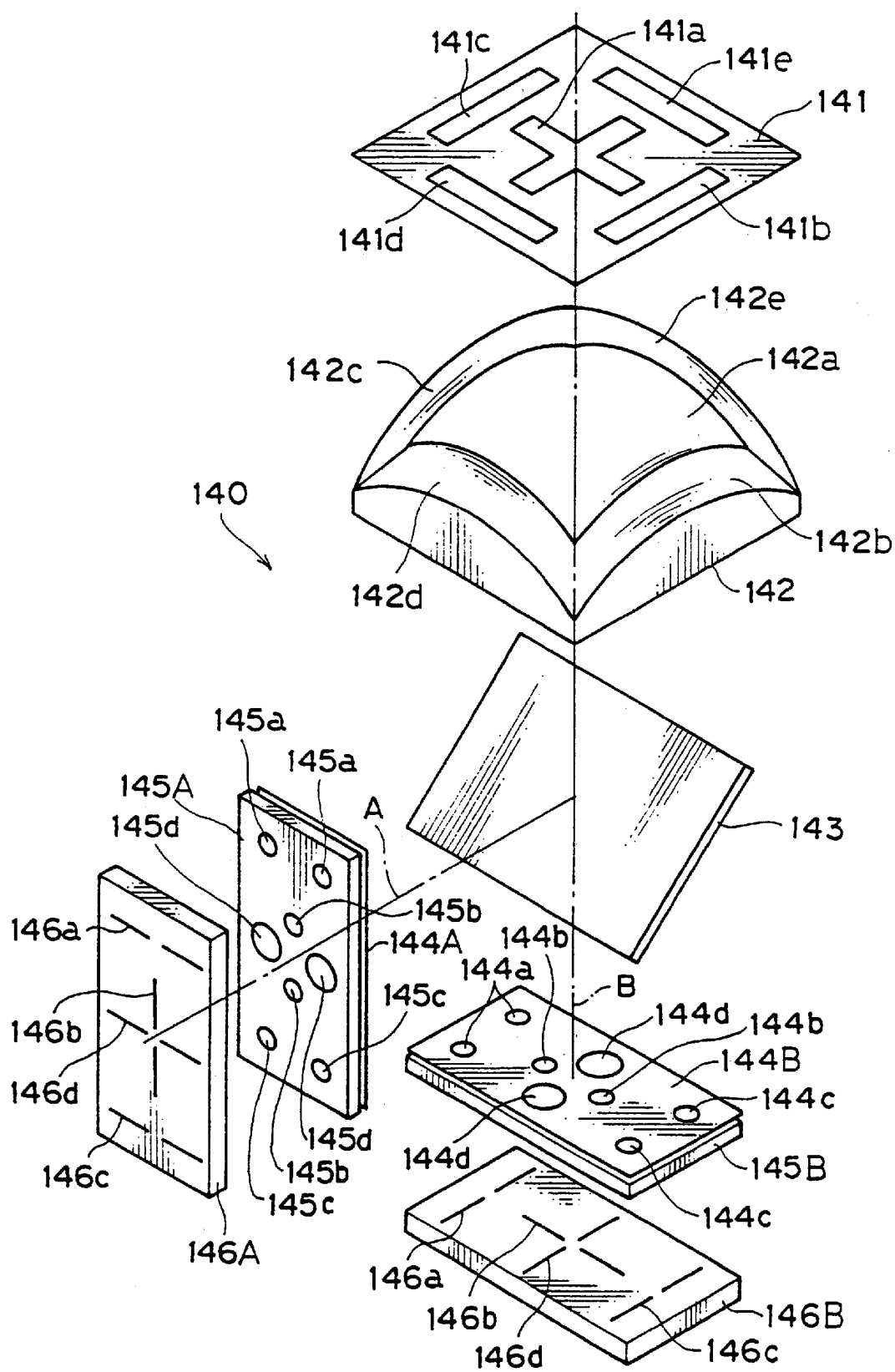
FIG. 2 is a perspective view showing a configuration of a first modification of the focus detector of the embodiment of this invention.

A first modification of the focus detector 140 is shown in FIG. 2. In the first modification, the light flux passing through the pupil of the optical lens system 201 is split into two ways by a beam splitter 143. A field mask 141 is disposed in the vicinity of a position which is equivalent to the focal plane 1 with respect to the optical path from the optical lens system 201. The field mask 141 restricts the light flux which passes through the optical lens system 201 and enters the focal position detector 140. The field mask 141 has five openings 141a to 141e corresponding to arrays of photoelectric transfer devices (hereinafter called islands) of first and second sensor units described below.

A condenser lens 142 is disposed behind the field mask 141. The condenser lens 142 has five regions 142a to 142e corresponding to the openings 141a to 141e of the field mask 141. The beam splitter 143 is disposed behind the condenser lens 142. The beam splitter 143 splits the light flux passing through the field mask 141 and the condenser lens 142 into a first light flux moving in a first direction A and a second light flux moving in a second direction B. The first direction A crosses the second direction B at right angle.

In the first direction A, the first sensor unit configured by a first aperture mask 144A, a first reforming lens array 145A and a first sensor chip 146A is provided. In the second direction B, the second sensor unit configured by a second aperture mask 144B, a second reforming lens array 145B and a second sensor chip 146B is provided. In this first modification, the first aperture mask 144A and the second aperture mask 144B, the first reforming lens array 145A and the second reforming lens array 145B and the first sensor chip 146A and the second sensor chip 146B are respectively the same.

The first sensor chip 146A and the second sensor chip 146B respectively have an oblong rectangular shape. Each of the first and second sensor chips 146A and 146B has first to fourth islands 146a to 146d. Each island 146a to 146d is formed by a pair of photoelectric transfer devices arrays, one array serves as a reference portion and the other serves as a standard portion. The first island 146a and third island 146c are respectively formed in the vicinity of the shorter side edges. The second island 146b and the fourth island 146d which cross at right angle are disposed in the center portion of the sensor chips. Furthermore, the first sensor unit and the second sensor unit are relatively rotated by 90 degrees around the optical axis in a manner so that the second island 146b of the first sensor chip 146A crosses the second island 146b of the second sensor chip 146B at right angle.

The fourth islands 146d of the first and second sensor chips 146A and 146B forming a second cross focusing sensor included in a second focusing sensor group are used when the open aperture F-number of the optical lens system 201 is equal to or smaller than a first predetermined F-number such as F2.8. The first to third islands 146*a* to 146*c* forming a first cross focusing sensor and two line sensors included in a first focusing sensor group are used when the open aperture F-number of the optical lens system 201 is larger than the first predetermined value and equal to or smaller than a second predetermined F-number such as F5.6.

The first reforming lens array 145A and the second reforming lens array 145B respectively have an oblong rectangular shape corresponding to the first and second sensors 146A and 146B. A pair of reforming lenses 145*d* which have relatively larger diameter are formed at positions corresponding to a reference portion and a standard portion of the fourth island 146*d* on each of the first and second reforming lens arrays 145A and 145B. Three sets of reforming lens arrays 145*a* to 145*c* which have relatively smaller diameter are formed at positions corresponding to reference portions and standard portions of the first to third islands 146*a* to 146*c*. Incident surfaces of the first and second sensors 146A and 146B are respectively positioned at a focal plane of the reforming lenses 145*a* to 145*d*. The reforming lenses 145*a* to 145*d* of the first and second reforming lens arrays 145A and 145B separate the incident light flux and focus on the first to fourth islands 146*a* to 146*d* of the first and second sensor chips 146A and 146B.

The first aperture mask 144A and the second aperture mask 144B respectively have circular, elliptical or pill-shaped openings 144*a* to 144*d* which face the reforming lenses 145*a* to 145*d* of the first and second reforming lens arrays 145A and 145B. The openings 144*a* to 144*d* respectively restrict the incident light flux entering into the reforming lenses 145*a* to 145*d*.

The center opening 141*a* of the field mask 141 has a cross shape corresponding to two cross focusing sensors formed by the second islands 146*b* and the fourth islands 146*d* of the first and second sensor chips 146A and 146B. The other openings 141*b* to 141*e* respectively have an oblong rectangular shape corresponding to the first and third islands 146*a* and 146*c* of the first and second sensor chips 146A and 146B.

In the first modification, when the F-number of the optical lens system 201 is equal to or smaller than F2.8, the second cross focusing sensor formed by the fourth islands 146*d* of the first and second sensor chips 146A and 146B is used for the focus detection. On the other hand, when the F-number of the optical lens system 201 is larger than F2.8, a first cross focusing sensor formed by the second islands 146*b* of the first and second sensor chips 146A and 146B and two line sensors corresponding to the first and third islands 146*a* and 146*c* of the first and second sensor chips 146A and 146B are used for the focus detection.

A diameter of the reforming lenses 145*d* of the first and second reforming lens arrays 145A and 145B is formed larger than a diameter of other reforming lenses 145*a* to 145*c* corresponding to the above-mentioned first and second predetermined F-numbers. When the F-number of the optical lens system 201 is equal to or smaller than the second predetermined F-number such as F2.8, the light flux passing through the region of the pupil of the optical lens system 201 which is positioned further distant from the optical axis L can effectively be used in the focus detection. In other words, a base length of the second focusing sensors included in the second focusing sensor group is longer than that of the first focusing sensors included in the first focusing sensor group. Thus, the focus condition of the optical lens system 201 is accurately detected responding to the F-number of the optical lens system 201.

Figure 3:
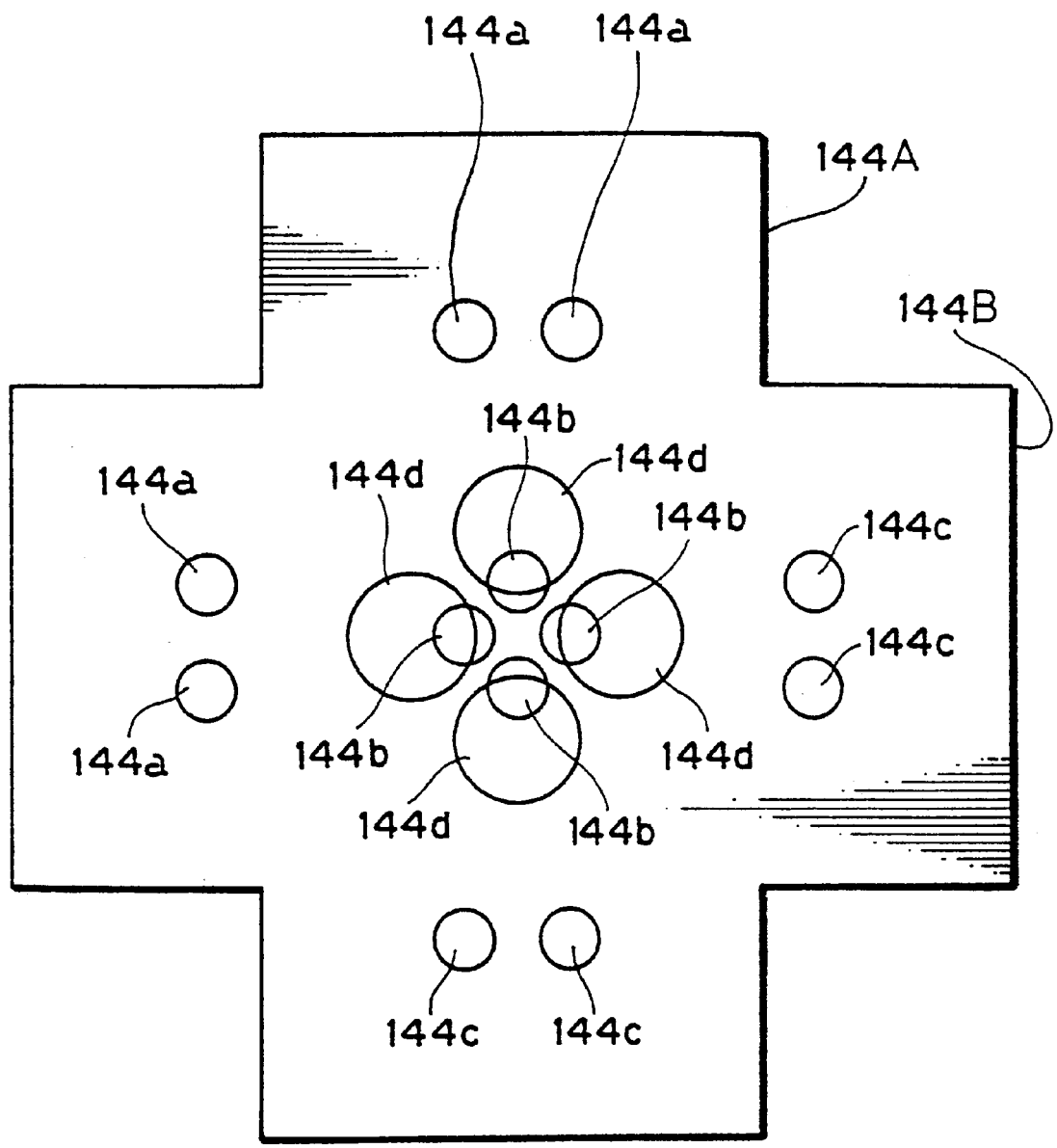
FIG. 3 is a plan view showing a development of pupils of the first modification.

A development of pupils of the first modification is shown in FIG. 3. FIG. 3 shows, for example, a superimposition of the first aperture mask 144A and the second aperture mask 144B. Circles 144*d* having relatively larger diameter designate the areas used in the focus detection when the F-number of the optical lens system 201 is equal to or smaller than the second predetermined F-number such as F2.8. Circles 144*a* to 144*c* having relatively smaller diameter designate the areas used in the focus detection when the F-number of the optical lens system 201 is larger than the second predetermined F-number and equal to or smaller than the first predetermined F-number such as F5.6.

Figure 4:
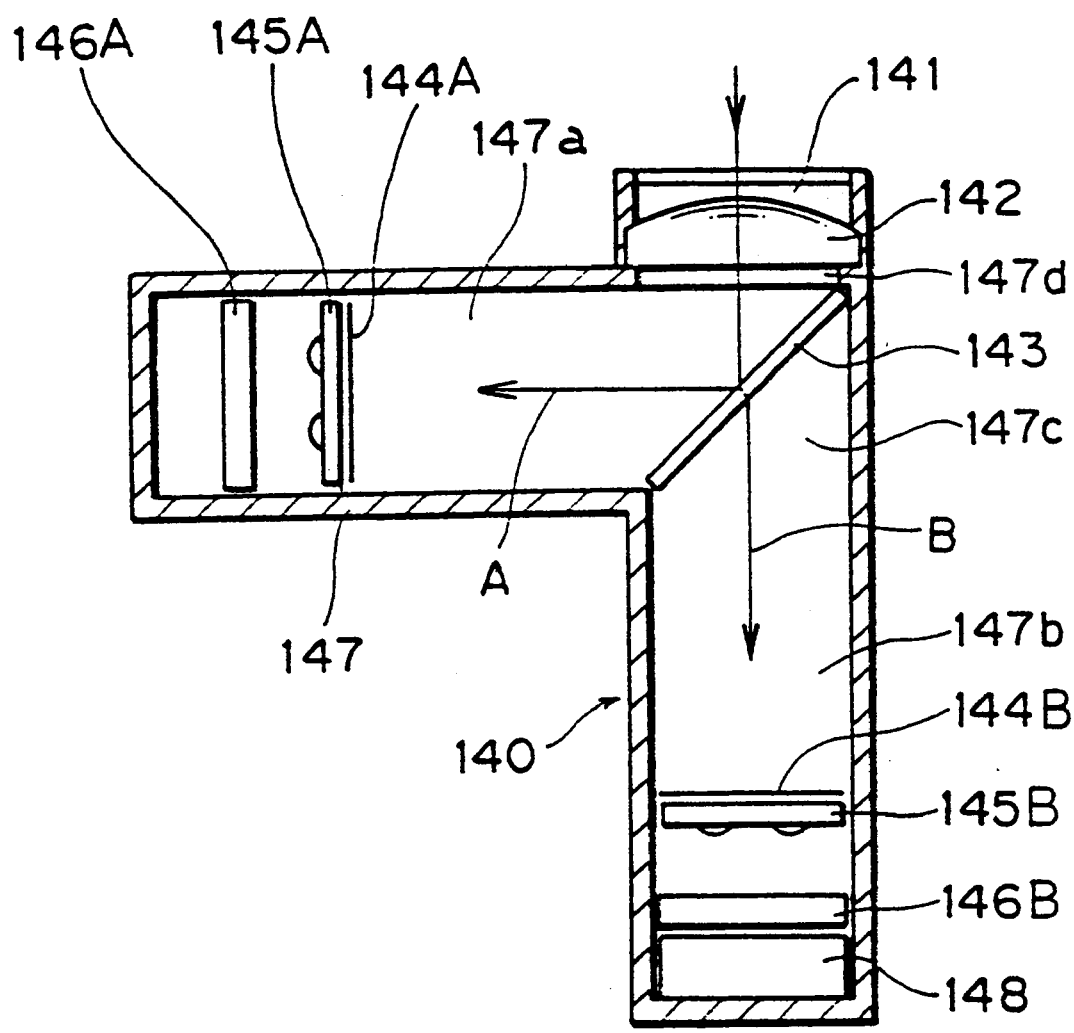
FIG. 4 is a cross sectional view showing a shape of the focus detector 140 of the first modification.

A cross sectional shape of the focus detector 140 of the first modification is shown in FIG. 4. A housing 147 has a substantially rectangular section in a direction perpendicular to the paper sheet. The housing 147 further has a substantially L shaped cross section in a direction parallel to the paper sheet. A first arm portion 147*a* of the housing crosses a second arm portion 147*b* at right angle. An opening 147*d* is formed on a side wall of a corner portion 147*c* where the first arm portion 147*a* and the second arm portion 147*b* cross. The field mask 141 and the condenser lens 142 are provided so as to face the opening 147*d*. A beam splitter 143 such as semi-transparent mirror is disposed in the corner portion 147*c* in a manner to cross an optical axis of the condenser lens 142 at angle of 45 degrees. The beam splitter 143 splits the incident light flux passing through the field mask 141 and the condenser lens 142 into first light flux moving in the direction A in the inside of the first arm portion 147*a* and second light flux moving in a direction B in the inside of the second arm portion 147*b*. The first sensor unit configured by the first aperture mask 144A, the first reforming lens array 145A and the first sensor chip 146A is provided in the inside of the first arm portion 147*a*. The second sensor unit configured by the second aperture mask 144B, the second reforming lens array 145B and the second sensor chip 146B is provided in the inside of the second arm portion 147*b*. Furthermore, an operation circuit 148 comprising a CPU and a memory is provided, for example, in the inside of the second arm portion 147*b*. The position of the operation circuit 148 is not restricted at this position.

When the F-number of the optical lens system 201 is equal to or smaller than the second predetermined F-number (F2.8), the operation circuit 148 executes the focus detection by using the second cross focusing sensor formed by the fourth islands 146*d* of the first and second sensor chips 146A and 146B. The operation circuit 148 calculates (or operates) the quantity of defocus and detects the direction of defocus by using the signals corresponding to the positions of the images on the reference portion and the standard portion of each island 146*d*. The photoelectric transfer device arrays of the islands 146*d*, the reforming lenses 145*d* and the openings 144*d* corresponding to the photoelectric transfer device arrays form second focusing sensors included in the second focusing sensor group.

On the other hand, when the F-number of the optical lens system 201 is larger than the second predetermined F-number (F2.8) and equal to or smaller than the first predetermined F-number (F5.6), the operation circuit 148 executes the focus detection by using not only the cross focusing sensor formed by the second islands 146*b* of the first and second sensor chips 146A and 146B but also the line focusing sensors of the first and third islands 146*a* and 146c of the first and second sensor chips 146A and 146B. The operation circuit 148 calculates the quantity of defocus and detects the direction of defocus by using the signals corresponding to the positions of the images on the reference portion and the standard portion of each island 146a to 146c. The photoelectric transfer device arrays of the islands 146a to 146c, the reforming lenses 145a to 145c and the openings 144a to 144c corresponding to the photoelectric transfer device arrays form first focusing sensors included in the first focusing sensor group.

In the focus detection using at least two focusing sensors (or islands), the quantity of defocus is calculated with respect to each focusing sensor. The quantity of defocus which is to be used for controlling the movement of the optical lens system 201 is decided from a plurality of quantities of defocus. An example of the decision of the final quantity of defocus is described.

When the F-number of the optical lens system 201 is equal to or smaller than the second predetermined F-number (F2.8), the operation circuit 148 calculates two quantities of defocus with respect to the second focusing sensors formed by the fourth islands 146d of the first and second sensor chips 146A and 146B. The operation circuit 148 compares the calculated two quantities of defocus and outputs the one showing the position nearer to the camera as the final quantity of defocus. When the F-number of the optical lens system 201 is larger than the second predetermined F-number (F2.8) and equal to or smaller than the first predetermined F-number (F5.6), the operation circuit 148 calculates the quantities of defocus with respect to the first focusing sensors formed by the islands 146a to 146c. The operation circuit 148 compares all the calculated quantities of defocus and outputs the one showing the nearest position to the camera as the final quantity of defocus. The method for selecting decision of the final quantity of defocus is not restricted by the above-mentioned example.

Since the focal position detector 140 is formed as a module and outputs only one final quantity of defocus (e.g., that corresponding to the nearest position to the camera), the operation of the AF-CPU 301 of the camera body 100 becomes simple. Furthermore, the focus detector 140 can be used as an AF sensor in many kinds of optical equipment in addition to the AF-SLR camera, such as a video camera, a digital camera, a binoculars, and so on.

Furthermore, the operation circuit 148 should not necessarily output the final quantity of defocus. It is possible that all the signals from the focusing sensors included in both of the first and second focusing sensor groups be outputted directly to the AF-CPU 301. The AF-CPU 301 can calculate the quantities of defocus with respect to all the focusing sensors and decide the final quantity of defocus. Alternatively, it is possible that each final quantity of defocus with respect to the focusing sensors included in the first or second focusing sensor group showing the nearest position is outputted to the AF-CPU 301. The AF-CPU 301 can select one of the final quantities of defocus corresponding to the F-number of the optical lens system 201.

Figure 5:
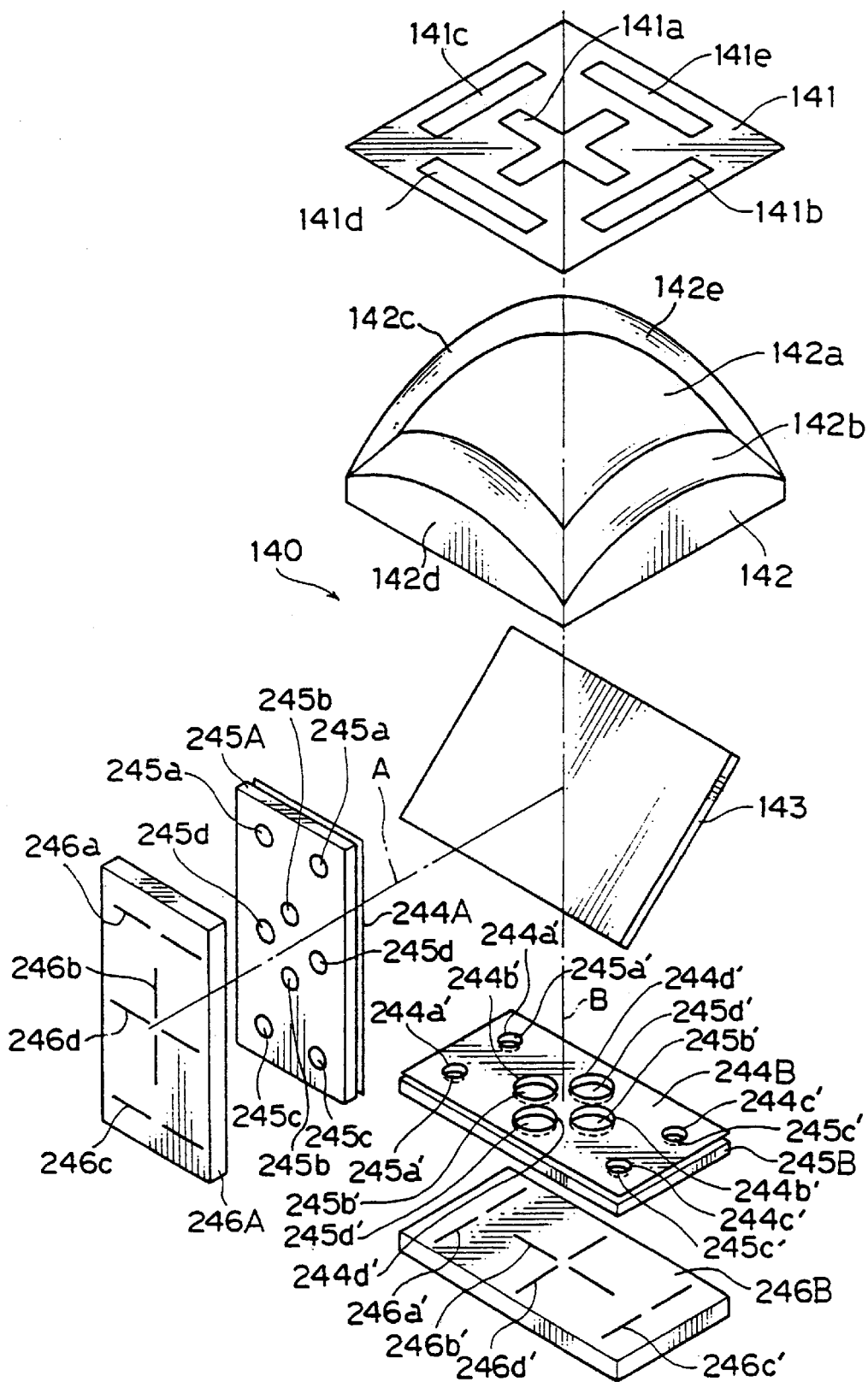
FIG. 5 is a perspective view showing a configuration of a second modification of the focus detector of the embodiment of this invention.

A second modification of the focus detector 140 is shown in FIG. 5. Explanation of the elements in common with the above-mentioned first modification is omitted.

In a first direction A, a first sensor unit configured by a first aperture mask 244A, a first reforming lens array 245A and a first sensor chip 246A is provided. In a second direction B, a second sensor unit configured by a second aperture mask 244b, a second reforming lens array 245B and a second sensor chip 246B is provided.

Two pairs of reforming lenses 245b and 245d, which have relatively smaller diameter corresponding to an optical lens system 201 having an F-number equal to or smaller than a second predetermined F-number such as F5.6, are formed in a manner to cross at right angle in a center portion of the first reforming lens array 245A. Positions of the reforming lenses 245b and 245d correspond to reference portions and standard portions of second and fourth islands 246b and 246d of the first sensor chip 246A.

Two pairs of reforming lenses 245b' and 245d', which have relatively larger diameter corresponding to an optical lens system 201 having an F-number equal to or smaller than a second predetermined F-number such as F2.8, are formed in a manner to cross at right angle in a center portion of the second reforming lens array 245B. Positions of the reforming lenses 245b' and 245d' correspond to reference portions and standard portions of second and fourth islands 246b' and 246d' of the second sensor chip 246B.

Two sets of reforming lenses 245a and 245c, which have relatively smaller diameter corresponding to the optical lens system 201 having the F-number equal to or smaller than the first predetermined F-number, are formed on the first reforming lens array 245A in the vicinity of the shorter side edges thereof. Positions of the reforming lenses 245a and 245c correspond to reference portions and standard portions of first and third islands 246a and 246c of the first sensor chip 246A. Similarly, two sets of reforming lens arrays 245a' and 245c', which have relatively smaller diameter corresponding to the optical lens system 201 having the F-number equal to or smaller than the first predetermined F-number, are formed on the second reforming lens array 245B in the vicinity of the shorter side edges thereof. Positions of the reforming lenses 245a' and 245c' correspond to reference portions and standard portions of first and third islands 246a' and 246c' of the second sensor chip 246B.

The first aperture mask 244A and the second aperture mask 244B respectively have circular openings 244a to 244d and 244a' to 244d' facing the reforming lenses 245a to 245d and 245a' to 245d' of the first and second reforming lens arrays 245A and 245B. The openings 244a to 244d and 244a'b to 244d' respectively restrict the incident light flux entering into the reforming lenses 245a to 245d and 245a' to 245d'.

In the second modification, when the F-number of the optical lens system 201 is equal to or smaller than the second predetermined F-number (F2.8), the second cross focusing sensor included in the second focusing sensor group formed by the second and fourth islands 246b' and 246d' of the second sensor chip 246B is used for the focus detection. Since the diameter of the reforming lenses 245b' and 245d' of the second reforming lens array 245B is larger, the light flux passing through the region of the pupil of the optical lens system 201 which is further distant from the optical axis L can effectively be used in the focus detection. Thus, the focus of the optical lens system 201 is accurately detected responding to the F-number of the optical lens system 201.

On the other hand, when the F-number of the optical lens system 201 is larger than the second predetermined F-number (F2.8), the first cross focusing sensor included in the first focusing sensor group formed by the second and fourth islands 246b and 246d of the first sensor chip 246A and the line sensors included in the first focusing sensor group corresponding to the first and third islands 246a, 246c, 246a' and 246c' of the first and second sensor chips 246A and 246B are used for the focus detection.

In the second modification, it is necessary to prepare the original parts of the second aperture mask 244B, the second reforming lens array 245B and the second sensor chip 246B. However, as the first aperture mask 244A, the first reforming lens array 245A and the first sensor chip 246A, the conventional parts can be used so as to reduce the cost of the focus detector 140. Furthermore, when a prism can be provided between the second reforming lens array 245B and the second sensor chip 246B in order to refract the light means to the optical axis, it is possible to make the second sensor chip 246B be the same as the first sensor chip 246A.

Figure 6:
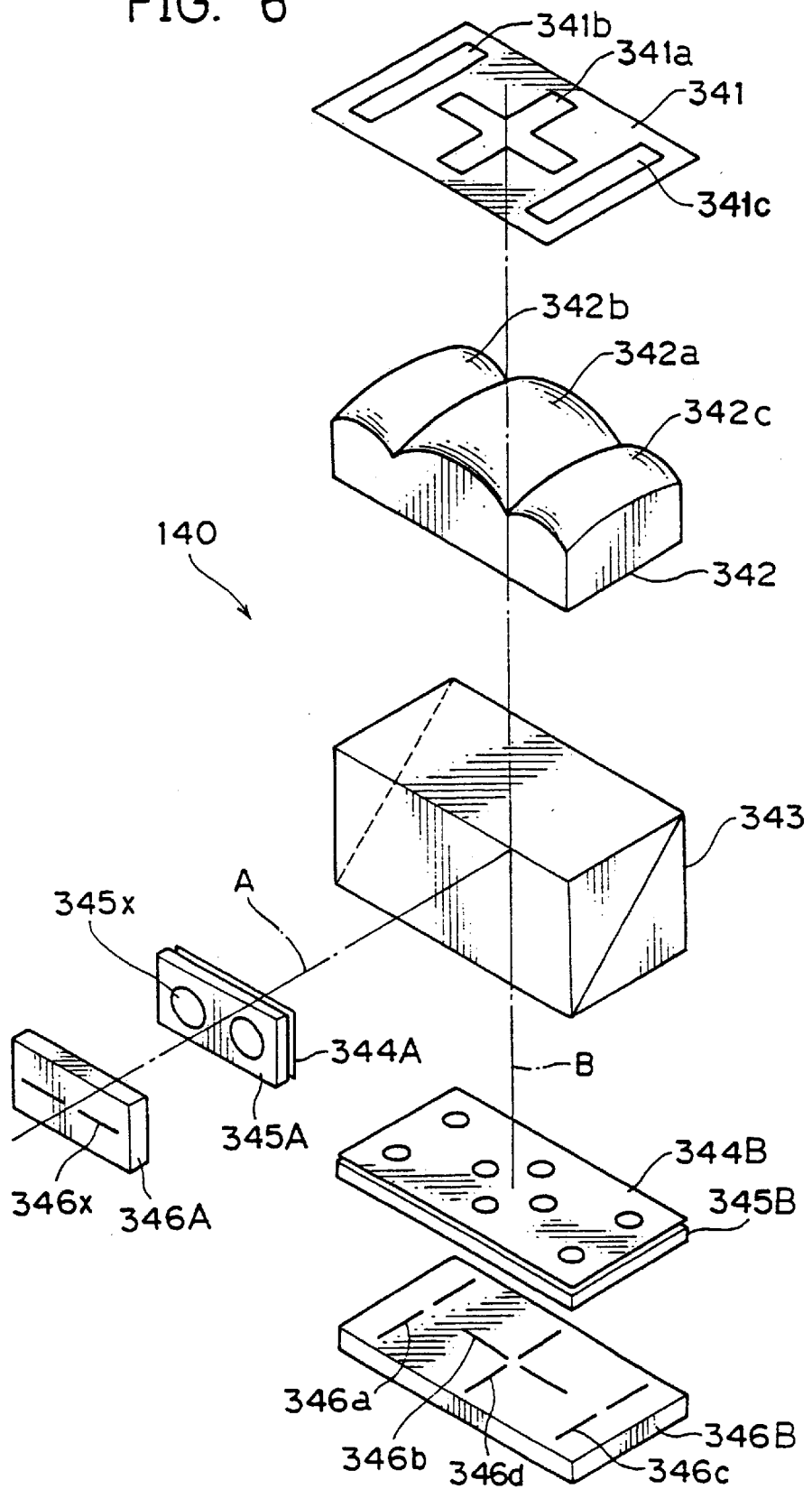
FIG. 6 is a perspective view showing a configuration of a third modification of the focus detector of the embodiment of this invention.

A third modification of the focus detector 140 is shown in FIG. 6. Explanation of the elements in common with the above-mentioned first or second modification is omitted.

A field mask 341 is disposed in the vicinity of a position which is equivalent to the focal plane 1 with respect to the optical path from the optical lens system 201. The field mask 341 restricts the light flux which passes through the optical lens system 201 and enters the focal position detector 140. The field mask 341 has three openings 341a to 341c corresponding to the first to fourth islands 346a to 346d of a second sensor chip 346B.

A condenser lens 342 is disposed behind the field mask 341. The condenser lens 342 has three regions 342a to 342c corresponding to the openings 341a to 341c of the field mask 341. A beam splitter 343 is disposed behind the condenser lens 342. The beam splitter 343 splits the light flux passing through the field mask 341 and the condenser lens 342 into first beams moving in a first direction A and second beams moving in a second direction B. The first direction A crosses the second direction B at right angle.

In the first direction A, a first sensor unit configured by a first aperture mask 344A, a first reforming lens array 345A and a first sensor chip 346A is provided. In the second direction B, a second sensor unit configured by a second aperture mask 344B, a second reforming lens array 345B and a second sensor chip 346B is provided. In the third modification, conventional parts for the conventional AF-SLR camera can be used as the first and second sensor units.

The first sensor chip 346A has only one island 346x. The first reforming lens array 345A has a pair of reforming lenses 345x having relatively larger diameter corresponding to the optical lens system having an F-number equal to or smaller than a second predetermined F-number such as F2.8. Positions of the reforming lenses 345x correspond to a reference portion and a standard portion of the island 346x. A focusing sensor formed by the island 346x, the reforming lenses 345x and the openings of the aperture mask is included in the second focusing sensor group. The incident surface of the first sensor chip 346A is positioned at a focal plane of the reforming lenses 345x. The reforming lenses 345x of the first reforming lens array 345A separate the incident light flux and focus on the first island 346x of the first sensor chip 346A. The first aperture mask 344A has circular openings (not shown in the figure) which face the reforming lenses 345x of the first reforming lens array 345A. The openings respectively restrict the incident light flux entering into the reforming lenses 345x.

The center opening 341a of the field mask 341 has a cross shape corresponding to a first cross focusing sensor included in the first focusing sensor group formed by the second island 346b and the fourth island 346d of the second sensor chip 346B. The other openings 341b and 341c respectively have an oblong rectangular shape corresponding to the first and third islands 346a and 346c of the second sensor chip 346B.

In the third modification, when the F-number of the optical lens system 201 is equal to or smaller than the second predetermined F-number (F2.8), the line sensor of the island 346x of the first sensor chip 346A which is a second focusing sensor included in the second focusing sensor group is used for the focus detection. Since the diameter of the reforming lenses 345x of the first reforming lens array 345A is larger, the light flux passing through the region of the pupil of the optical lens system 201 which is far from the optical axis L can effectively be used in the focus detection. Thus, the focal pint of the optical lens system 201 is accurately detected responding to the F-number of the optical lens system 201.

On the other hand, when the F-number of the optical lens system 201 is larger than the second predetermined F-number (F2.8), the first cross focusing sensor formed by the second and fourth islands 346b and 346d and the line sensors corresponding to the first and third islands 346a and 346c of the second sensor chip 346B which are the first focusing sensors included in the first focusing sensor group are used for the focus detection.

In the third modification, the conventionally manufactured sensors can be used as the first and second sensor units, so that the reliability of the sensors can be increased and the cost of the focus detector 140 can be reduced.

Figure 7:
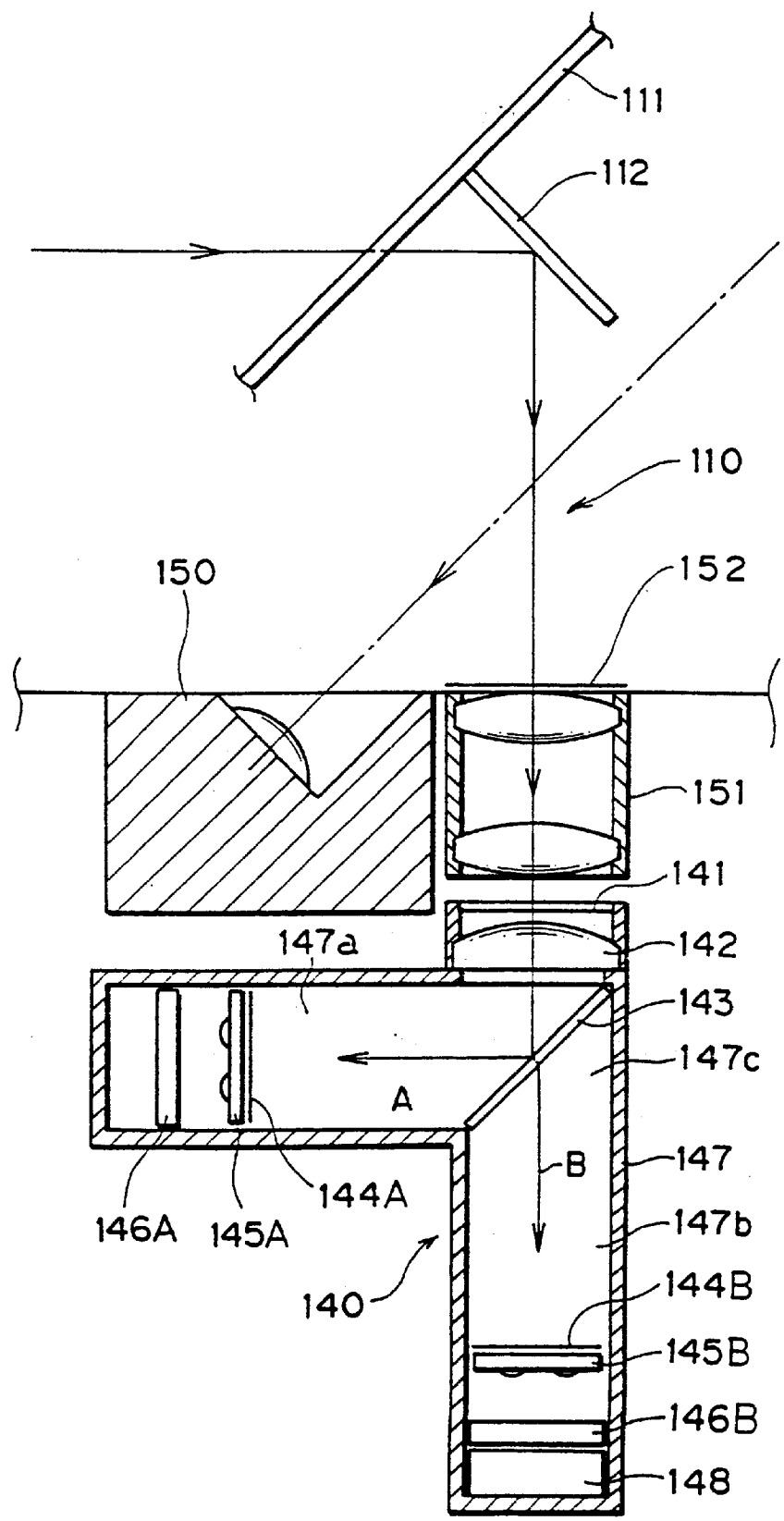
FIG. 7 is a cross-sectional view showing a configuration of a fourth modification of the focus detector of the embodiment of this invention.

A fourth modification of the focus detector 140 is shown in FIG. 7. Explanation of the elements in common with the above-mentioned first modification shown in FIG. 4 is omitted.

In the fourth modification, a relay lens 151 is provided between the supplemental mirror 112 and the focus detector 140 in order to avoid spatial interference between the light sensor 150 and the focal position detector 140. The module of the focal position detector 140 is substantially the same as that shown in FIG. 4. The relay lens 151 extends the optical path between the field mask 152 of the camera body 100 to the condenser lens 142.

Figure 8:
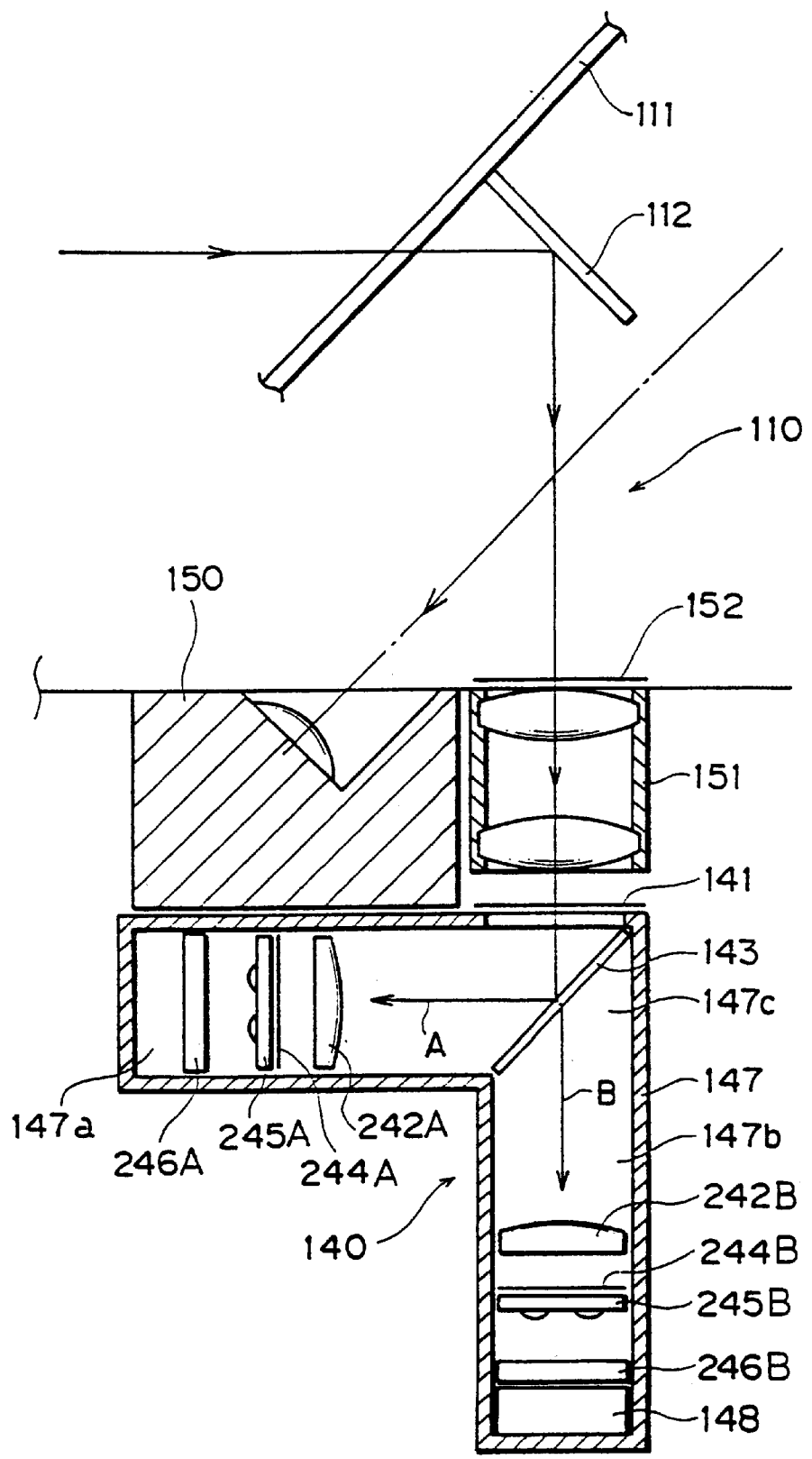
FIG. 8 is a cross-sectional view showing a configuration of a fifth modification of the focus detector of the embodiment of this invention.

A fifth modification of the focus detector 140 is shown in FIG. 8. Similar to the above-mentioned fourth modification shown in FIG. 7, a relay lens 151 is provided between the supplemental mirror 112 and the focus detector 140 in order to avoid spatial interference between the light sensor 150 and the focal position detector 140. In the fifth modification, first and second condenser lenses 242a and 242b are respectively provided inside the housing 147 in order to reduce the height of the camera body, especially the height below the mirror unit 110. The first condenser lens 242A is provided between the beam splitter 143 and the first field mask 244A in the inside of the first arm portion 147a of the housing 147. The second condenser lens 242B is provided between the beam splitter 143 and the second field mask 244B in the inside of the second arm portion 147b of the housing 147.

It is preferable that the first and second field masks 244A and 244B, the first and second reforming lens arrays 245A and 245B, and the first and second sensor chips 246A and 246B be respectively substantially the same as those in the above-mentioned second modification. Alternatively, it is preferable that the first and second field masks 244A and 244B, the first and second reforming lens arrays 245A and 245B, and the first and second sensor chips 246A and 246B be respectively substantially the same as the first and second field masks 344A and 344B, the first and second reforming lens arrays 345A and 345B, and the first and second sensor chips 346A and 346B in the above-mentioned third modification.

In the fifth modification, when a single condenser lens which is suitable for the focus detection of the optical lens system, for example, having the F-number equal to or smaller than the second predetermined F-number (F2.8)

cannot commonly be used in the focus detection of the optical lens system, for example, having the F-number larger than the second predetermined F-number and equal to or smaller than the first predetermined F-number (F5.6), the first and second condenser lenses 242A and 242B respectively having a suitable optical characteristics can be provided at the best positions.

A sixth modification of the focus detector 140 is described with reference to FIGS. 9 to 13. In the above-mentioned first to fifth modifications, the light flux passing through the pupil of the optical lens system is separated in two ways by the beam splitter. In the sixth modification, no beam splitter is used and the light flux is not separated.

Figure 9:
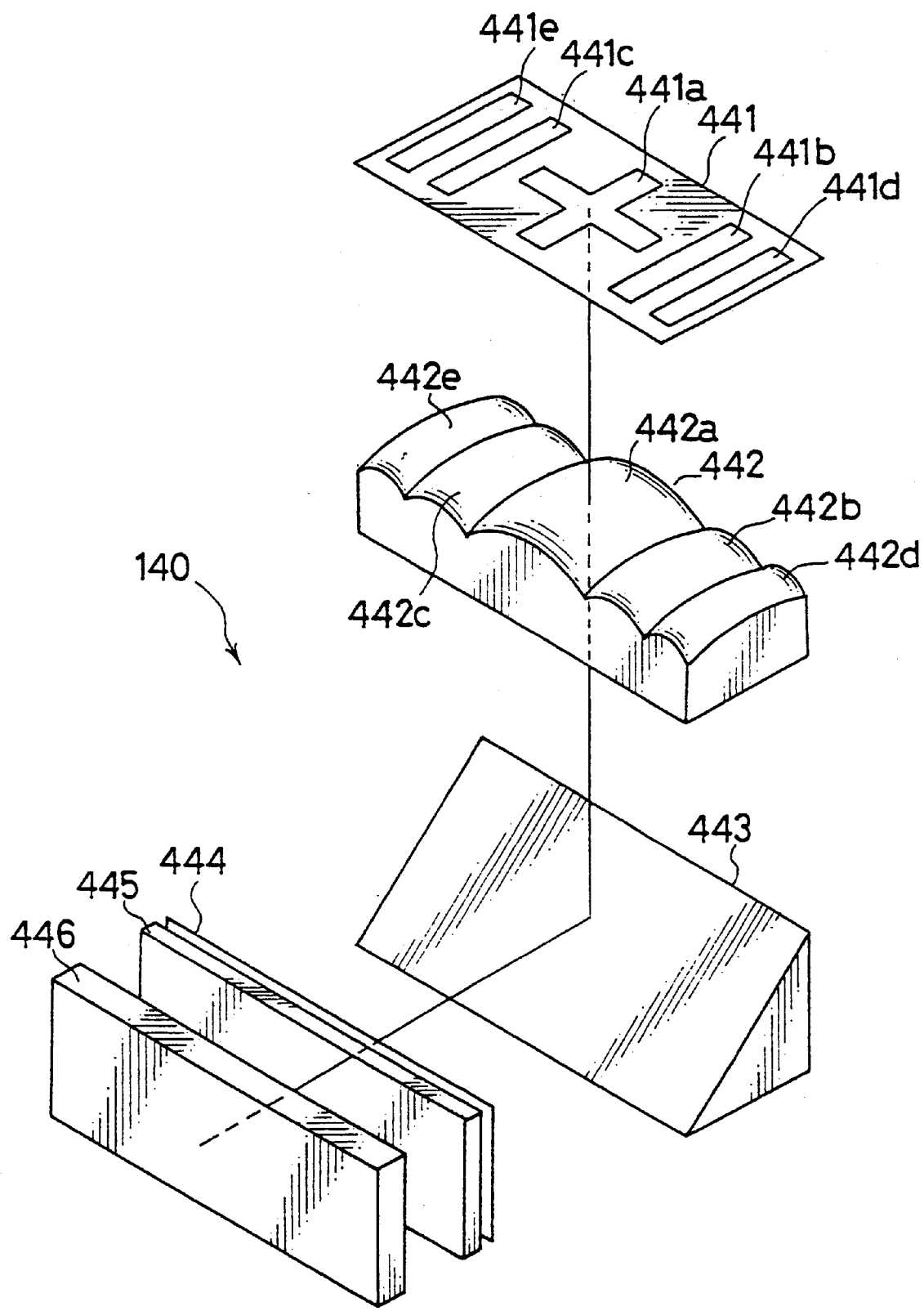
FIG. 9 is a perspective view showing a configuration of a sixth modification of the focus detector of the embodiment of this invention.

As can be seen from FIG. 9, a field mask 441 is disposed in the vicinity of plane equivalent to the focal plane 1 with respect to the optical path from the optical lens system 201. The field mask 441 restricts the light flux which passes through the optical lens system 201 and enters into the focal position detector 140. The field mask 441 has five openings 441a to 441e corresponding to islands of sensor units described below.

A condenser lens 442 is disposed behind the field mask 441. The condenser lens 442 has five regions 442a to 442e corresponding to the openings 441a to 441e of the field mask 441. A mirror 443 is disposed behind the condenser lens 442. The mirror 443 reflects the light flux passing through the field mask 441 and the condenser lens 442 to the sensor unit including an aperture mask 444, a reforming lens array 445 and a sensor chip 446. The field mask 441, the condenser lens 442, the mirror 443, the aperture mask 444, the reforming lens array 445 and the sensor chip 446 are integrated in one body forming a module.

Figure 10:
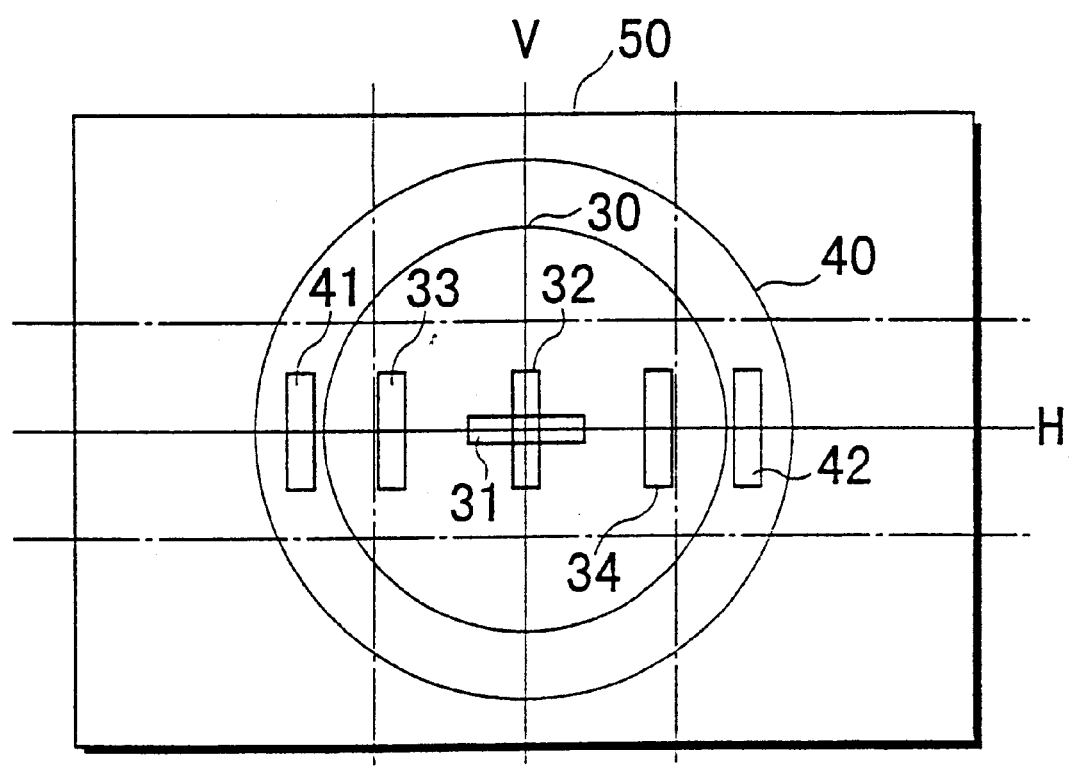
FIG. 10 is a front view for showing an arrangement of focusing areas in the sixth modification.

Focusing areas in the sixth modification are shown in FIG. 10. The focus detector 140 in accordance with the sixth modification has six focusing areas 31 to 34, 41 and 42. A rectangular frame 50 designates a frame on the focal plane of a camera body or a frame of the focusing screen of a viewfinder. A first circular region 30 having a smaller diameter designates a region where light flux emitted from an object and passing through a pupil of an optical lens system having a larger first predetermined F-number such as F6.7 can reach. A second circular region 40 having a larger diameter designates a region where light flux emitted from an object and passing through a pupil of an optical lens system having a smaller second predetermined F-number such as F4 can reach.

The focusing areas 31 to 34 with respect to the first focusing sensor group are disposed in the first circular region 30. The focusing areas 41 and 42 with respect to the second focusing sensor group are disposed outside the first circular region 30 and inside the second circular region 40.

With respect to the first focusing sensor group, the focusing areas 31 and 32 are respectively disposed on a lateral line H and a longitudinal line V crossing at the center of the frame 50. The first focusing sensors corresponding to the focusing areas 31 and 32 are used for focusing an object or a portion of an object positioned in the center portion of the frame 50 in the sagittal direction. The focusing areas 33 and 34 are disposed parallel to the longitudinal line V at positions distant from the center of the frame 50. The first focusing sensors corresponding to the focusing areas 33 and 34 are used for focusing an object or a portion of an object positioned distant from the center of the frame 50 in the first circular region 30. The first focusing sensors corresponding to the focusing areas 31 to 34 included in the first focusing sensor group are always used in the focus detection without reference to the F-number of the optical lens system 201. As can be seen from FIG. 10, the focusing areas 31 to 34 with respect to the first focusing sensor group are positioned in the center rectangular region of nine rectangular regions shown by dotted chain lines which are formed by trisecting the frame 50 in both the lateral and longitudinal directions.

The focusing areas 41 and 42 with respect to the second focusing sensor group are disposed parallel to the longitudinal line V at positions further distant from the center of the frame 50 than the focusing areas 33 and 34 inside the second circular region 40. The second focusing sensors corresponding to the focusing areas 41 and 42 are used for focusing an object or a portion of an object positioned further distant from the center of the frame 50. The second focusing sensors corresponding to the focusing areas 41 and 42 included in the second focusing sensor group are used with the first focusing sensors corresponding to the focusing areas 31 to 34 included in the first focusing sensor group for detecting the focus when the optical lens system 201 has an F-number equal to or smaller than the second predetermined F-number such as F4.

Figure 11A:
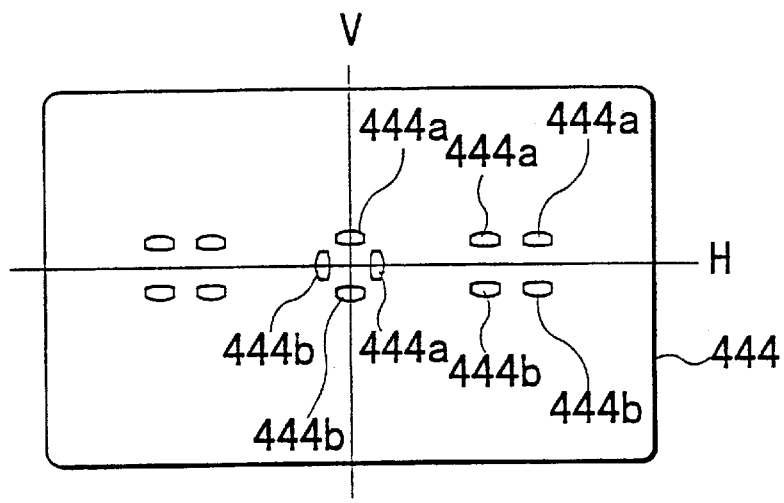
FIGS. 11A, 11B and 11C are respectively front views showing the details of an aperture mask, a reforming lens array and a sensor in the sixth modification.
Figure 11B:
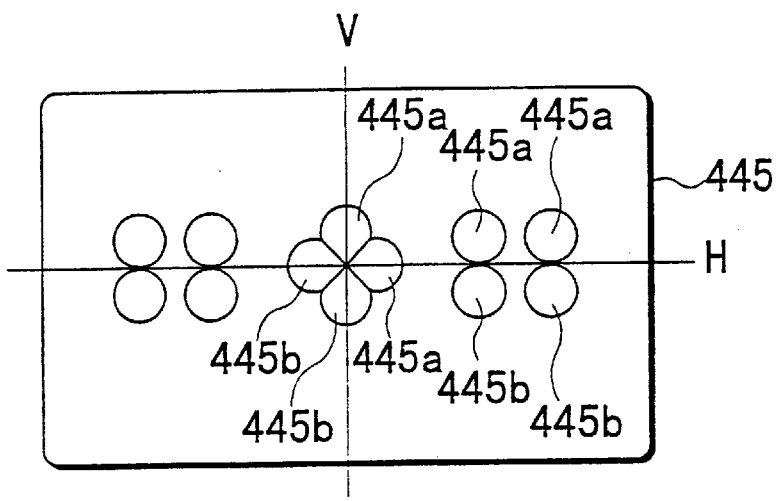
Figure 11C:
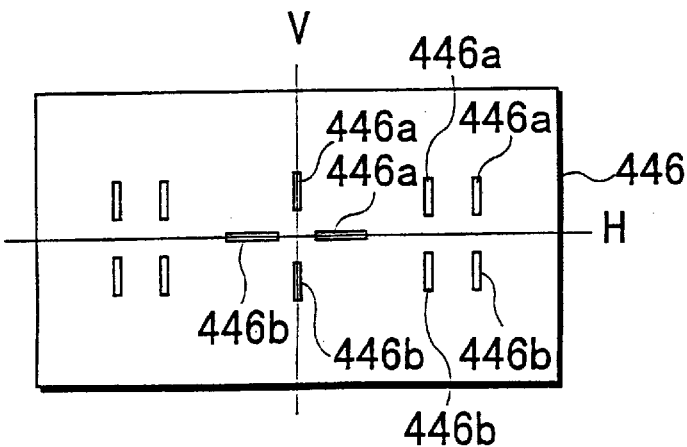

Details of the aperture mask 444, the reforming lens array 445 and the sensor chip 446 are respectively shown in FIGS. 11A, 11B and 11C. As can be seen from FIG. 11C, each pair of photoelectric transfer device arrays 446a and 446b are oriented symmetrically with reference to a lateral line H or a longitudinal line V on a substrate of the sensor chip 446. One of the photoelectric transfer device arrays 446a and 446b serves as a reference portion and the other serves as a standard portion of an island. The islands consisting of the photoelectric transfer device arrays 446a and 446b are arranged at positions corresponding to the focusing areas 31 to 34, 41 and 42 on the sensor chip 446. Corresponding to the arrangement of the photoelectric transfer device arrays 446a and 446b, openings 444a and 444b of the aperture mask 444 and reforming lenses 445a and 445b of the reforming lens array 445 are also symmetrically formed with reference to the lateral line H or the longitudinal line V.

A pair of photoelectric transfer device arrays 446a and 446b (an island), a pair of reforming lenses 445a and 445b, a pair of openings 444a and 444b corresponding to each focusing area 31 to 34, 41 or 42 constitute a focusing sensor.

FIG. 12 shows conditions for which the light flux passing through the pupil of the optical lens system 201 reaches to the sensor chip 446. The field mask 441, the mirror 443, the aperture mask 444 and the reforming lens array 445 are not shown in FIG. 12. F designates the equivalent focal plane or film surface in FIG. 12.

Light flux 30A passing through the first circular region 30 moves along the optical paths shown by dotted chain lines and reaches the first focusing sensor (or an island) 446A which corresponds to the focusing area 33 included in the first focusing sensor group shown in FIG. 11. However, the light flux 30A cannot reach the second focusing sensor (or an island) 446B which corresponds to the focusing area 41 included in the second focusing sensor group due to the vignetting of the optical lens system 201. Light flux 40A passing outside the first circular region 30 and inside the second circular region 40 moves along the optical paths shown by solid lines and reaches the focusing sensor 446B. The light flux 40A reaches the focusing sensor 446A also.

Thus, when the F-number of the optical lens system 201 of the interchangeable lens 200 which is mounted on the camera body 100 is larger than the second predetermined F-number such as F4, the second focusing sensors corresponding to the focusing areas 41 and 42 cannot detect the focus of the optical lens system 201, so that an object or a portion of an object positioned corresponding to the focusing area 41 or 42 in the frame 50 cannot be focused. On the other hand, when the F-number of the optical lens system 201 is equal to or smaller than the second predetermined F-number such as F4, the second focusing sensors corresponding to the focusing areas 41 and 42 can detect the focus of the optical lens system 201, so that the object or the portion of the object positioned corresponding to the focusing area 41 or 42 can be focused.

Operation of the sixth modification is described with reference to a flowchart shown in FIG. 13. When the interchangeable lens 200 is mounted on the camera body 100 and a main switch of the camera is turned on (step S100), the AF-CPU 301 reads out the F-number for automatic focusing (Fno) which is memorized in the lens CPU 204 (step S105). The AF-CPU 301 judges whether the F-number for automatic focusing is equal to or smaller than the second predetermined F-number (2nd Fno) such as F4 or not (step S110). When the F-number for automatic focusing is equal to or smaller than the second predetermined F-number (YES in step S110), the AF-CPU 301 sets all the first and second focusing sensors (1st and 2nd focusing sensors) corresponding to the focusing areas 31 to 34 included in the first focusing sensor group and the focusing areas 41 and 42 included in the second focusing sensor group to be used in the focus detection (step S115). On the other hand, when the F-number for automatic focusing is larger than the second predetermined F-number (NO in step S110), the AF-CPU 301 sets only the first focusing sensors corresponding to the focusing areas 31 to 34 included in the first focusing sensor group to be used in the focus detection (step S120).

When the focusing sensors are set in the focus detection, the AF-CPU 301 detects the focus of the optical lens system 201, and calculates a quantity of defocus and detects a direction of a movement of the optical lens system 201 (step S125). Furthermore, the AF-CPU 301 controls the lens driving mechanism 203 in order to move the optical lens system 201 using the calculatesd quantity of defocus in the detected direction (step S130).

When the movement of the optical lens system 201 is completed, the AF-CPU 301 judges whether the optical lens system 201 is focused or not by using the focusing sensors (step S135). When the optical lens system 201 is not focused (NO in step S135), the AF-CPU 301 further detects the focus of the optical lens system 201, calculates a quantity of defocus (step S125), and moves the optical lens system 201 (step S130). On the other hand, when the optical lens system 201 is focused (YES in step S135), the AF-CPU 301 finishes the focusing operation (step S140) and waits the next operation such as shutter release.

In the focus detection using a plurality of the focusing sensors, the quantity of defocus is calculated with respect to each focusing sensor or island. One of the quantities of defocus which is used for controlling the movement of the optical lens system 201 is decided among a plurality of the quantities of defocus. When the F-number of the optical lens system 201 is equal to or smaller than the second predetermined F-number such as F4, the operation circuit 148 calculates the quantities of defocus with respect to the first focusing sensors corresponding to the focusing areas 31 to 34 included in the first focusing sensor group and the second focusing sensors corresponding to the focus zones 41 and 42 included in the second focusing sensor group. The operation circuit 148 compares the calculated quantities of defocus and outputs one showing the nearest position to the camera as the final quantity of defocus.

When the F-number of the optical lens system 201 is larger than the second predetermined F-number, the operation circuit 148 similarly calculates the quantities of defocus with respect to the first focusing sensors corresponding to the focusing areas 31 to 34 included in the first focusing sensor group. The operation circuit 148 compares all the calculated quantities of defocus and outputs one showing the nearest position to the camera as the final quantity of defocus.

A seventh modification of the focus detector 140 is described with reference to FIGS. 14, 15A, 15B and 15C. Explanation of the elements in common with the above-mentioned sixth modification is omitted.

Figure 14:
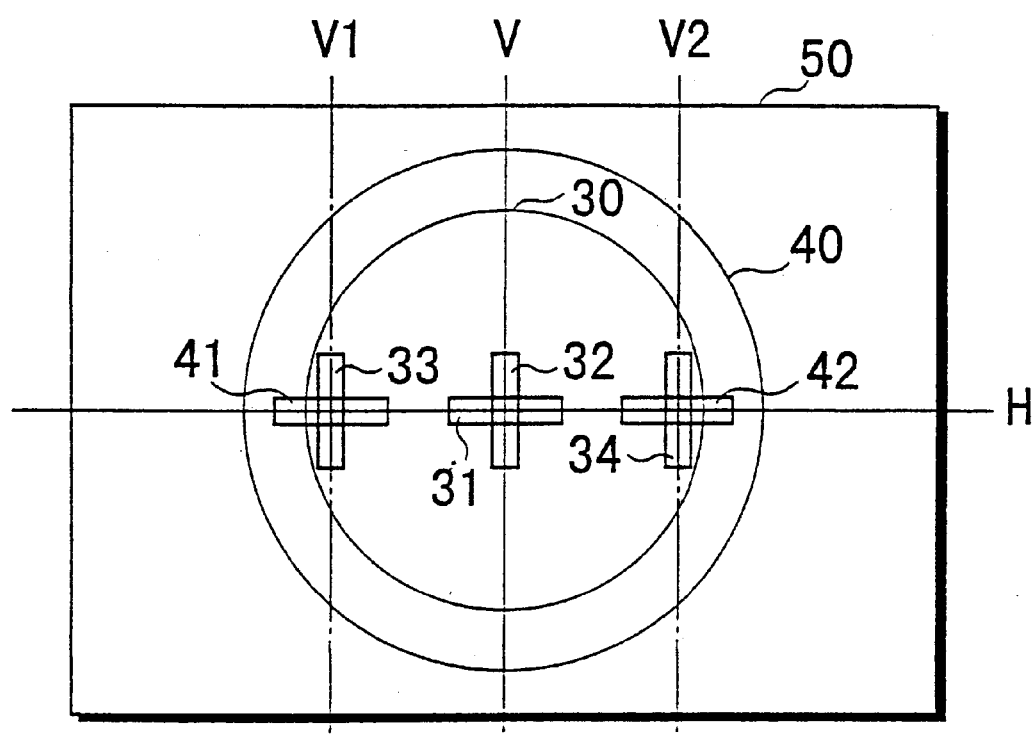
FIG. 14 is a front view for showing an arrangement of focusing areas in a seventh modification of the focus detector of the embodiment of this invention.

As can be seen from FIG. 14, the focusing areas 31 to 34 included in the first focusing sensor group and the second focusing sensors corresponding to the focusing areas 41 and 42 included in the second focusing sensor group are disposed in a manner to form three cross focusing sensors when the F-number of the optical lens system 201 of the interchangeable lens 200 is equal to or smaller than the second predetermined F-number such as F4.

The focusing areas 33 and 34 with respect to the first focusing sensor group are respectively disposed on longitudinal lines V1 and V2 in the vicinity of the end of the first circular region 30 in the meridional direction. The focusing areas 41 and 42 with respect to the second focusing sensor group are respectively disposed on the lateral line H in the sagittal direction. Thus, two sets of focusing sensors corresponding to the focusing areas 33 and 41, 34 and 42 respectively form cross focusing sensors. The cross focusing sensors are used for focusing an object or a portion of an object which is positioned distant from the center of the frame 50, when the F-number of the optical lens system 201 is equal to or smaller than the second predetermined F-number such as F4.

Figure 50:
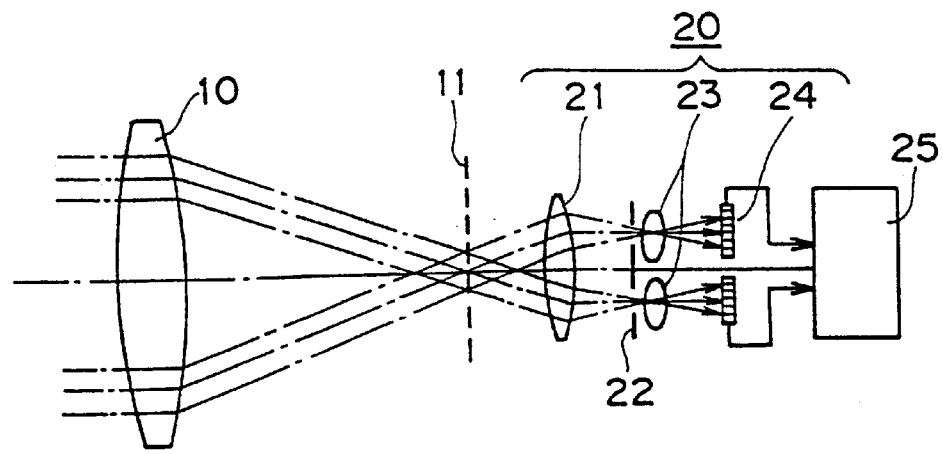
FIG. 50 is a side view showing the principle of the focus detector for detecting a focus of an optical lens system.
Figure 51:
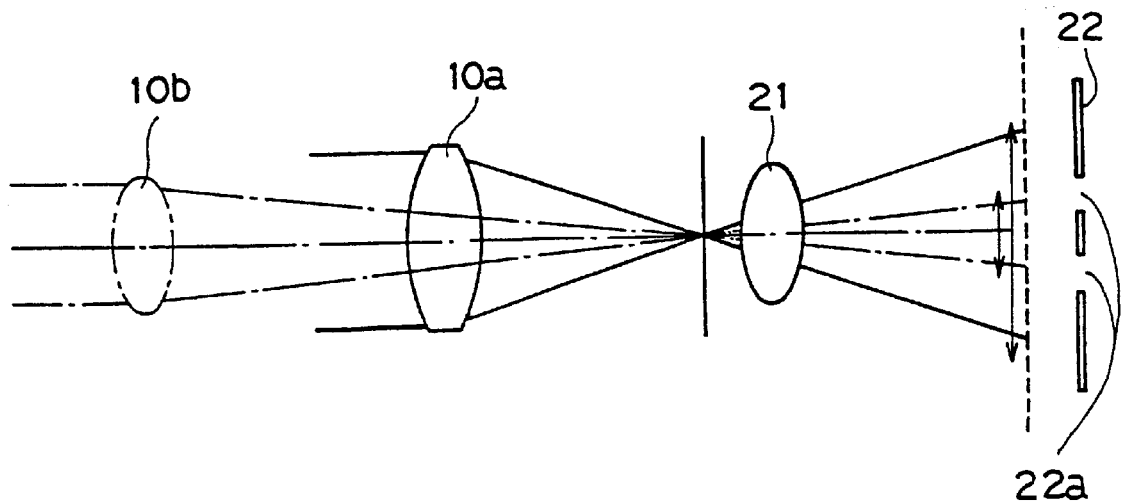
FIG. 51 is a side view showing optical paths corresponding to the difference of diameters of the pupil of the optical lens systems.
Figure 52:
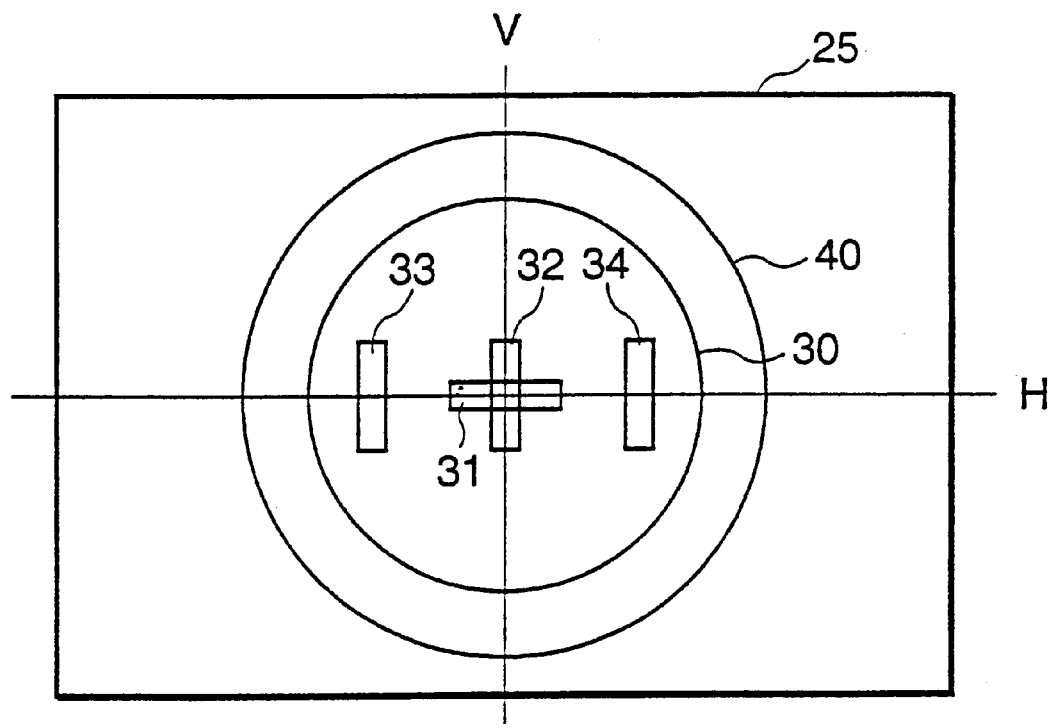
FIG. 52 is a front view showing the arrangement of focusing areas in the conventional focus detector.

Since the focusing areas 41 and 42 are disposed across the first circular region 30 to the second circular region 40, when the F-number of the optical lens system 201 is larger than the second predetermined F-number, the light flux can reach at least portions of the second focusing sensors or islands corresponding the focusing areas 41 and 42. As can be seen from the principle of the focus detection shown FIG. 50, the focus cannot be detected when at least one the pixel of the photoelectric transfer device array does not receive the light beam. In order to avoid the impossibility of the focus detection due to the vignetting of the optical lens system 201, the second focusing sensors corresponding to the focusing areas 41 and 42 are used only when the F-number of the optical lens system 201 is equal to or smaller than the second predetermined F-number such as F4.

Figure 15A:
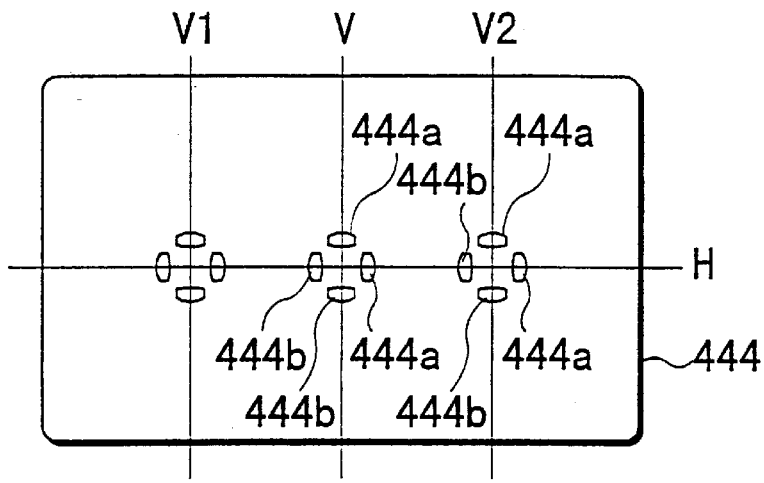
FIGS. 15A, 15B and 15C are respectively front views showing the details of an aperture mask, a reforming lens array and a sensor in the seventh modification.
Figure 15B:
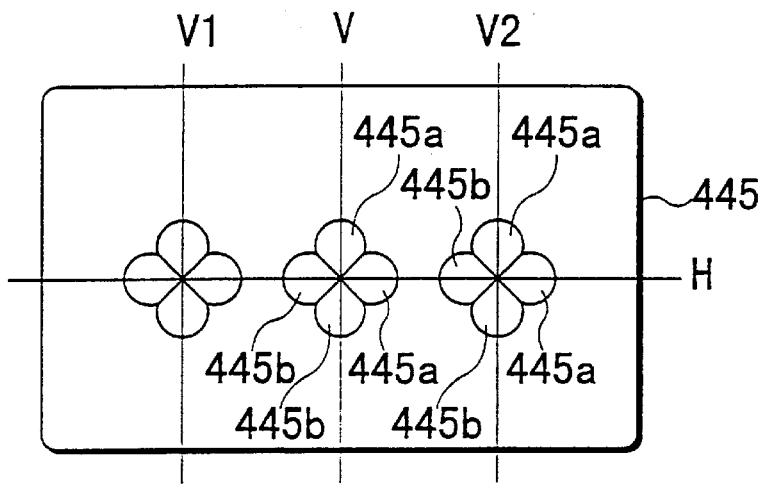
Figure 15C:
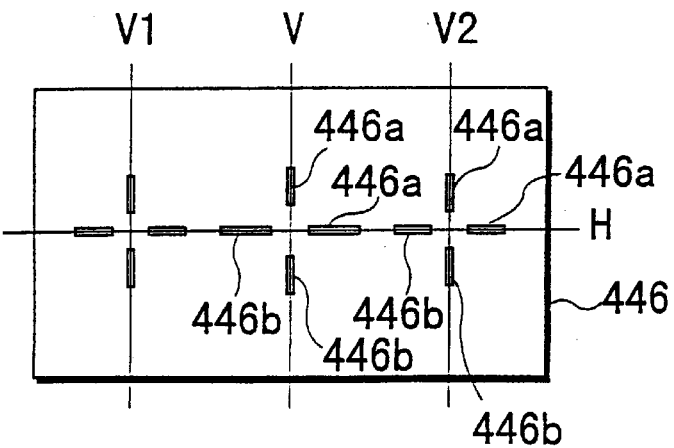

Details of the aperture mask 444, the reforming lens array 445 and the sensor chip 446 are respectively shown in FIGS. 15A, 15B and 15C. As can be seen from FIG. 15C, each pair of photoelectric transfer device arrays 446a and 446b are formed symmetrical with reference to a lateral line H or a longitudinal line V, V1 or V2 on a substrate of the sensor chip 446 for forming three cross focusing sensors which correspond to the focusing areas 31 to 34, 41 and 42. One of the regions 446a and 446b is used as a reference portion of an island and the other is used as a standard portion. Corresponding to the arrangement of the photoelectric transfer device arrays 446a and 446b, openings 444a and 444b of the aperture mask 444 are also symmetrically formed with reference to the lateral line H or the longitudinal line V, V1 or V2. On the other hand, the reforming lenses 445a and 445b of the reforming lens array 445 are radially disposed with respect to the cross points of the lateral line H and the longitudinal lines V, V1 and V2.

In the seventh modification, even when the F-number of the optical lens system 201 is equal to or smaller than the second predetermined F-number and the contrast of the image in the sagittal direction is different from that in the meridional direction, the focus detection can be executed by using the focusing sensor outputting a signal having a higher contrast.

An eighth modification of the focus detector 140 is described with reference to FIGS. 16A and 16B. The eighth modification further includes focusing areas disposed symmetrically with respect to the lateral line H and focusing sensors corresponding to the focusing areas on the configuration of the above-mentioned sixth modification.

Figure 16A:
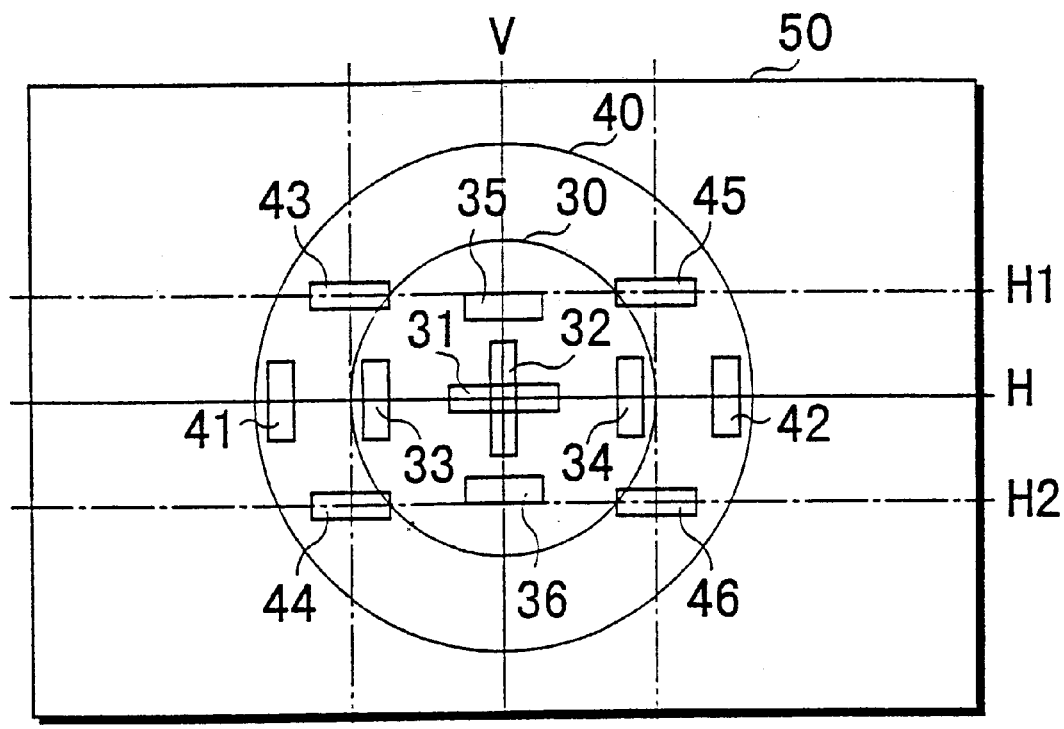
FIG. 16A is a front view for showing an arrangement of focusing areas in an eighth modification of the focus detector of the embodiment of this invention.

As can be seen from FIG. 16A, two focusing areas 35 and 36 with respect to the first focusing sensor group are further disposed parallel to the lateral line H in the vicinities of cross points of the longitudinal line V and lateral lines H1 and H2 in the first circular region 30. The focusing areas 31 to 36 with respect to the first focusing sensor group are disposed in the center rectangular region of nine rectangular regions shown by one dotted chain lines which are formed by trisecting the frame 50 in both of the lateral and longitudinal directions. However, the focusing areas 35 and 36 are not necessarily disposed in the center region. Four focusing areas 43 to 46 with respect to the second focusing sensor group are further disposed on the lateral lines H1 and H2 parallel to the lateral line H outside the first circular region 30 and inside the second circular region 40.

Figure 16B:
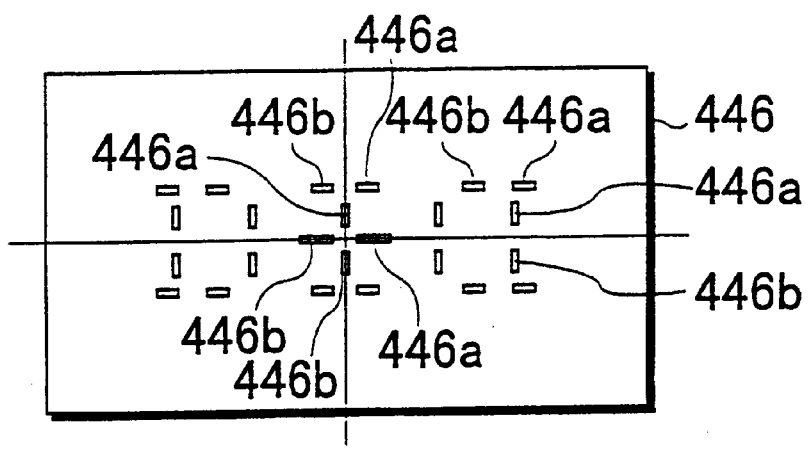
FIG. 16B is a front view showing the details of a sensor in the eighth modification.

An arrangement of the photoelectric transfer device arrays 446a and 446b on a substrate of the sensor chip 446 is shown in FIG. 16B. In this configuration, totally twelve focusing areas or focusing sensors are disposed at the center and at positions distant from the center of the frame 50, so that the possibility of focusing an object or a portion of the object distant from the center of the frame can be increased. Furthermore, all the photoelectric transfer device arrays are disposed parallel to the lateral line H or the longitudinal line V, so that manufacturing of the sensor chip 446 becomes easier.

A ninth modification of the focus detector 140 is described with reference to FIGS. 17A and 17B. The ninth modification further includes focusing areas disposed at positions distant from the center of the frame on the configuration of the above-mentioned seventh modification. Explanation of the elements in common with the above-mentioned seventh modification is omitted.

Figure 17A:
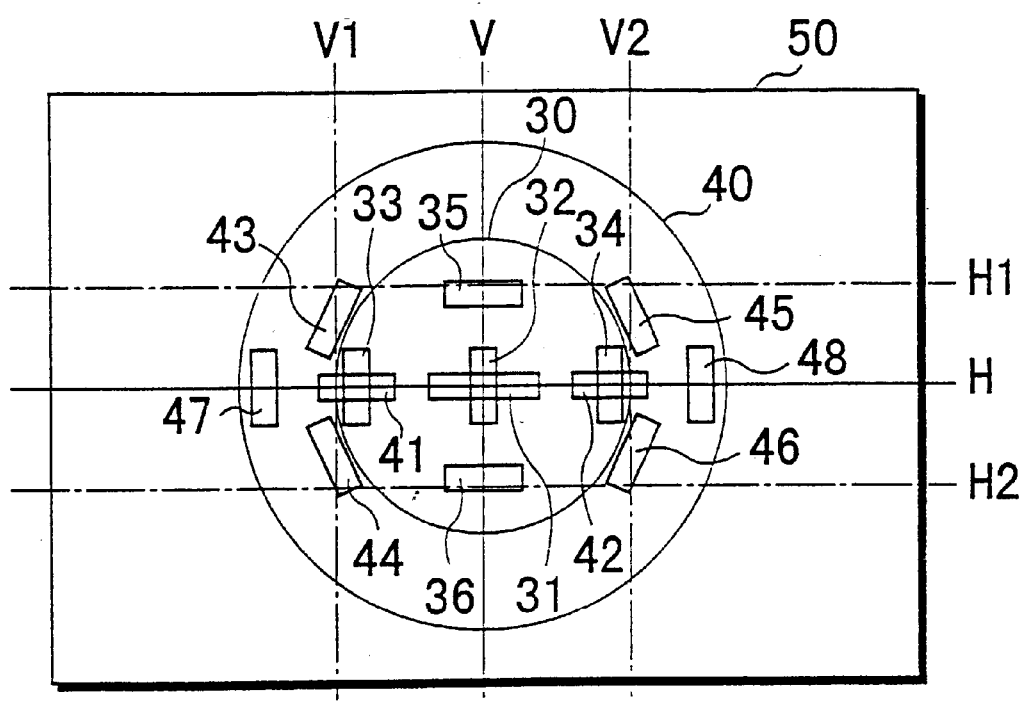
FIG. 17A is a front view for showing an arrangement of focusing areas in an ninth modification of the focus detector of the embodiment of this invention.

As can be seen from FIG. 17A, focusing areas 35, 36, 43 to 48 are disposed further to the focusing areas 31 to 34, 41 and 42 forming three cross focusing sensors. The focusing areas 35 and 36 with respect to the first focusing sensor group are disposed parallel to the lateral line H in the vicinities of cross points of the longitudinal line V and lateral lines H1 and H2 in the first circular region 30. The focusing areas 31 to 36 with respect to the first focusing sensor group are disposed in the center rectangular region of nine rectangular regions shown by one dotted chain lines which are formed by trisecting the frame 50 in both of the lateral and longitudinal directions. Furthermore, the focusing areas 33 to 36 are disposed on substantially the same circle. The center of the circle coincides with the center of the frame 50, so that the focusing areas 33 to 36 are substantially disposed in the meridional direction.

Similarly, focusing areas 43 to 46 with respect to the second focusing sensor group are disposed on substantially the same circle. The center of the circle coincides with the center of the frame 50, so that the focusing areas 43 to 46 are substantially disposed in the meridional direction. Further, zones 47 and 48 with respect to the second focusing sensor group are respectively disposed parallel to the longitudinal line V in the vicinity of the end of the second circular region 40 in the meridional direction. The focusing area 47 and 48 are also disposed on the same circle having the center coinciding with the center of the frame 50.

Figure 17B:
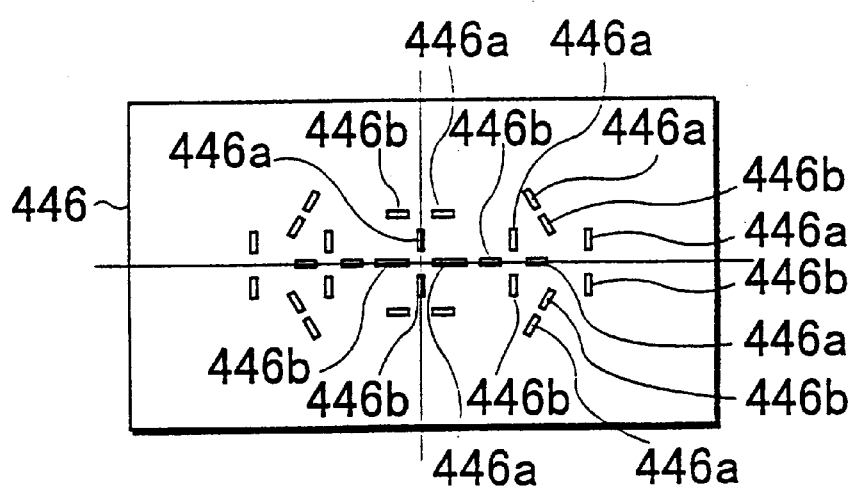
FIG. 17B is a front view showing the details of a sensor in the ninth modification.

An arrangement of the photoelectric transfer device arrays 446a and 446b on a substrate of the sensor chip 446 is shown in FIG. 17B. In this configuration, totally fourteen focusing areas or focusing sensors are disposed at the center and at positions distant from the center of the frame 50, so that the possibility of focusing an object or a portion of the object distant from the center of the frame can be increased. Furthermore, all the photoelectric transfer device arrays are disposed parallel to the lateral line H or the longitudinal line V, so that manufacturing of the sensor chip 446 becomes easier. Furthermore, even when the F-number of the optical lens system 201 is equal to or smaller than the second predetermined F-number and the contrast of the image in the sagittal direction is different from that in the meridional direction, the focus detection can be executed by using the focusing sensor outputting a signal having a higher contrast.

A tenth modification of the focus detector 140 is described with reference to FIGS. 18A and 18B. The tenth modification further includes focusing areas disposed at positions distant from the center of the frame on the configuration of the above-mentioned seventh modification. Explanation of the elements in common with the above-mentioned seventh or ninth modification is omitted.

Figure 18A:
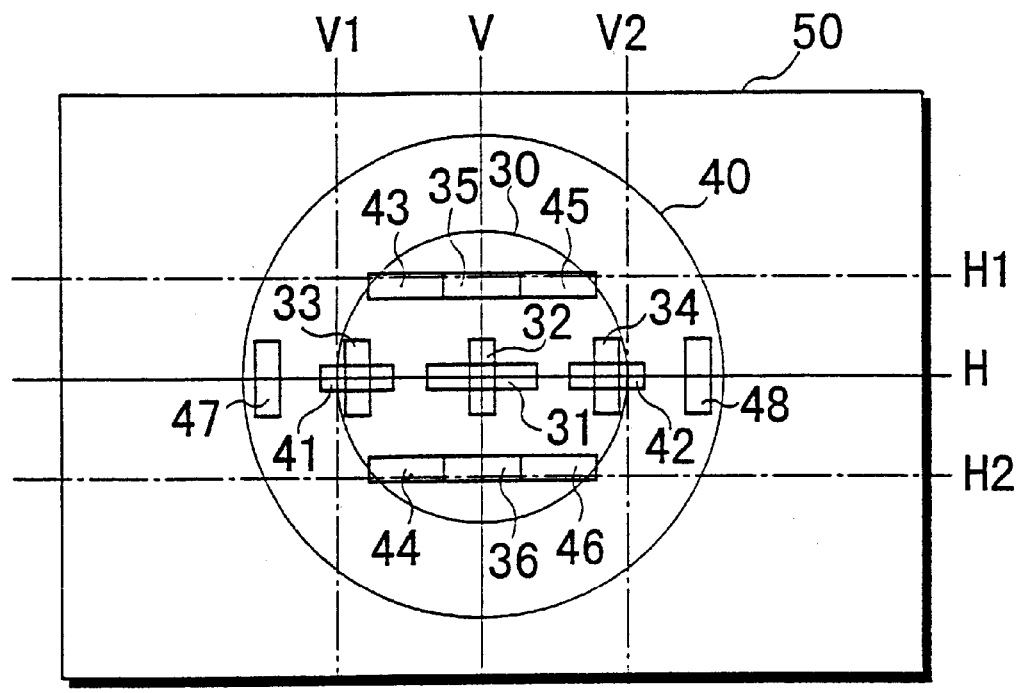
FIG. 18A is a front view for showing an arrangement of focusing areas in a tenth modification of the focus detector of the embodiment of this invention.

As can be seen from FIG. 18A, focusing areas 35, 36, 43 to 48 are disposed further to the focusing areas 31 to 34, 41 and 42 forming three cross focusing sensors. The focusing area 35 with respect to the first focusing sensor group and the focusing areas 43 and 45 with respect to the second focusing sensor group are adjacently disposed along lateral lines H1 and parallel to the lateral line H. The focusing area 36 with respect to the first focusing sensor group and the focusing areas 44 and 46 with respect to the second focusing sensor group are adjacently disposed along lateral lines H2 and parallel to the lateral line H.

Figure 18B:
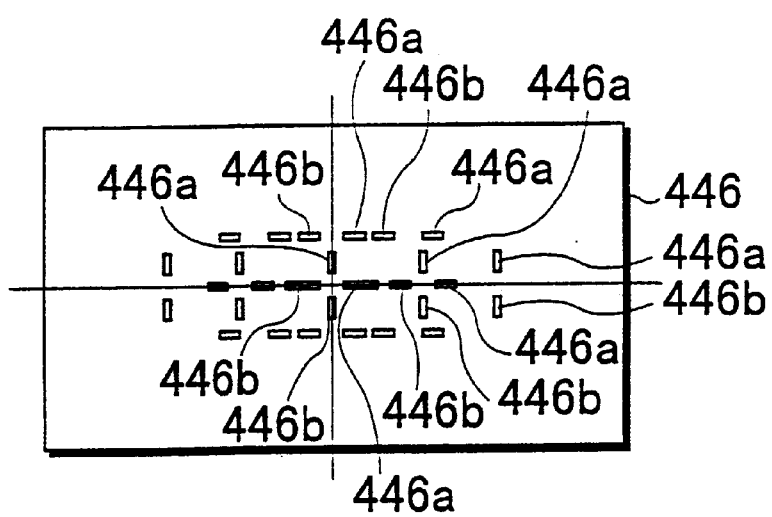
FIG. 18B is a front view showing the details of a sensor in the tenth modification.

An arrangement of the photoelectric transfer device arrays 446a and 446b on a substrate of the sensor chip 446 is shown in FIG. 18B. In this configuration, totally fourteen focusing areas or focusing sensors are disposed at the center and at positions distant from the center of the frame 50, so that the possibility of focusing an object or a portion of the object distant from the center of the frame can be increased. Furthermore, all the photoelectric transfer device arrays are disposed parallel to the lateral line H or the longitudinal line V, so that manufacturing of the sensor chip 446 becomes easier. Furthermore, even when the F-number of the optical lens system 201 is equal to or smaller than the second predetermined F-number and the contrast of the image in the sagittal direction is different from that in the meridional direction, the focus detection can be executed by using the focusing sensor outputting a signal having a higher contrast. Furthermore, all the photoelectric transfer device arrays are disposed parallel to the lateral line H or the longitudinal line V, so that manufacturing of the sensor chip 446 becomes easier.

An eleventh modification of the focus detector 140 is described with reference to FIGS. 19 to 24.

Generally, when the focal lengths of the optical lens systems 201 of the interchangeable lenses 200 are the same, the smaller the F-number of the optical lens system 201 is, the shallower the depth of field becomes. Thus, when the F-number of the optical lens system 201 is smaller, the focus detector is required to detect the focus accurately. A relation between a base length of a focusing sensor constituted by aperture masks, reforming lenses and photoelectric transfer device arrays and the focusing accuracy of the focusing sensor is described with reference to FIG. 53.

Figure 53:
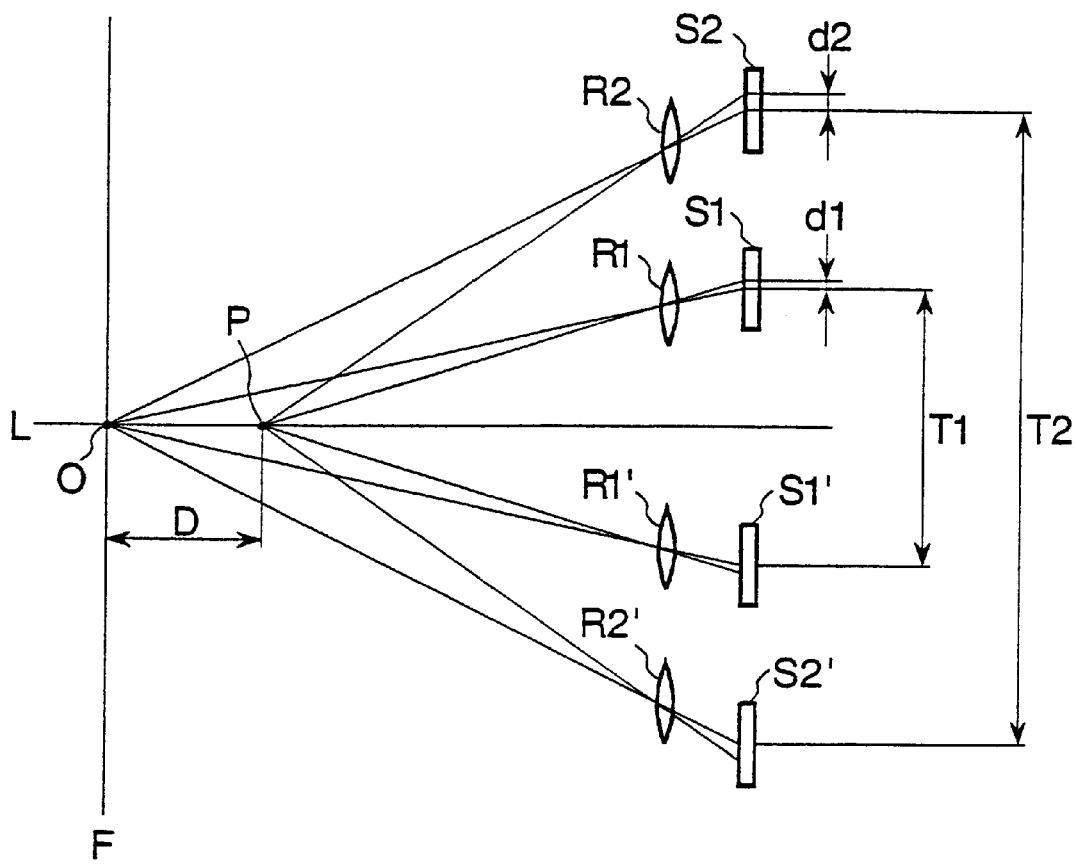
FIG. 53 is a side view showing a relation between the base length of a focusing sensor and the accuracy of a focus detection.

In FIG. 53, F designates an equivalent focal plane or film surface; L designates an optical axis; O designates a cross point of the optical axis L and the equivalent focal plane F; P designates a position of an image on the optical axis L; D designates a quantity of defocus; d1 and d2 respectively designate displacements of images on a photoelectric transfer device array corresponding to the quantity of defocus D; R1, R1', R2 and R2' respectively designate reforming lenses; S1 and S1' respectively designate photoelectric transfer device arrays constituting a focusing sensor with a base length T1; and S2 and S2' respectively designate photoelectric transfer device arrays constituting a focusing sensor with a base length T2.

When an image of an object on the optical axis is focused at the point P by an optical lens system (not shown in the figure), light flux passing the point P enters the photoelectric transfer device arrays S1, S1', S2 and S2' through the reforming lenses R1, R1', R2 and R2'. Next, when the image on the optical axis L moves from point P to point O due to the movement of the optical lens system, the images on the photoelectric transfer device arrays S1 and S1' which are positioned near to the optical axis L move the displacement d1, and the images on the photoelectric transfer device arrays S2 and S2' which are positioned far from the optical axis L move the displacement d2 (d2>d1). When the quantity of defocus D is constant, the longer the base length of the focusing sensor becomes, the larger the displacements of the images on the photoelectric transfer device arrays becomes. When the size of each pixel of the photoelectric transfer device array is constant, the accuracy of focus detection using the photoelectric transfer device arrays S2 and S2' which are disposed distant from the optical axis L is higher than that of the detection using the photoelectric transfer device arrays S1 and S1' disposed near the optical axis L. That is, the longer the base length of the focusing sensor is, the higher the focus detection becomes.

Figure 19:
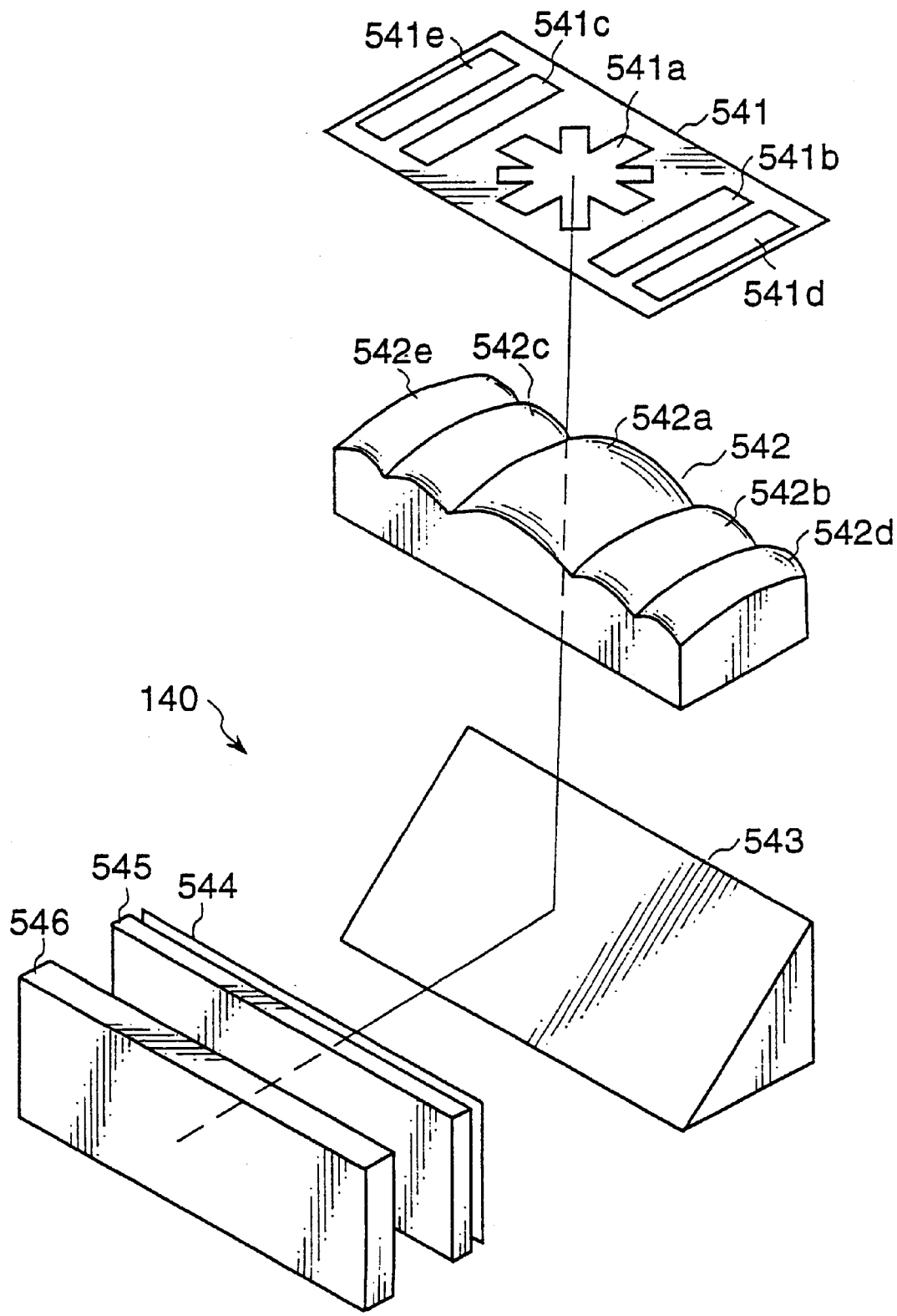
FIG. 19 is a perspective view showing a configuration of a eleventh modification of the focus detector of the embodiment of this invention.

As can be seen from FIG. 19, a field mask 541 is disposed in the vicinity of a position which is equivalent to the focal plane 1 with respect to the optical path from the optical lens system 201. The field mask 541 restricts the light flux which pass through the optical lens system 201 and enters into the focal position detector 140. The field mask 541 has five openings 541a to 541e corresponding to islands of a sensor units described below.

A condenser lens 542 is disposed behind the field mask 541. The condenser lens 542 has five regions 542a to 542e corresponding to the openings 541a to 541e of the field mask 541. A mirror 543 is disposed behind the condenser lens 542. The mirror 543 reflects the light flux passing through the field mask 541 and the condenser lens 542 to the sensor unit including an aperture mask 544, a reforming lens array 545 and a sensor chip 546. The field mask 541, the condenser lens 542, the mirror 543, the aperture mask 544, the reforming lens array 545 and the sensor chip 546 are integrated in one body for forming a module.

Figure 20:
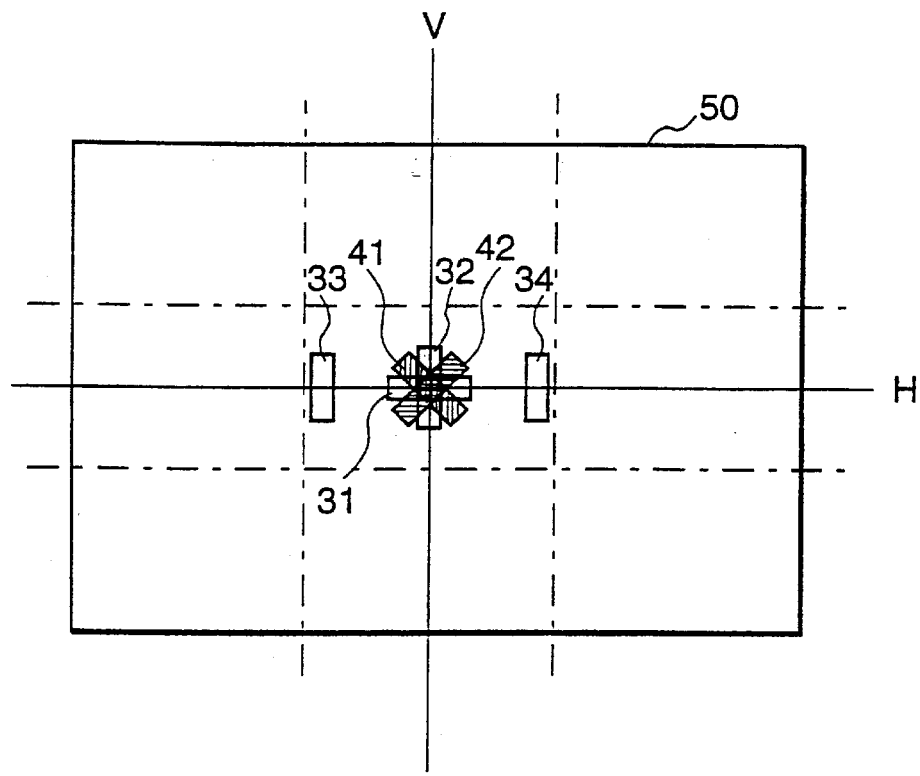
FIG. 20 is a front view for showing an arrangement of focusing areas in the eleventh modification.

Focusing areas in the eleventh modification are shown in FIG. 20. The focus detector 140 in accordance with the eleventh modification has first to sixth focusing areas 31 to 34, 41 and 42. Focusing areas 31 and 32 forming a first cross focusing sensor and focusing areas 41 and 42 forming a second cross focusing sensor are disposed in the center portion of the frame 50. The focusing areas 31 and 32 are respectively disposed on a lateral line H and a longitudinal line V. The focusing areas 41 and 42 are respectively disposed so as to cross the lateral line H or the longitudinal line V at 45 degrees. Further, zones 33 and 34 are disposed symmetrical and parallel to the longitudinal line V.

The focusing areas 31 to 34 with respect to the first focusing sensor group are disposed in a region where light flux passing through a pupil of an optical lens system having a first predetermined F-number such as F6.7 reaches. The first focusing sensors corresponding to the focusing areas 31 and 32 are used for focusing an object or a portion of an object positioned in the center portion of the frame 50. The first focusing sensors corresponding to the focusing areas 33 and 34 are used for focusing an object or a portion of an object positioned distant from the center of the frame 50. The first focusing sensor corresponding to the focusing areas 31 to 34 with respect to the first focusing sensor group are always used for focus detection without reference to the F-number of the optical lens system 201 of the mounted interchangeable lens 200. On the other hand, the second focusing sensors corresponding to the focusing areas 41 and 42 included in the second focusing sensor group are used for the focus detection when the F-number of the optical lens system 201 is equal to re smaller than a second predetermined F-number such as F2.8. As can be seen from FIG. 20, the focusing areas 31 to 34, 41 and 42 are disposed in the center rectangular region of nine rectangular regions shown by one dotted chain lines which are formed by trisecting the frame 50 in both of the lateral and longitudinal directions.

Figure 21:
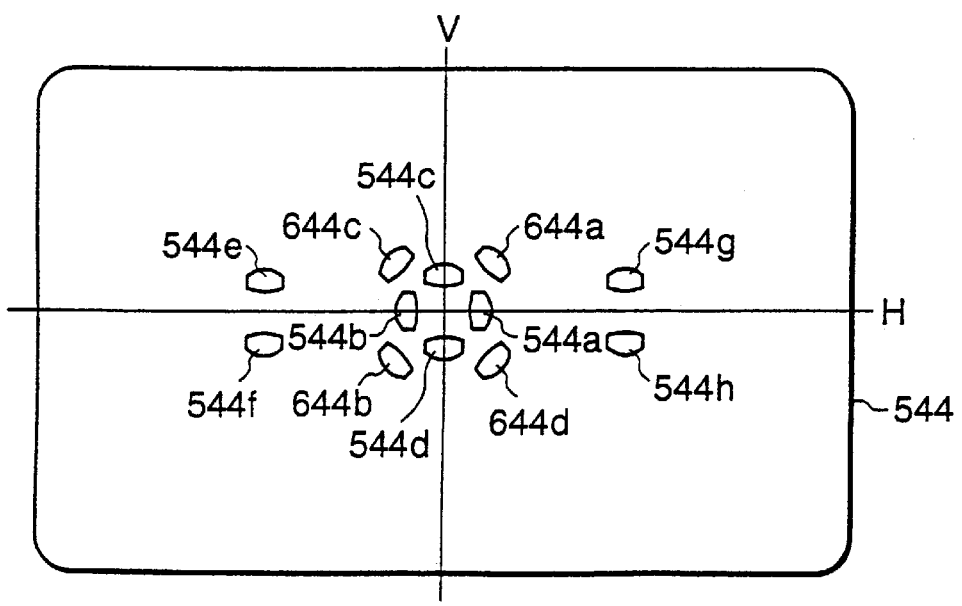
FIGS. 21, 22 and 23 are respectively front views showing the details of an aperture mask, a reforming lens array and a sensor in the eleventh modification.
Figure 22:
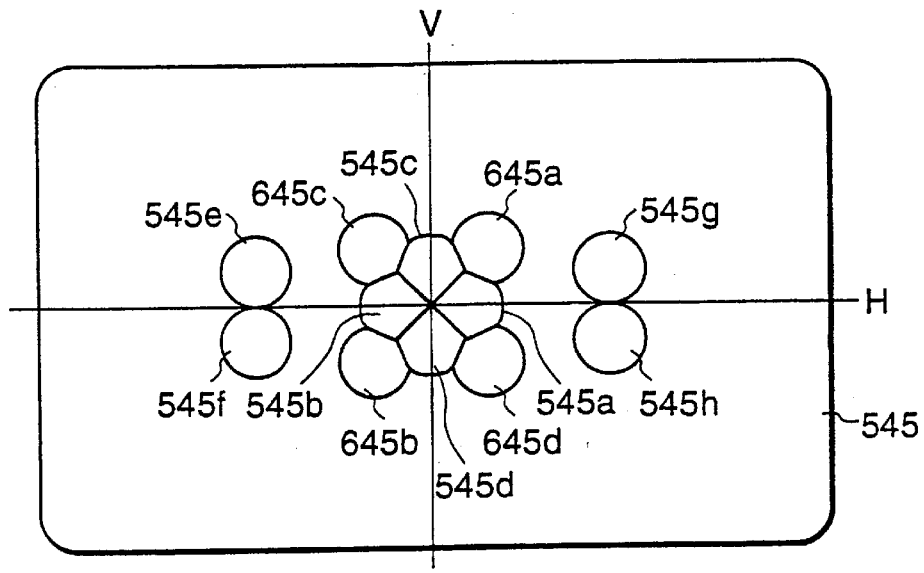
Figure 23:
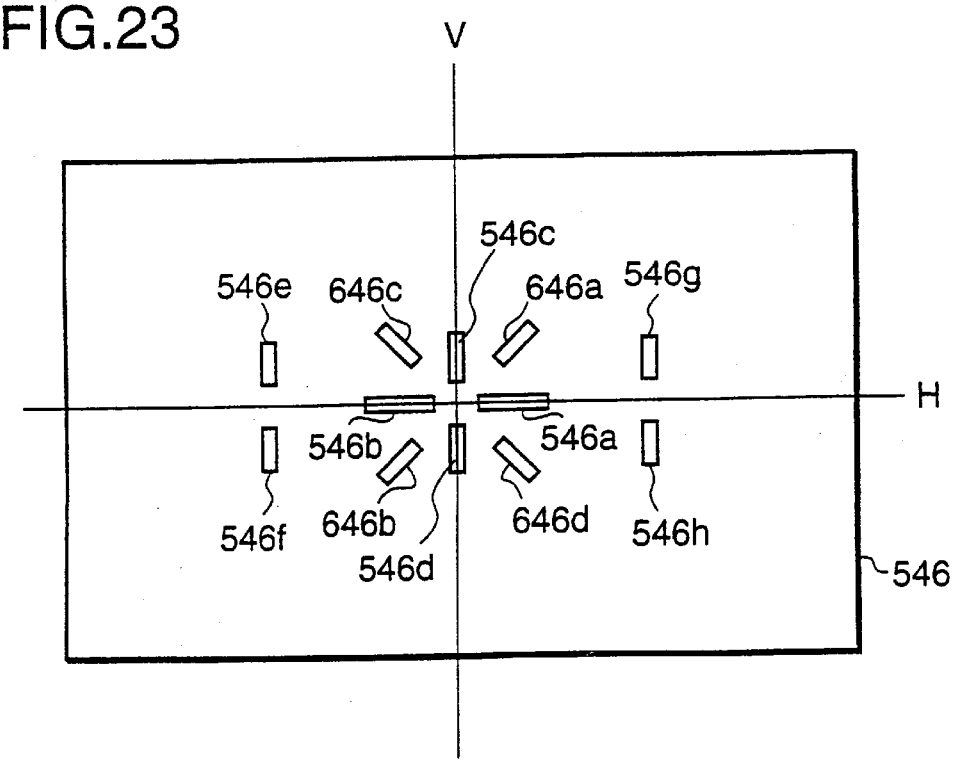

Details of the aperture mask 544, the reforming lens array 545 and the sensor chip 546 are respectively shown in FIGS. 21, 22 and 23. As can be seen from FIG. 23, two pairs of photoelectric transfer device arrays 546a and 546b, 546c and 546d forming the first cross focusing sensor corresponding to the focusing areas 31 and 32 included in the first focusing sensor group are respectively disposed symmetrical with reference to the longitudinal line V and the lateral line H on a substrate of the sensor 546. Two pairs of photoelectric transfer device arrays 646a and 646b, 646c and 646d forming the second cross focusing sensor corresponding to the focusing areas 41 and 42 included in the second focusing sensor group are respectively disposed symmetrical with reference to the center of the substrate of the sensor 546 and disposed on lines crossing the longitudinal line V or the lateral line H at 45 degrees. Furthermore, two pairs of photoelectric transfer device arrays 546e and 546f, 546g and 546h corresponding to the focusing areas 33 and 34 are respectively disposed symmetrical with reference to the longitudinal line V and the lateral line H on a substrate of the sensor 546.

Corresponding to the arrangement of the photoelectric transfer device arrays 546a to 546h and 246a to 246d, openings 544a to 546h and 644a to 644d of the aperture mask 544 and reforming lenses 545a to 545h and 645a to 645d of the reforming lens array 545 are also symmetrically oriented with reference to the lateral line H or the longitudinal line V.

As can be seen from FIG. 22, the reforming lenses 545a to 545d corresponding to the photoelectric transfer device arrays 546a to 546d forming the first cross focusing sensor are radially disposed on the lateral line H and the longitudinal line V symmetrical with respect to the center of the frame. The reforming lenses 645a to 645d corresponding to the photoelectric transfer device arrays 646a to 646d forming the second cross focusing sensor are radially disposed on the lines crossing the lateral line H or the longitudinal line V at 45 degrees and outside of the reforming lenses 545a to 545d. The reforming lenses 545a to 545h and 645a to 645d are integrally formed by, for example, resin molding or compression of glass material.

Figure 24:
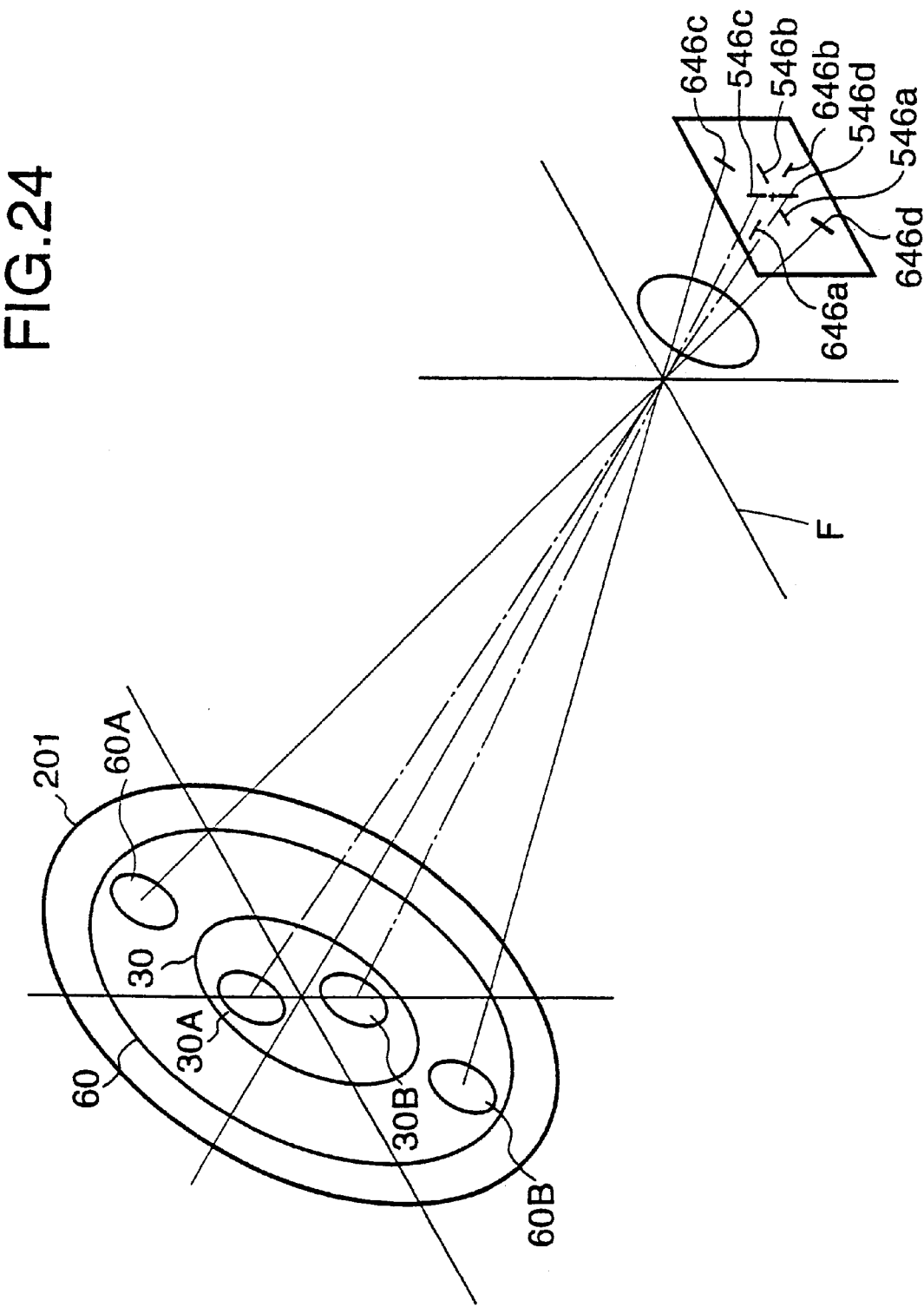
FIG. 24 is a perspective view showing a condition that the light flux passing through the pupil of the optical lens system reach to the sensor in the eleventh modification.

FIG. 24 shows a condition for which the light flux passing through the pupil of the optical lens system 201 reaches to the sensor chip 546. The field mask 541, the mirror 543, the aperture mask 544 and the reforming lens array 545 are not shown in FIG. 24. F designates the equivalent focal plane or film surface in FIG. 24.

Light fluxes 30A and 30B which are emitted from an object or a potion of the object in random directions and passing through the first circular region 30 of the pupil of the optical lens system 201 move along the optical paths shown by dotted chain lines and reach to the photoelectric transfer device arrays 546c and 546d corresponding to the focusing area 32 included in the first focusing sensor group shown in FIG. 20. However, the light flux 30A and 30B cannot reach the photoelectric transfer device arrays 646a to 646d of the second cross focusing sensor corresponding to the focusing areas 41 and 42 included in the second focusing sensor group due to the vignetting of the optical lens system 201. Light flux 60A and 60B passing outside the first circular region 30 and inside the second circular region 60 moves along the optical paths shown by solid lines and reach the photoelectric transfer device arrays 646a to 646d of the second cross focusing sensor. The light fluxes 40A and 40B reach the photoelectric transfer device arrays 546a to 546d of the first cross focusing sensor also.

Thus, when the F-number of the optical lens system 201 is larger than the first predetermined F-number such as F2.8, the second cross focusing sensor corresponding to the focusing areas 41 and 42 cannot detect the focus of the optical lens system 201. On the other hand, when the F-number of the optical lens system 201 is equal to or smaller than the first predetermined F-number such as F2.8, the second cross focusing sensor corresponding to the focusing areas 41 and 42 can detect the focus of the optical lens system 201.

As can be seen from FIGS. 23 and 53, the photoelectric transfer device arrays 646a to 646d which constitute the second cross focusing sensor corresponding to the focusing areas 41 and 42 included in the second focusing sensor group are disposed largely distant from the center of the frame than the photoelectric transfer device arrays 546a to 546d which constitute the first cross focusing sensor corresponding to the focusing areas 31 and 32 included in the first focusing sensor group. In other words, the base length of the second cross focusing sensor is longer than that of the first cross focusing sensor, so that the focusing accuracy of the second cross focusing sensor is higher than that of the first cross focusing sensor.

Thus, when the F-number of the optical lens system 201 is equal to or smaller than the second predetermined F-number such as F2.8, at least the object or the portion of the object positioned in the center portion of the frame can be focused by using the second cross focusing sensor having the higher focusing accuracy, so that the preferable focusing responding to the F-number of the optical lens system 201 can be executed.

A twelfth modification of the focus detector 140 is described with reference to FIGS. 25 to 28. Explanation of the elements in common with the above-mentioned eleventh modification is omitted.

Figure 25:
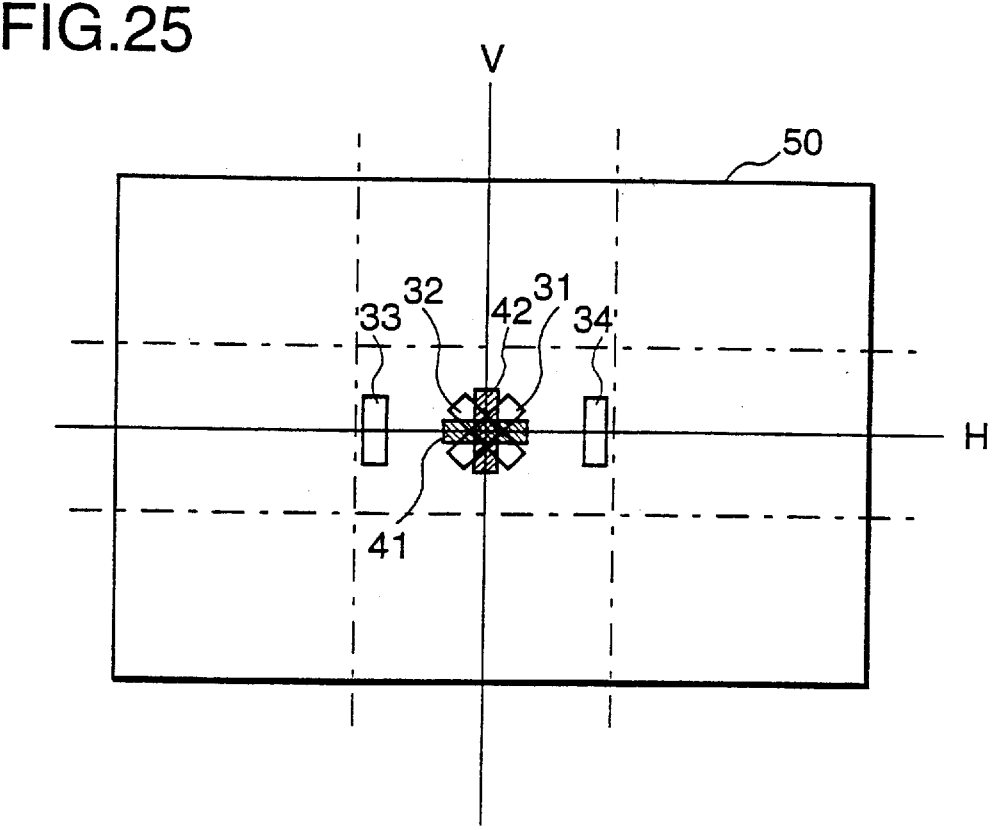
FIG. 25 is a front view for showing an arrangement of focusing areas in a twelfth modification of the focus detector of the embodiment of this invention.

As can be seen from FIG. 25, the focusing areas 31 and 32 forming the first cross focusing sensor are respectively disposed so as to cross the lateral line H or the longitudinal line V at 45 degrees in the center portion of the frame. The focusing areas 41 and 42 forming the second cross focusing sensor are respectively disposed on a lateral line H and a longitudinal line V in the center portion of the frame.

Figure 26:
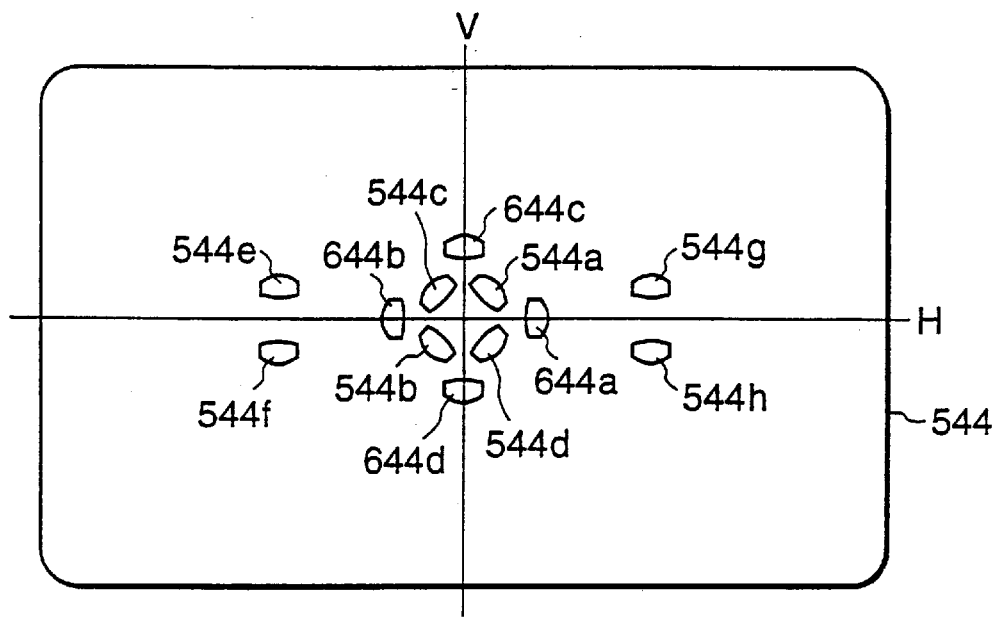
FIGS. 26, 27 and 28 are respectively front views showing the details of an aperture mask, a reforming lens array and a sensor in the twelfth modification.
Figure 27:
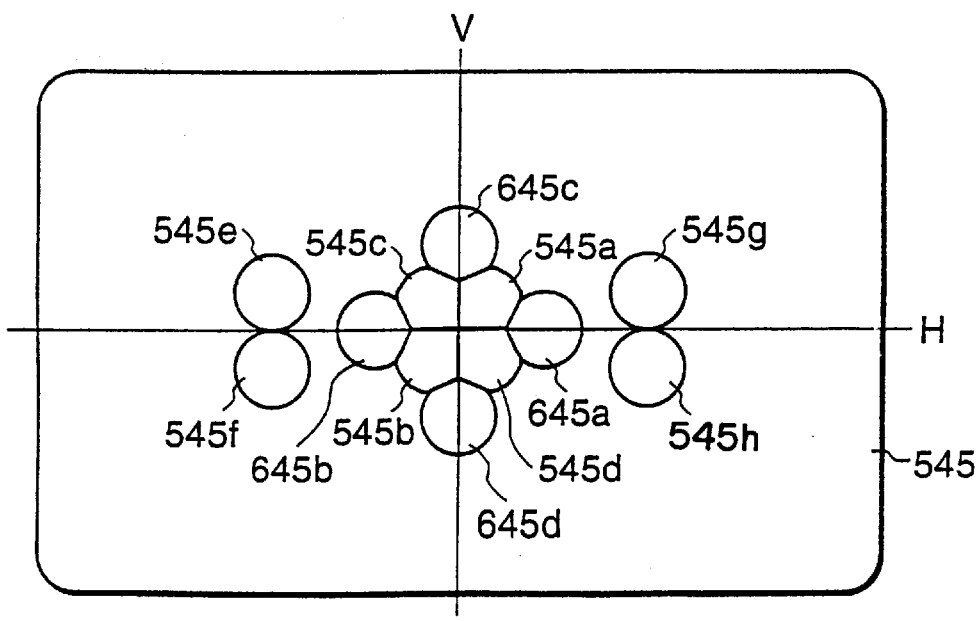
Figure 28:
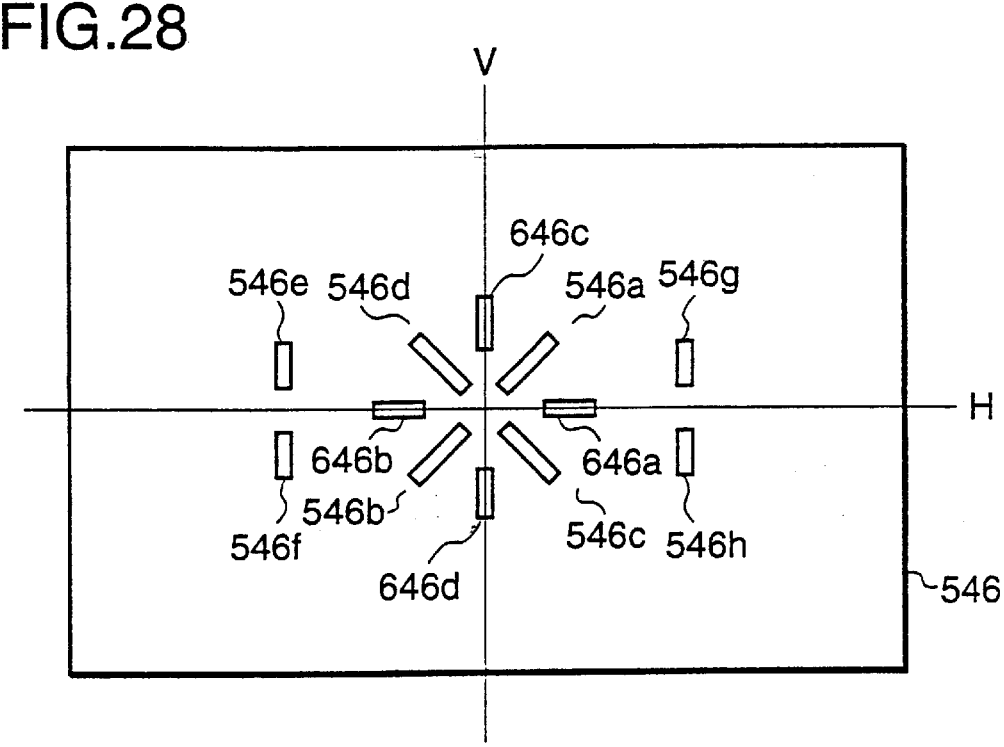

Details of the aperture mask 544, the reforming lens array 545 and the sensor chip 546 are respectively shown in FIGS. 26, 27 and 28. As can be seen from FIG. 28, two pairs of photoelectric transfer device arrays 646a and 646b, 646c and 646d forming the second cross focusing sensor corresponding to the focusing areas 41 and 42 are respectively disposed symmetrical with reference to the longitudinal line V and the lateral line H on a substrate of the sensor 546. Two pairs of photoelectric transfer device arrays 546a and 546b, 546c and 546d forming the first cross focusing sensor corresponding to the focusing areas 31 and 32 are respectively disposed symmetrical with reference to the center of the substrate of the sensor chip 546 and disposed on lines crossing the longitudinal line V or the lateral line H at 45 degrees. Furthermore, two pairs of photoelectric transfer device arrays 546e and 546f, 546g and 546h corresponding to the focusing areas 33 and 34 are respectively disposed symmetrical with reference to the longitudinal line V and the lateral line H on a substrate of the sensor chip 546.

Corresponding to the arrangement of the photoelectric transfer device arrays 546a to 546h and 646a to 646d, openings 544a to 646h and 644a to 644d of the aperture mask 544 and reforming lenses 545a to 545h and 645a to 645d of the reforming lens array 545 are also symmetrically formed with reference to the lateral line H or the longitudinal line V.

A thirteenth modification of the focus detector 140 is described with reference to FIGS. 29 to 32. Explanation of the elements in common with the above-mentioned eleventh modification is omitted.

Figure 29:
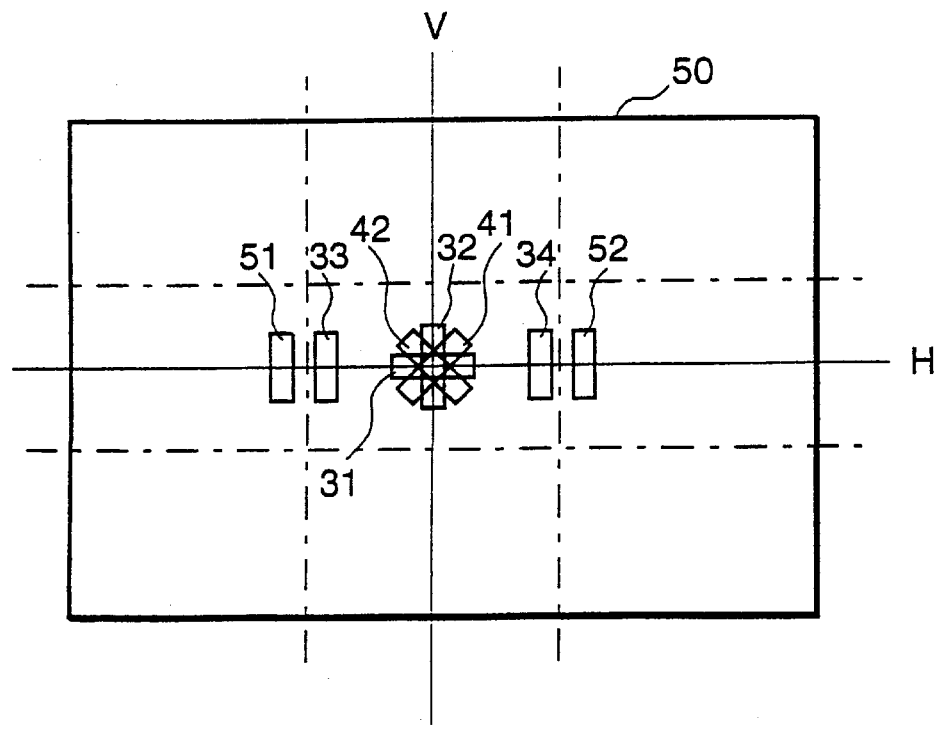
FIG. 29 is a front view for showing an arrangement of focusing areas in a thirteenth modification of the focus detector of the embodiment of this invention.

As can be seen from FIG. 29, the thirteenth modification further includes third focusing sensors corresponding to focusing areas 51 and 52 included in a third group disposed outside the focusing areas 33 and 34 included in the first focusing group so as to focusing an object or a portion of an object positioned further distant from the center of the frame.

Figure 30:
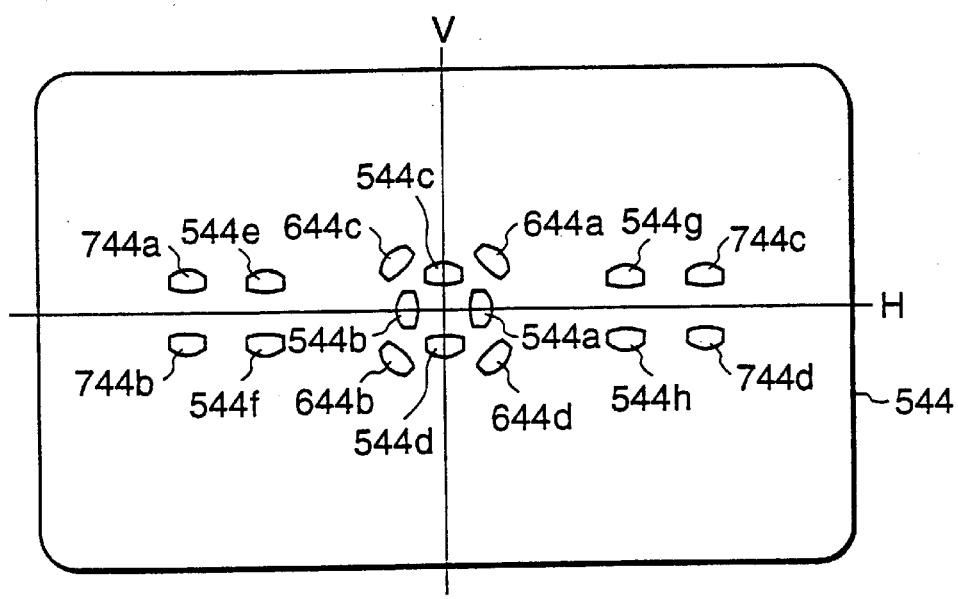
FIGS. 30, 31 and 32 are respectively front views showing the details of an aperture mask, a reforming lens array and a sensor in the thirteenth modification.
Figure 31:
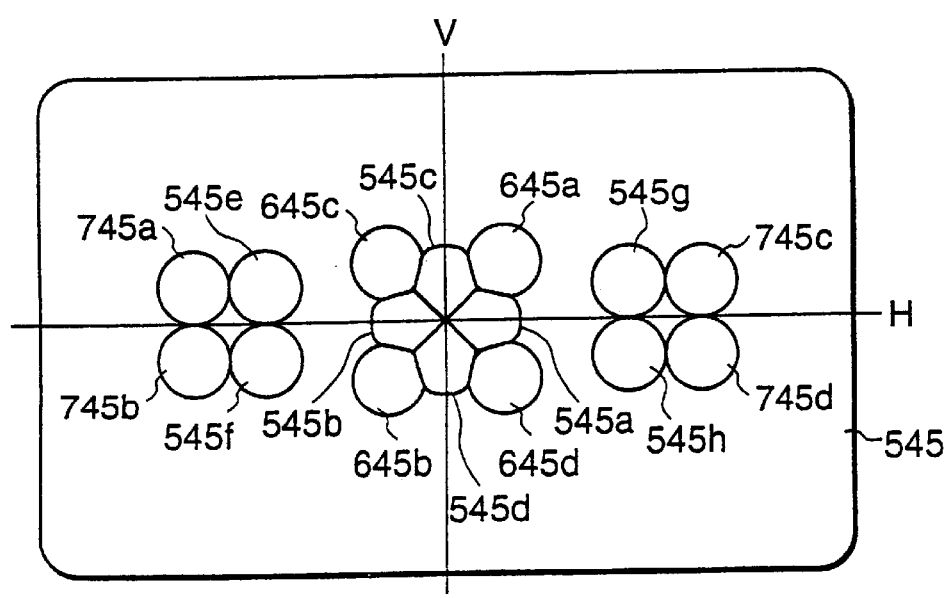
Figure 32:
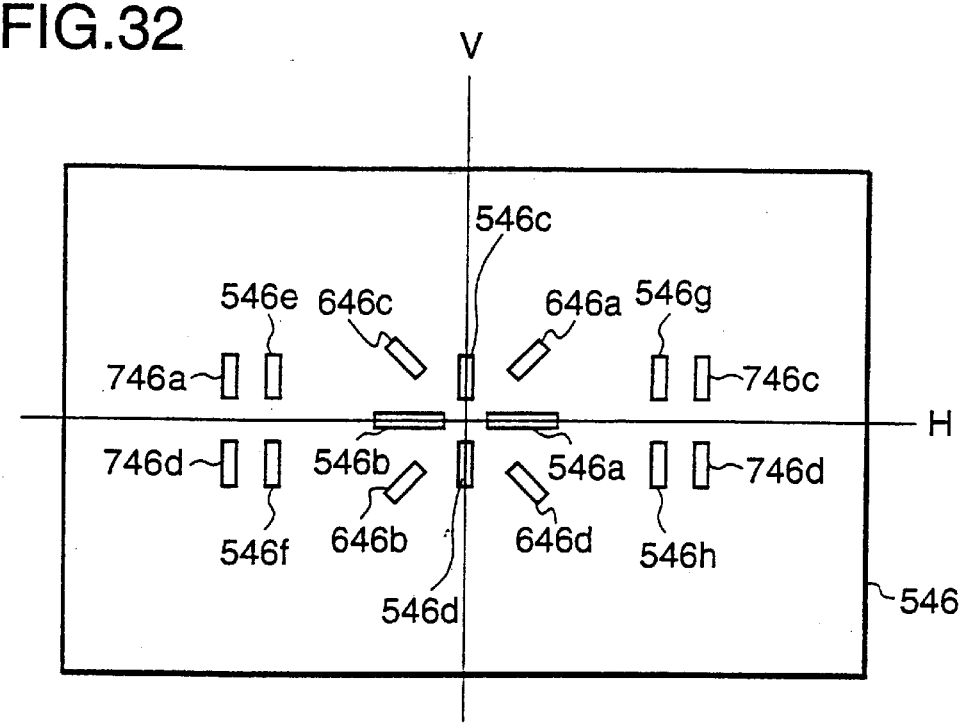

Details of the aperture mask 544, the reforming lens array 545 and the sensor chip 546 are respectively shown in FIGS. 30, 31 and 32. As can be seen from these figures, openings 744a to 744d of the aperture mask 544, reforming lenses 745a to 745d of the reforming lens array 545, photoelectric transfer device arrays 746a to 746d of the sensor chip 546 which constitute the third focusing sensors corresponding to the focusing areas 51 and 52 included in the third group are provided.

With respect to the focusing areas 51 and 52 with respect to the third group, the following three cases can be considered. First, the focusing areas 51 and 52 are disposed in a region where the light flux passing through the pupil (first circular region 30, see FIG. 24) of the optical lens system 201 having the first predetermined F-number such as F6.7 reaches. In the first case, the focus detection or focusing can be executed by using the focusing sensor corresponding to the focusing areas 51 and 52 without reference to the F-number of the optical lens system 201. However, the region where the light flux passing through the pupil of the optical lens system 201 having the first predetermined F-number is relatively narrow, so that the focusing areas 51 and 52 cannot be positioned relatively so far from the center of the frame. Thus, only when the object or the portion of the object is positioned near to the center of the frame, the focusing sensors corresponding to the focusing areas 51 and 52 can be used for the focus detection or the focusing.

Second, the focusing areas 51 and 52 are disposed outside the above-mentioned region where the light flux passing through the pupil of the optical lens system having the first predetermined F-number reaches, and inside a region where the light flux passing through the pupil (second circular region 60, see FIG. 24) of the optical lens system having the second predetermined F-number such as F2.8 reaches. In the second case, the focus detection or focusing cannot be executed by using the focusing sensor corresponding to the focusing areas 51 and 52 when the F-number of the optical lens system 201 is larger than the second predetermined F-number such as F2.8. However, the region where the light flux passing through the pupil of the optical lens system having the second predetermined F-number is relatively wide, so that the focusing areas 51 and 52 can be positioned relatively distant from the center of the frame. Thus, even when the object or the portion of the object is positioned distant from the center of the frame, the focusing sensors corresponding to the focusing areas 51 and 52 can be used for the focus detection or the focusing.

Third, the focusing areas 51 and 52 are disposed outside the abovementioned region where the light flux passing through the pupil of the optical lens system having the first predetermined F-number reaches, and inside a region where the light flux passing through the pupil of the optical lens system having a third predetermined F-number such as F4 reaches. In the third case, the region where the focusing areas 51 and 52 can be disposed becomes narrower than the above-mentioned second case. However, number of the interchangeable lenses 200 which can be focused by using the focusing areas 51 and 52 increases.

In the above-mentioned explanation of the thirteenth modification, the focusing areas 51 and 52 are further added on the configuration of the eleventh modification. However, it is preferable that the focusing areas 51 and 52 be added on the configuration of the twelfth modification.

A fourteenth modification of the focus detector 140 is described with reference to FIGS. 33 to 36. Explanation of the elements in common with the above-mentioned thirteenth modification is omitted.

Figure 33:
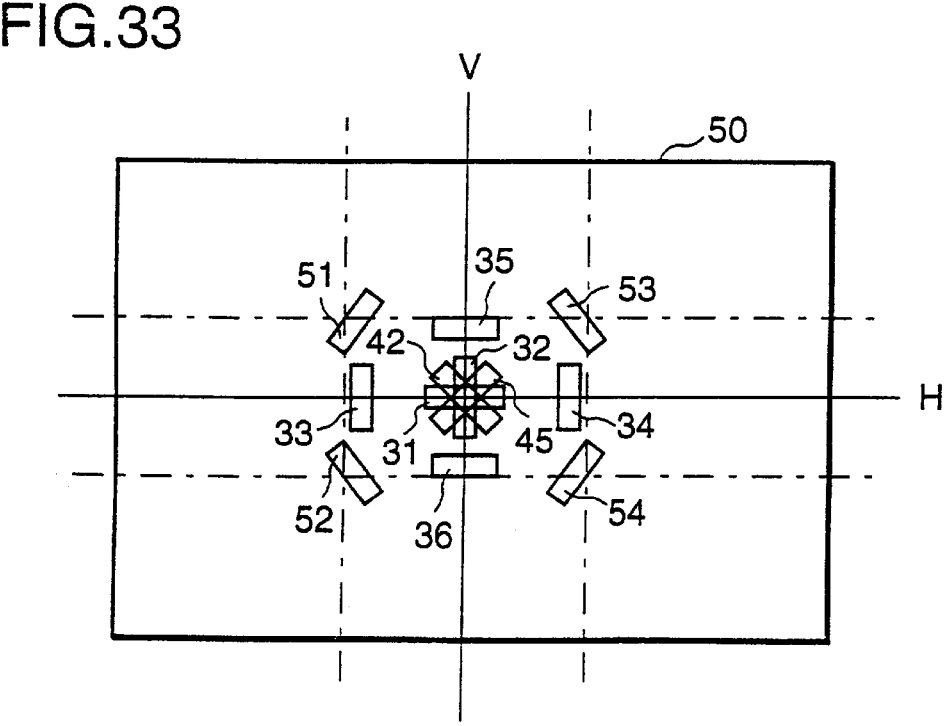
FIG. 33 is a front view for showing an arrangement of focusing areas in a fourteenth modification of the focus detector of the embodiment of this invention.

As can be seen from FIG. 33, the fourteenth modification further includes focusing sensors corresponding to focusing areas 35 and 36 with respect to the first focusing sensor group disposed parallel to the lateral line H and focusing areas 51 to 54 with respect to the third group disposed on a circle and outside the focusing areas 33 and 36 with respect to the first focusing group to focus an object or a portion of an object positioned far from the center of the frame.

Figure 34:
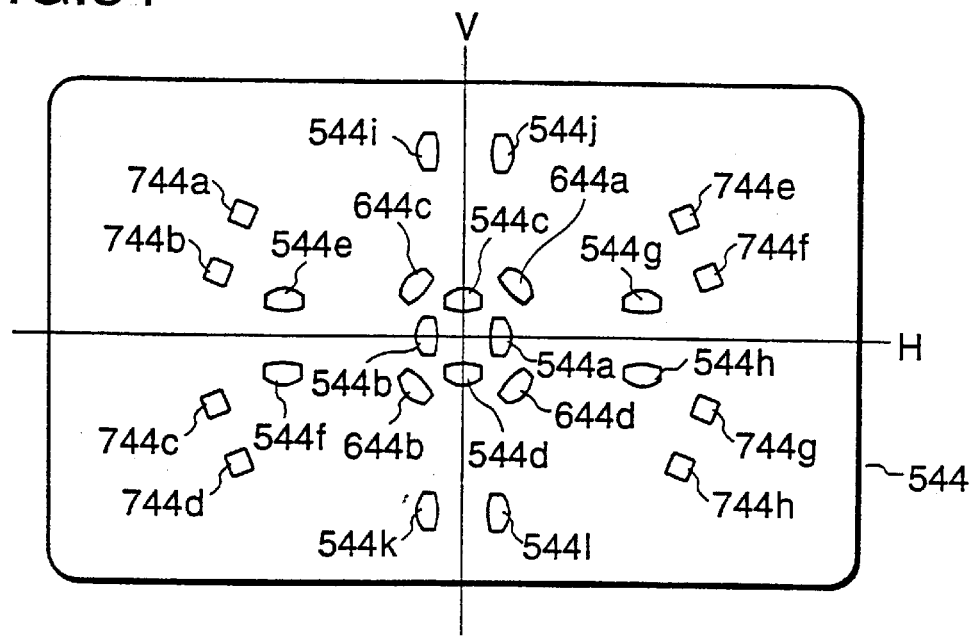
FIGS. 34, 35 and 36 are respectively front views showing the details of an aperture mask, a reforming lens array and a sensor in the fourteenth modification.
Figure 35:
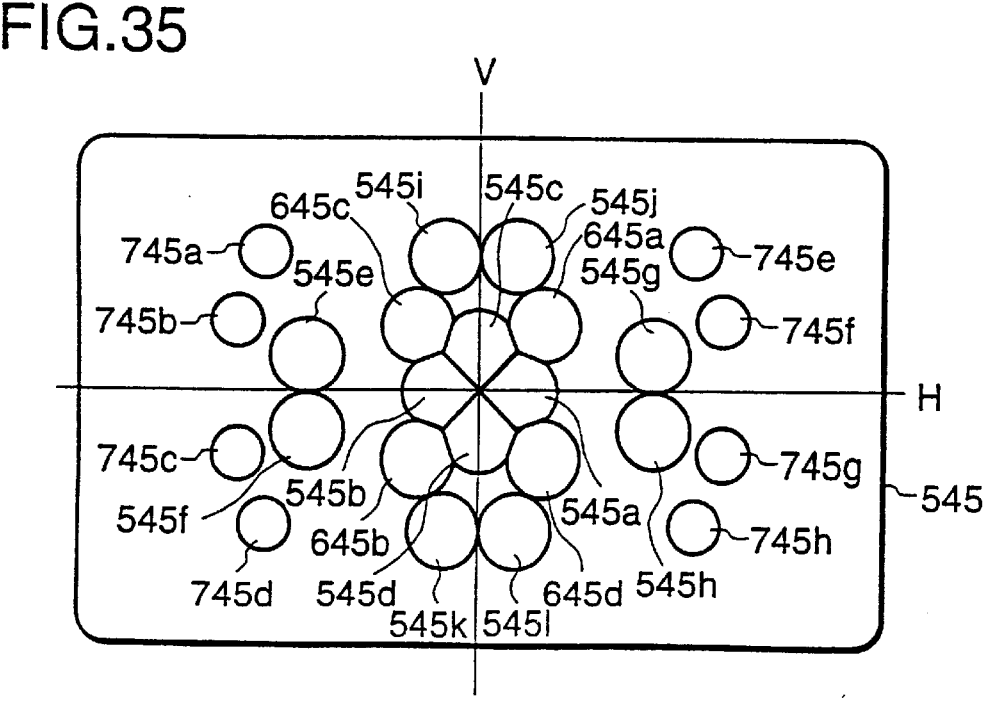
Figure 36:
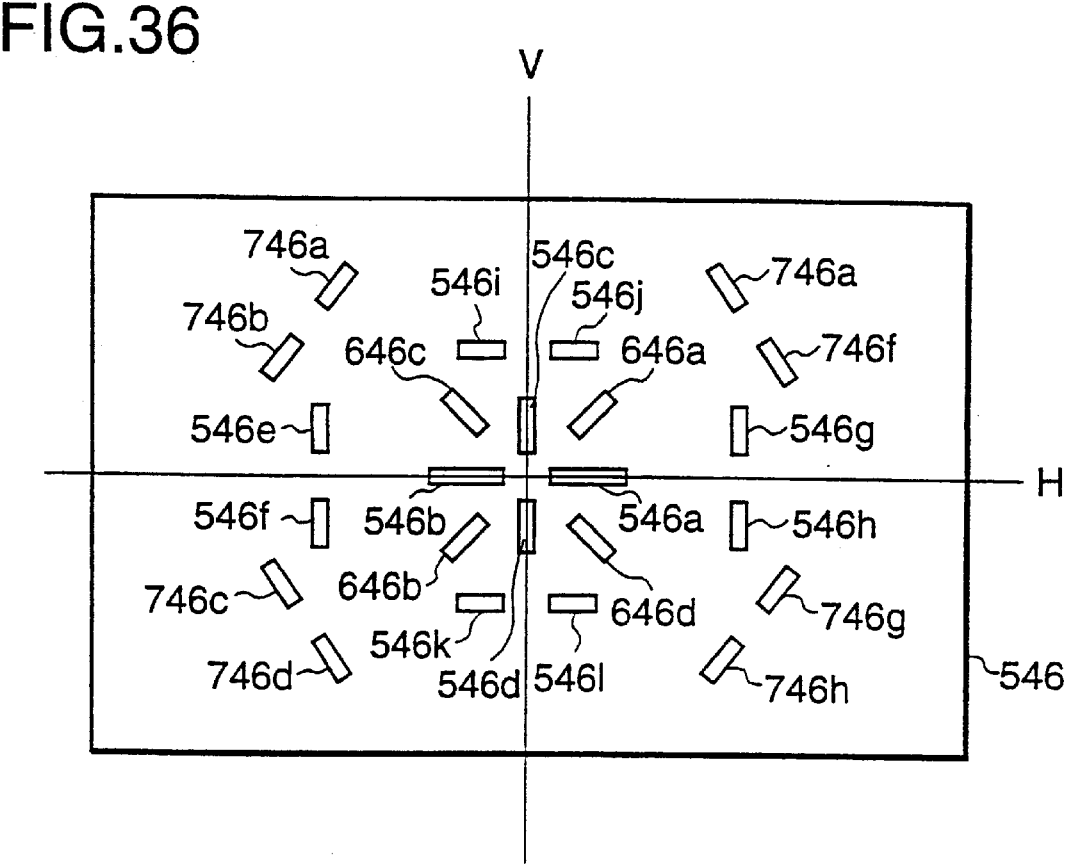

Details of the aperture mask 544, the reforming lens array 545 and the sensor chip 546 are respectively shown in FIGS. 34, 35 and 36. As can be seen from these figures, openings 544i to 544l and 744a to 744h of the aperture mask 544, reforming lenses 545i to 545l and 745a to 745h of the reforming lens array 545, photoelectric transfer device arrays 546i to 546l and 746a to 746h of the sensor chip 546 which constitute the first focusing sensors corresponding to the focusing areas 35 and 36 included in the first focusing sensor group and the third focusing sensors corresponding to the focusing areas 51 and 52 included in third group are provided.

As can be seen from FIG. 33, the focusing areas 31 to 36 with respect to the first focusing sensor group are disposed in the center rectangular region of nine rectangular regions shown by one dotted chain lines which are formed by trisecting the frame 50 in both of the lateral and longitudinal directions. It is preferable that the focusing areas 51 to 54 with respect to the third group be disposed in a manner to be one of three cases in the above-mentioned thirteenth modification.

Figure 13:
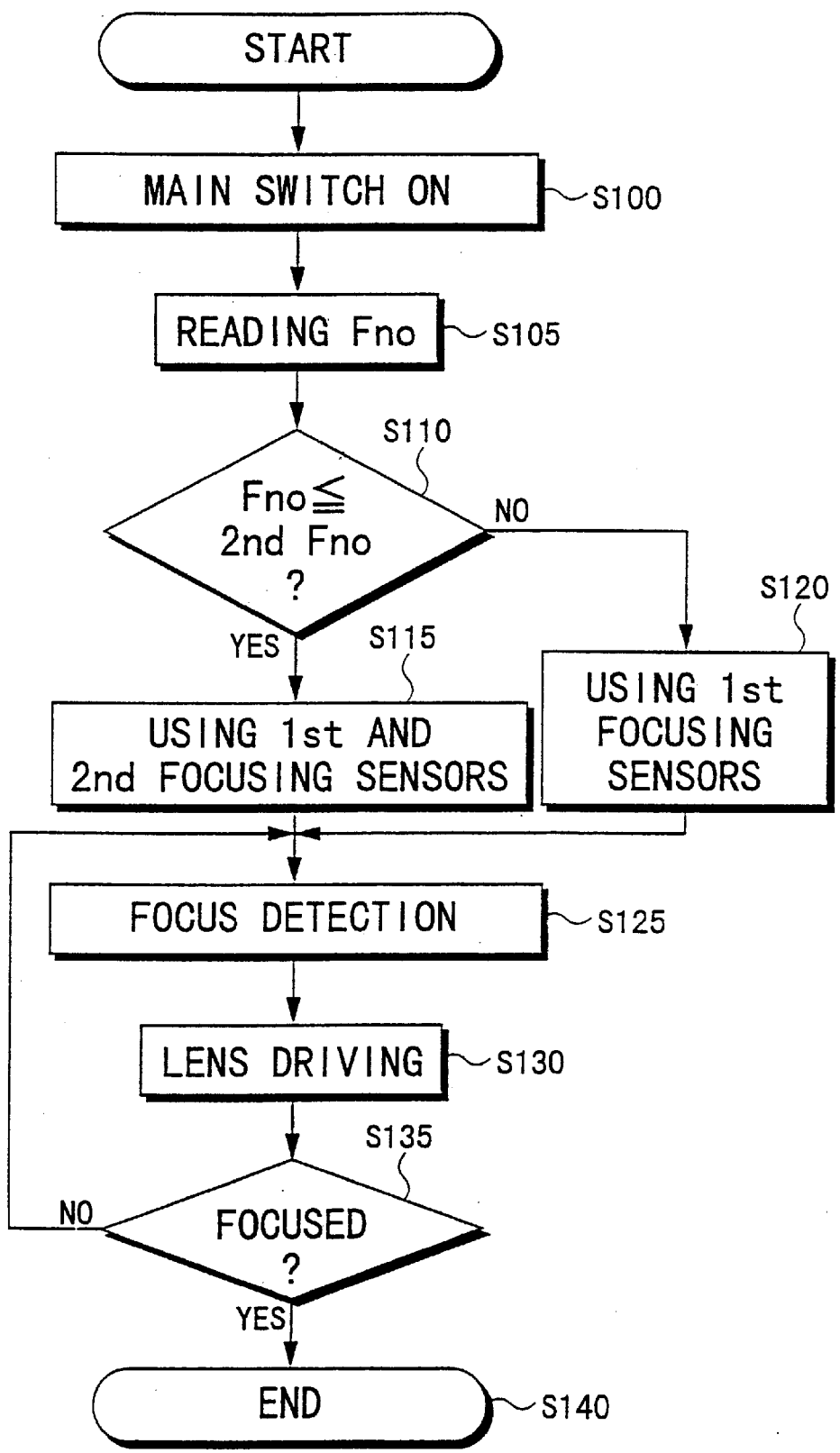
FIG. 13 is a flowchart showing an example of an operation of the AF-SLR camera using the focus detector of the embodiment of this invention.

Basically, the operation of the focus detector 140 is substantially the same as that shown in FIG. 13. However, when the base length of the focusing sensor becomes longer, the displacement of the images on the photoelectric transfer device arrays becomes larger instead of the increase of the focusing accuracy. When the number of the pixels of each photoelectric transfer device array is constant, the longer the base length of the focusing sensor becomes, the shorter the defocus which can be detected by the focusing sensor becomes. In other words, when the base length of the focusing sensor is shorter, it is necessary to repeat the focus detection and the movement of the optical lens system very often. Thus, when the interchangeable lens 200 having the optical lens system 201 with the F-number equal to or smaller than the second predetermined F-number such as F2.8 is mounted on the AF-SLR camera having a plurality of focusing sensors corresponding to first and second F-numbers such as F6.7 and F2.8, the focus detection or the focusing of the optical lens system 201 is executed by the focusing sensors having the longer base length, so that the focusing motion becomes slower. Furthermore, when the movement of the optical lens system 201 of the interchangeable lens 200 is much larger such as a long focus lens or a macro lens, the optical lens system 201 cannot be moved smoothly.

Figure 37:
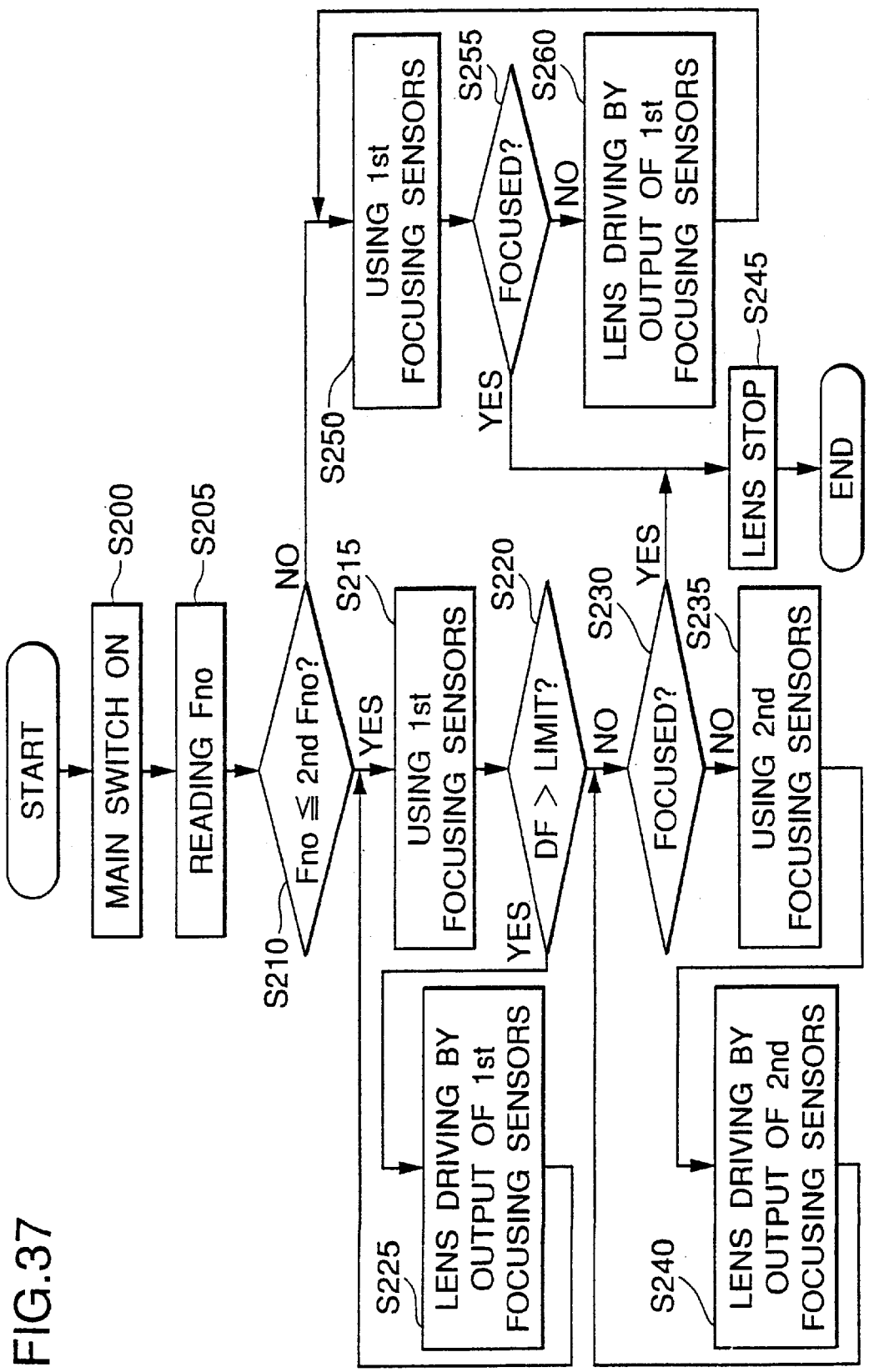
FIG. 37 is a flow chart showing another example of an operation of the AF-SLR camera using the focus detector of the embodiment of this invention.

Operation suitable for the focus detector 140 having two groups of the focusing sensors respectively having different base lengths is described with reference to a flowchart shown in FIG. 37. When the interchangeable lens 200 is mounted on the camera body 100 and a main switch of the camera is turned on (step S200), the AF-CPU 301 reads out the F-number for automatic focusing (Fno) which is memorized in the lens CPU 204 (step S205). The AF-CPU 301 judges whether the F-number for automatic focusing is equal to or smaller than the second predetermined F-number (2nd Fno) or not (step S210). When the F-number for automatic focusing is equal to or smaller than the second predetermined F-number (YES in step S210), the AF-CPU 301 detects the focus of the optical lens system 201 by using the first focusing sensors included in the first focusing sensor group and calculates the quantity of defocus DF from outputs of the focusing sensors (step S215).

Next, the AF-CPU 301 judges whether the calculated defocus DF is larger than a limit of defocus in which the defocus can be detected by the second focusing sensors included in the second focusing sensor group or not (step S220). When the defocus DF is larger than the limit of defocus (YES in step S220), the AF-CPU 301 controls the lens driving mechanism 203 in order to move the optical lens system 201 using the calculated quantity of defocus and the detected direction of the movement of the optical lens system 201 which are obtained from outputs of the first focusing sensors included in the first focusing sensor group (step S225).

When the calculated defocus DF is equal to or smaller than the limit of defocus (NO in step S220), the AF-CPU 301 judges whether the optical lens system 201 is focused on the object or not (step S230). When the optical lens system 201 is not focused (NO in step S230), the AF-CPU 301 detects the focus of the optical lens system 201 by using the second focusing sensors included in the second focusing sensor group and calculates the quantity of defocus DF from outputs of the second focusing sensors (step S235). Furthermore, the AF-CPU 301 controls the lens driving mechanism 203 in order to move the optical lens system 201 using the calculated quantity of defocus and the detected direction of the movement of the optical lens system 201 which are calculated from outputs of the second focusing sensors included in the second focusing sensor group (step S240). The AF-CPU repeats the above-mentioned steps until the optical lens system 201 is focused. When the optical lens system 201 is focused (YES in step S230), the AF-CPU 301 stops the lens driving mechanism 203 so as to finish the focusing operation (step S245) and waits the next operation such as shutter release.

On the other hand, when the F-number for automatic focusing is larger than the second predetermined F-number (NO in step S210), the AF-CPU 301 detects the focus of the optical lens system 201 by using the first focusing sensors included in the first focusing sensor group for detecting, and calculates the quantity of defocus DF from outputs of the first focusing sensors (step S250). Next, the AF-CPU 301 judges whether the optical lens system 201 is focused on the object or not (step S255). When the optical lens system 201 is not focused (NO in step S255), the AF-CPU 301 controls the lens driving mechanism 203 in order to move the optical lens system 201 using the calculated quantity of defocus and the detected direction of the movement of the optical lens system 201 which are obtained from outputs of the first focusing sensors included in the first focusing sensor group (step S260). The AF-CPU repeats the above-mentioned steps until the optical lens system 201 is focused. When the optical lens system 201 is focused (YES in step S255), the AF-CPU 301 stops the lens driving mechanism 203 so as to finish the focusing operation (step S245) and waits the next operation such as shutter release.

By such an operation, when the F-number of the optical lens system 201 is equal to or smaller than the second predetermined F-number, the focus detection and focusing of the optical lens system 201 are executed using the focusing sensors which detect defocus in larger steps, until the calculated quantity of defocus becomes smaller than the limit of defocus of the focusing sensors. Thus, the focus detection or focusing of the optical lens system 201 can be made much faster and smoother.

Figure 38:
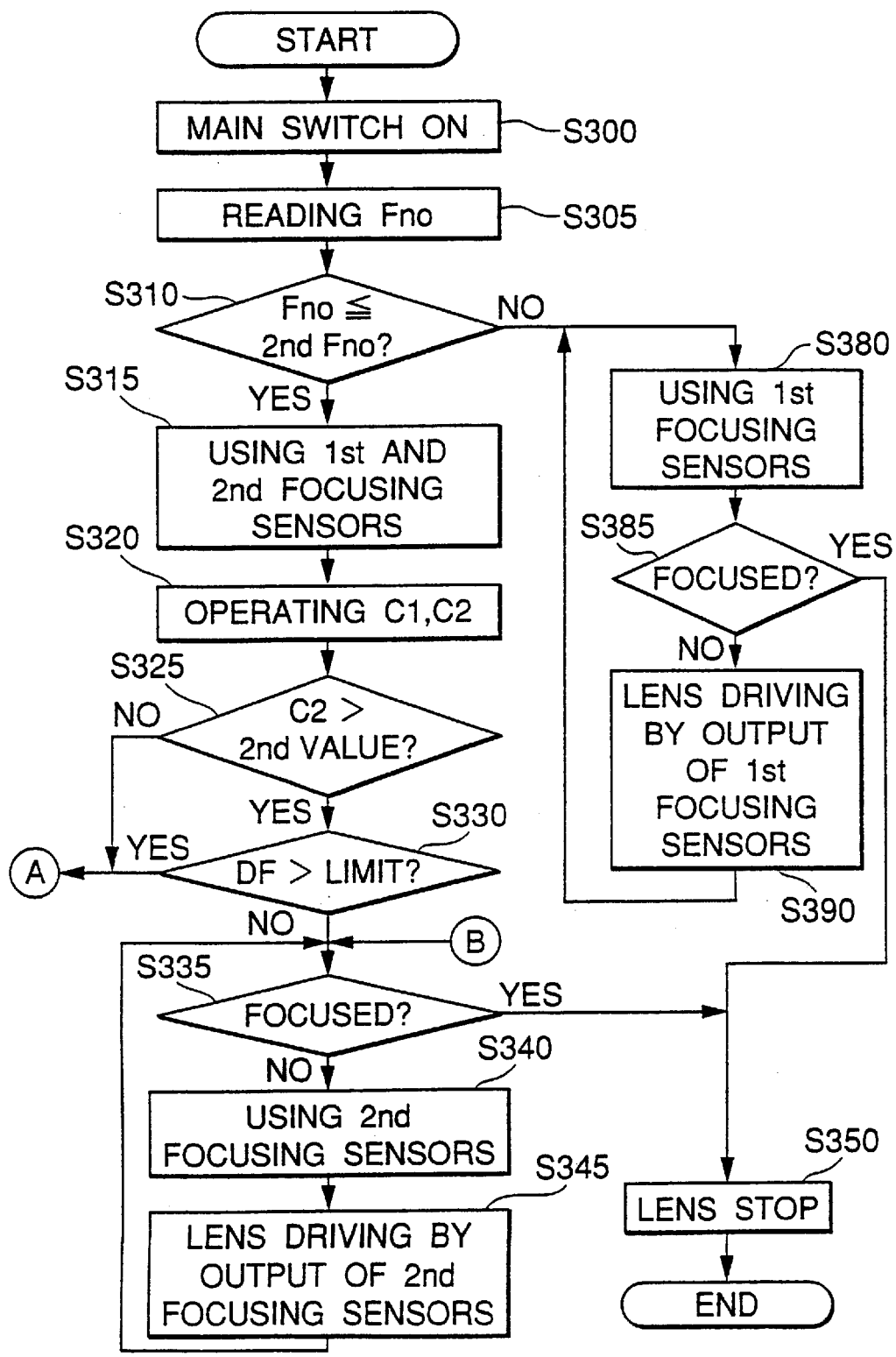
FIG. 38 is a flowchart showing still another example of an operation of the AF-SLR camera using the focus detector of the embodiment of this invention.
Figure 39:
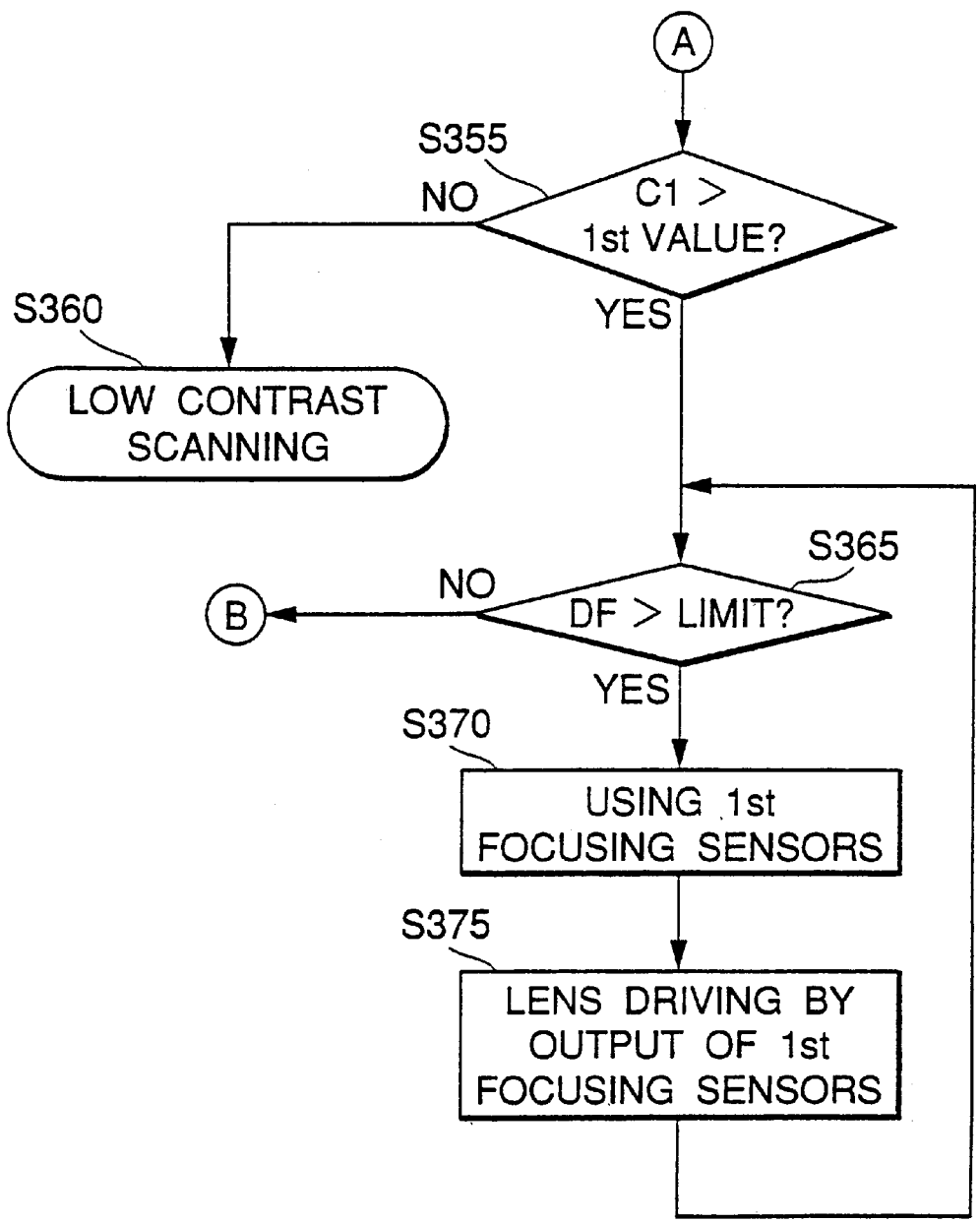
FIG. 39 is a continuation of the flowchart of FIG. 38.
Figure 40:
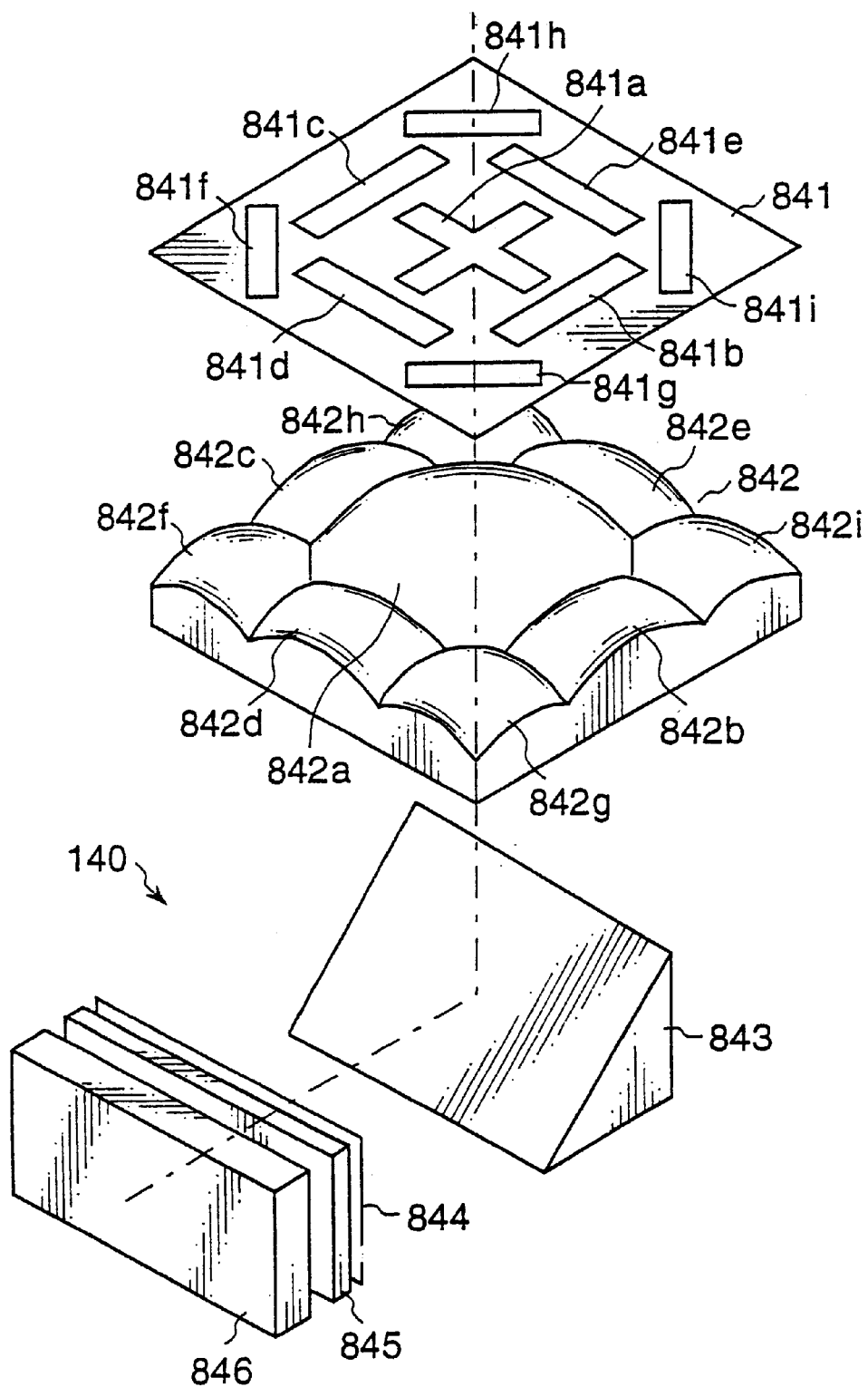
FIG. 40 is a perspective view showing a configuration of a fifteenth modification of the focus detector of the embodiment of this invention.

Another operation suitable for the focus detector 140 having two groups of the focusing sensors respectively having different base length is described with reference to a flowchart shown in FIGS. 38 and 39. When the interchangeable lens 200 is mounted on the camera body 100 and a main switch of the camera is turned on (step S300), the AF-CPU 301 reads out the F-number for automatic focusing (Fno) which is memorized in the lens CPU 204 (step S305). The AF-CPU 301 judges whether the F-number for automatic focusing is equal to or smaller than the second predetermined F-number (2nd Fno) or not (step S310). When the F-number for automatic focusing is equal to or smaller than the second predetermined F-number (YES in step S310), the AF-CPU 301 detects the focus of the optical lens system 201 by using all the first and second focusing sensors included in the first and second focusing sensor groups and calculates the quantity of defocus DF from outputs of all the focusing sensors (step S315).

Furthermore, the AF-CPU 301 calculates contrasts C1 and C2 of the images on the first and second focusing sensors included in the first and second focusing sensor groups by using the output of all the focusing sensors (step S320). The AF-CPU 301 judges whether the contrast C2 of the image on the second focusing sensor of second focusing sensor group is higher than a second predetermined value (2nd value) or not (step S325). When the contrast C2 is higher than the second predetermined value (YES in step S325), the AF-CPU 301 further judges whether the calculated defocus DF is larger than a limit of defocus in which the defocus can be detected by the second focusing sensors included in the second focusing sensor group or not (step S330).

When the contrast C2 of the image on the second focusing sensors included in the second focusing sensor group is higher than the second predetermined value and the calculated defocus DF is smaller than the limit of defocus (NO in step 330), the focus of the optical lens system 201 coincides with the object or positions near to the object. Thus, the AF-CPU 301 judges whether the optical lens system 201 is focused or not by using the outputs of the second focusing sensors included in the second focusing sensor group (step S335). When the optical lens system 201 is not focused (NO in step S335), the AF-CPU 301 detects the focus of the optical lens system 201 by using the second focusing sensors included in the second focusing sensor group, and calculates the quantity of defocus DF from outputs of the second focusing sensors included in the second focusing sensor group (step S340). Furthermore, the AF-CPU 301 controls the lens driving mechanism 203 in order to move the optical lens system 201 using the calculated quantity of defocus and the detected direction of the movement of the optical lens system 201 which are obtained from outputs of the second focusing sensors included in the second focusing sensor group (step S345). The AF-CPU repeats the above-mentioned steps until the optical lens system 201 is focused. When the optical lens system 201 is focused (YES in step S335), the AF-CPU 301 stops the lens driving mechanism 203 so as to finish the focusing operation (step S350) and waits the next operation such as shutter release.

When the contrast C2 is equal to or smaller than the second predetermined value (NO in step S325) and when the calculated defocus DF is equal to or larger than the limit of defocus (YES in step 330), the AF-CPU 301 judges whether the contrast C1 of the image on the first focusing sensor included in the first focusing sensor group is higher than a first predetermined value or not (step S355). When the contrast C1 is equal to or smaller than a first predetermined value (NO in step S355), the object cannot be focused by not only the first focusing sensors included in the first focusing sensor group but also the second focusing sensors included in the second focusing sensor group, so that the AF-CPU 301 executes a low contrast scanning which moves the optical lens system 201 in a direction to the infinity or to the most closest position with detecting the focus (step S360).

When the contrast C1 is higher than the second predetermined value (YES in step S355), it is possible to detect the focus of the optical lens system 201 by using the first focusing sensors included in the first focusing sensor group. Thus, the AF-CPU 301 further judges whether the calculated defocus DF is larger than the limit of defocus in which the defocus can be detected by the first focusing sensor included in the first focusing sensor group or not (step S365). When the defocus DF is larger than the limit of defocus (YES in step S365), the AF-CPU 301 detects the focus of the optical lens system 201 by using the first focusing sensors included in the first focusing sensor group, and calculates the quantity of defocus DF from outputs of the first focusing sensors included in the first focusing sensor group (step S370). Furthermore, the AF-CPU 301 controls the lens driving mechanism 203 in order to move the optical lens system 201 using the calculated quantity of defocus and the detected direction of the movement of the optical lens system 201 which are obtained from outputs of the first focusing sensors included in the first focusing sensor group (step S375). The AF-CPU repeats the above-mentioned steps for the optical lens system 201 until the calculated defocus DF becomes smaller than the limit of defocus.

When the calculated defocus DF becomes equal to or smaller than the limit of defocus (NO in step S365), the focus of the optical lens system 201 coincides with the object or positions near to the object and it is possible to detect the focus of the optical lens system 201 by using the second focusing sensors included in the second focusing sensor group. Thus, the AF-CPU 301 jumps to the step S335 and judges whether the optical lens system 201 is focused or not by using the outputs of the second focusing sensors included in the second focusing sensor group (step S335). The following operation s are the same as those in steps S340 to S350.

On the other hand, when the F-number for automatic focusing is larger than the second predetermined F-number (NO in step S310), the AF-CPU 301 detects the focus of the optical lens system 201 by using the first focusing sensors included in the first focusing sensor group, and calculates the quantity of defocus DF from outputs of the first focusing sensors included in the first focusing sensor group (step S380). Next, the AF-CPU 301 judges whether the optical lens system 201 is focused on the object or not (step S385). When the optical lens system 201 is not focused (NO in step S385), the AF-CPU 301 controls the lens driving mechanism 203 in order to move the optical lens system 201 using the calculated quantity defocus and the detected direction of the movement of the optical lens system 201 which are obtained from outputs of the first focusing sensors included in the first focusing sensor group (step S390). The AF-CPU repeats the above-mentioned steps until the optical lens system 201 is focused. When the optical lens system 201 is focused (YES in step S385), the AF-CPU 301 stops the lens driving mechanism 203 so as to finish the focusing operation (step S350) and waits the next operation such as shutter release.

By such an operation, when the focus of the optical lens system 201 coincides with or positions near to the object, the focus detector can detect the focus of the optical lens system 201 by using the second focusing sensors included in the second focusing sensor group directly without using the first focusing sensor included in the first focusing sensor group. Thus, the focus detection or focusing of the optical lens system 201 can be made much faster and smoother.

A fifteenth modification of the focus detector 140 is described with reference to FIGS. 40 to 45. As can be seen from FIG. 40, a field mask 841 is disposed in the vicinity of a position which is equivalent to the focal plane 1 with respect to the optical path from the optical lens system 201. The field mask 841 restricts the light flux which pass through the optical lens system 201 and enter into the focal position detector 140. The field mask 841 has nine openings 841a to 841i corresponding to islands of a sensor units described below.

A condenser lens 842 is disposed behind the field mask 841. The condenser lens 842 has nine regions 842a to 842i corresponding to the openings 841a to 841i of the field mask 841. A mirror 843 is disposed behind the condenser lens 842. The mirror 843 reflects the light flux passing through the field mask 841 and the condenser lens 482 to the sensor unit including an aperture mask 844, a reforming lens array 845 and a sensor chip 846. The field mask 841, the condenser lens 842, the mirror 843, the aperture mask 844, the reforming lens array 845 and the sensor chip 846 are integrated in one body forming a module.

Figure 41:
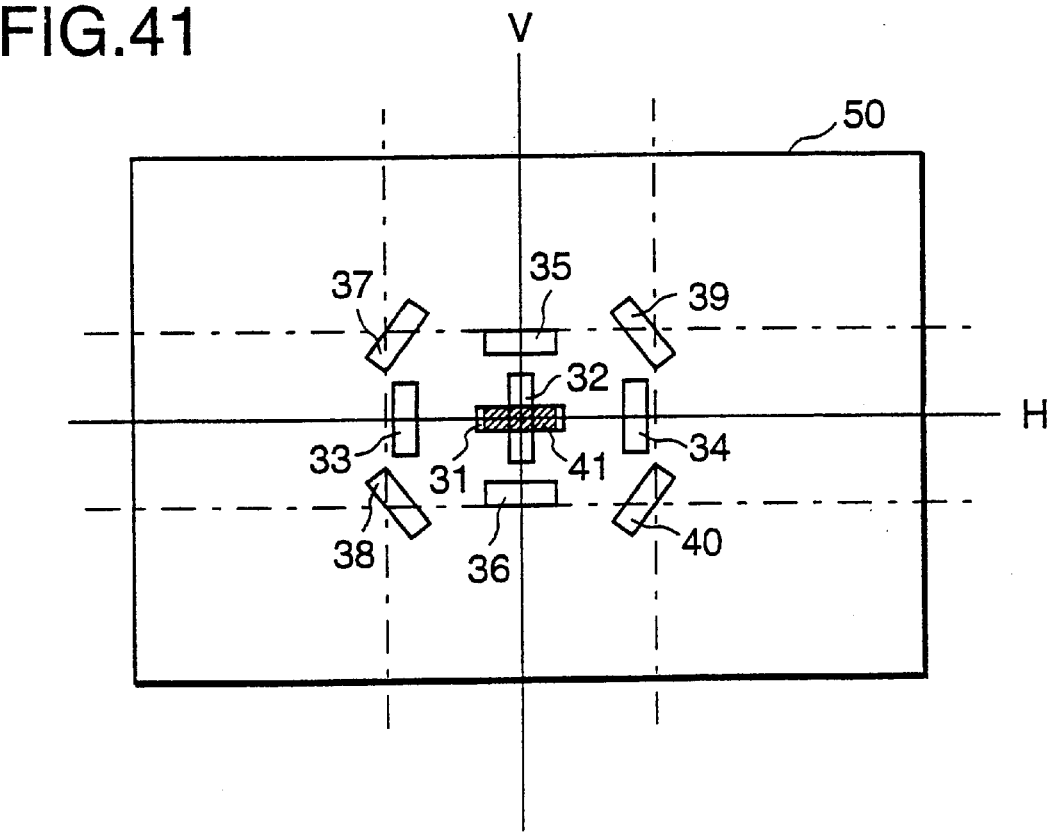
FIG. 41 is a front view for showing an arrangement of focusing areas in the fifteenth modification.

As can be seen from FIG. 41, a focusing area 41 with respect to a second focusing sensor group corresponding to a second predetermined F-number such as F2.8 is superimposed on a focusing area 31 with respect to the first focusing sensor group corresponding to the first predetermined F-number such as F6.7 which is disposed on the lateral line H. In this modification, only one focusing area 41 with respect to the second focusing sensor group is provided.

Focusing areas 31 to 40 are respectively disposed in a region where light flux passing through a pupil of the optical lens system 201 having a first predetermined F-number such as F6.7 can reach. The first focusing sensors corresponding to the focusing areas 33 to 40 included in the first focusing sensor group are used for focusing the optical lens system 201 to objects disposed at positions distant from the center of the frame 50. The first focusing sensors corresponding to the focusing areas 31 to 40 included in the first focusing sensor group are always used without reference to the F-number of the optical lens system 201. The second focusing sensor corresponding to the focusing area 41 included in the second focusing sensor group is used only when the F-number of the optical lens system 201 is equal to or smaller than the second predetermined F-number such as F2.8. As can be seen from FIG. 41, the focusing areas 31 to 40 with respect to the first focusing sensor group and the focusing area 41 with respect to the second focusing sensor group are disposed in the center rectangular region of nine rectangular regions shown by one dotted chain lines which are formed by trisecting the frame 50 in both of the lateral and longitudinal directions.

Figure 42:
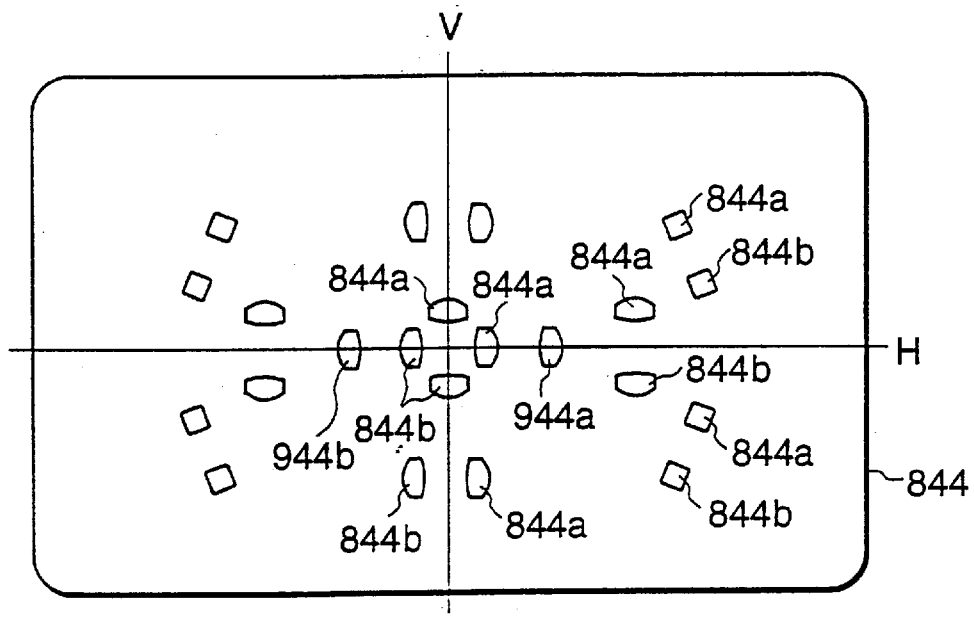
FIGS. 42, 43 and 44 are respectively front views showing the details of an aperture mask, a reforming lens array and a sensor in the fifteenth modification.
Figure 43:
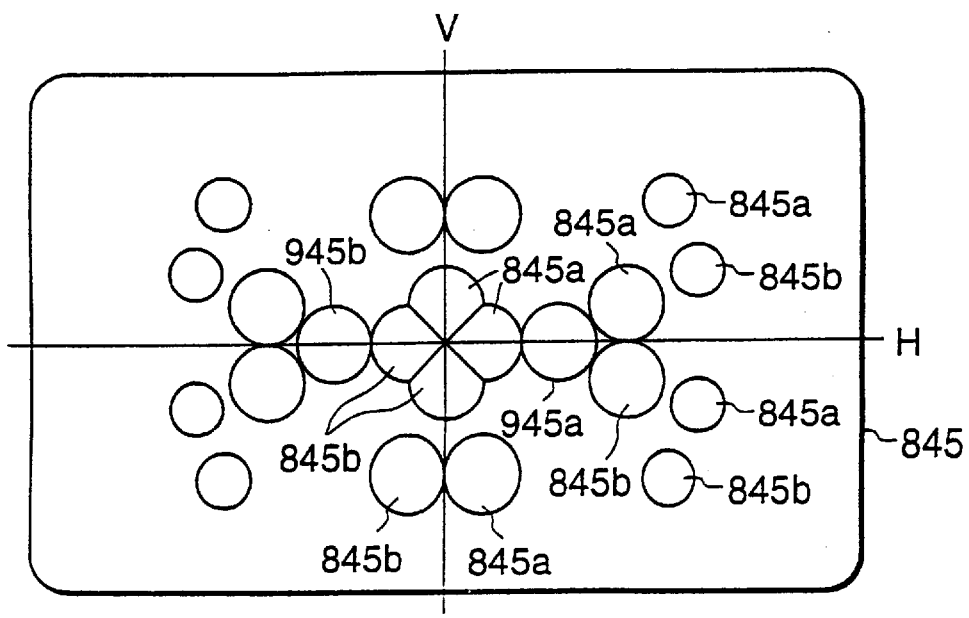
Figure 44:
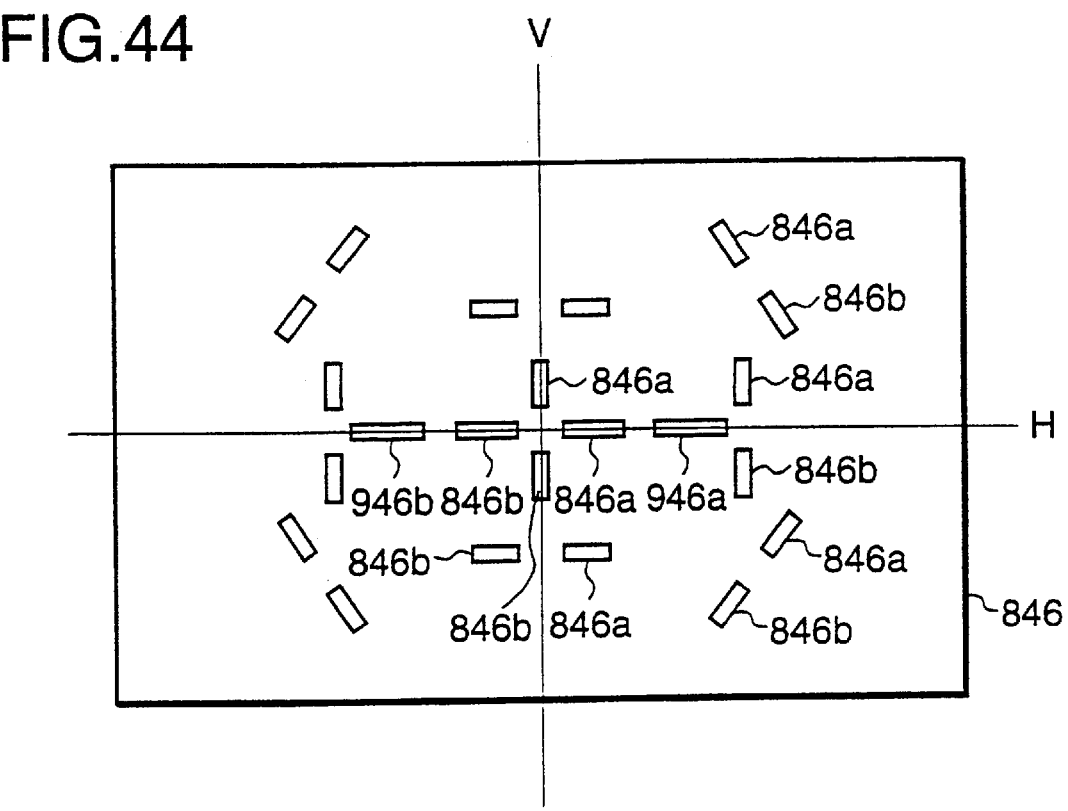

Details of the aperture mask 844, the reforming lens array 845 and the sensor chip 846 are respectively shown in FIGS. 42, 43 and 44. As can be seen from FIG. 44, two pairs of photoelectric transfer device arrays 846a and 846b, 946a and 946d corresponding to the focusing area 31 included in the first focusing sensor group and the focusing area 41 included in the second focusing sensor group are respectively formed on the lateral line H symmetrical with reference to the longitudinal line V on a substrate of the sensor 846. Similarly, each pair of photoelectric transfer device arrays 846a and 846b are disposed corresponding to the focusing areas 32 to 40.

Corresponding to the arrangement of the photoelectric transfer device arrays 846a and 846b, 946a and 946b, openings 844a and 844b, 944a and 944b of the aperture mask 544 and reforming lenses 845a and 845b, 945a and 945b of the reforming lens array 845 are also symmetrically formed with reference to the lateral line H or the longitudinal line V.

Figure 45:
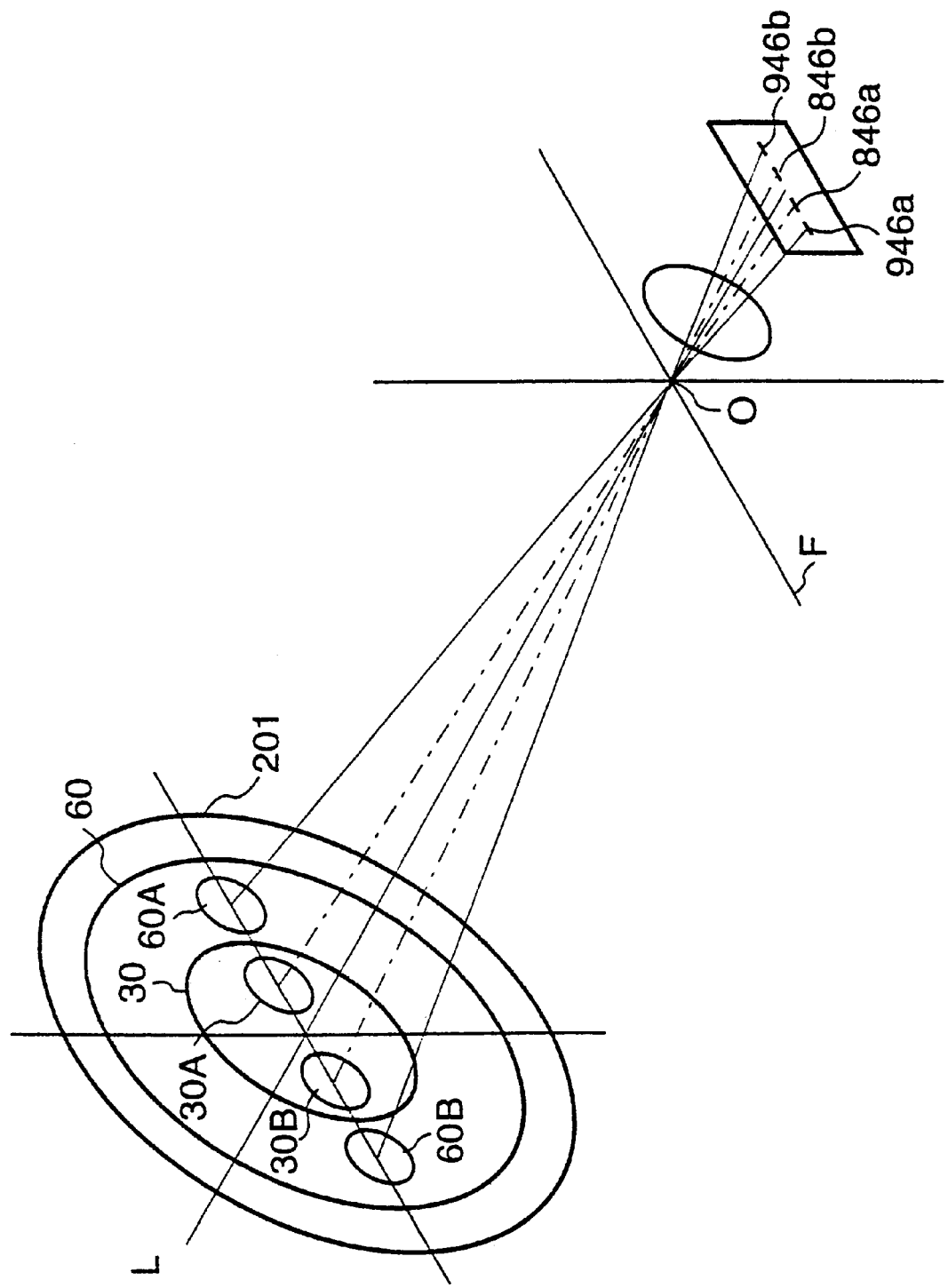
FIG. 45 is a perspective view showing a condition that the light flux passing through the pupil of the optical lens system reach to the sensor in the fifteenth modification.

FIG. 45 shows a condition that such light flux passing through the pupil of the optical lens system 201 reaches the sensor 846. The field mask 841, the mirror 843, the aperture mask 844 and the reforming lens array 845 are not shown in FIG. 45. F designates the equivalent focal plane or film surface in FIG. 45.

Light fluxes 30A and 30B which are emitted at random from an object or a portion of the object in the center portion of the frame and passing through the first circular region 30 of the pupil of the optical lens system 201 move along the optical paths shown by dotted chain lines and reach the photoelectric transfer device arrays 846a and 846b which correspond to the focusing area 31 included in the first focusing sensor group shown in FIG. 41. However, the light flux 30A and 30B cannot reach the photoelectric transfer device arrays 946a to 946d of the second focusing sensor corresponding to the focusing area 41 included in the second focusing sensor group due to the vignetting of the optical lens system 201. Light flux 60A and 60B passing through outside the first circular region 30 and inside the second circular region 60 moves along the optical paths shown by solid lines and reaches the photoelectric transfer device arrays 946a and 946b corresponding to the focusing area 41 included in the second focusing sensor group. The light flux 60A and 60B reaches the photoelectric transfer device arrays 846a and 846b corresponding to the focusing area 31 included in the first focusing sensor group also.

Thus, when the F-number of the optical lens system 201 is larger than the first predetermined F-number such as F2.8, the second focusing sensor corresponding to the focusing area 41 cannot detect the focus of the optical lens system 201. On the other hand, when the F-number of the optical lens system 201 is equal to or smaller than the first predetermined F-number such as F2.8, the second focusing sensor corresponding to the focusing area 41 included in the second focusing sensor group can detect the focus of the optical lens system 201.

As can be seen from FIGS. 41 and 44, the photoelectric transfer device arrays 946a and 946b of the second focusing sensor corresponding to the focusing area 41 included in the second focusing sensor group are respectively disposed at positions farther from the center of the frame than the photoelectric transfer device arrays 846a and 846b of the first focusing sensor corresponding to the focusing area 31 included in the first focusing sensor group. That is, the second focusing sensor corresponding to the focusing area 41 included in the second focusing sensor group has a longer base length and a higher focusing accuracy than those of the first focusing sensor corresponding to the focusing area 31 included in the first focusing sensor group. When the F-number of the optical lens system 201 is equal to or smaller than the second predetermined F-number, at least an object or a portion of an object positioned in the center portion of the frame can be focused by the second focusing sensor corresponding to the focusing area 41 included in the second focusing sensor group having a longer base length, so that the focus detection can be executed in the best manner according to the F-number of the optical lens system 201.

A sixteenth modification of the focus detector 140 is described with reference to FIGS. 46 to 49. Explanation of the elements in common with the above-mentioned fifteenth modification is omitted.

Figure 46:
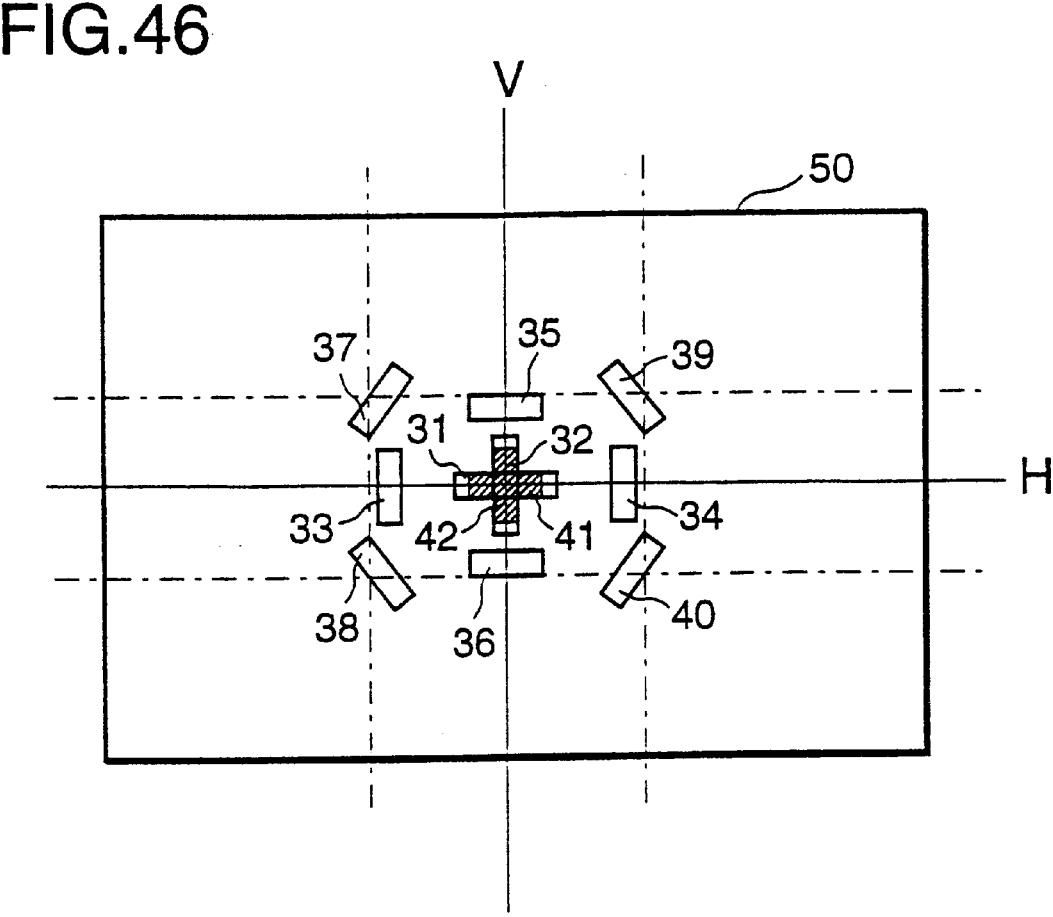
FIG. 46 is a front view for showing an arrangement of focusing areas in a sixteenth modification of the focus detector of the embodiment of this invention.

As can be seen from FIG. 46, a second cross focusing sensor corresponding to the focusing areas 41 and 42 included in the second focusing sensor group (cross-hatched region in the figure) corresponding to a second predetermined F-number such as F2.8 is superimposed on a first cross sensor corresponding to the focusing areas 31 and 32 included in the first focusing sensor group corresponding to the first predetermined F-number such as F6.7 which are respectively disposed on the lateral line H and the longitudinal line V.

Figure 47:
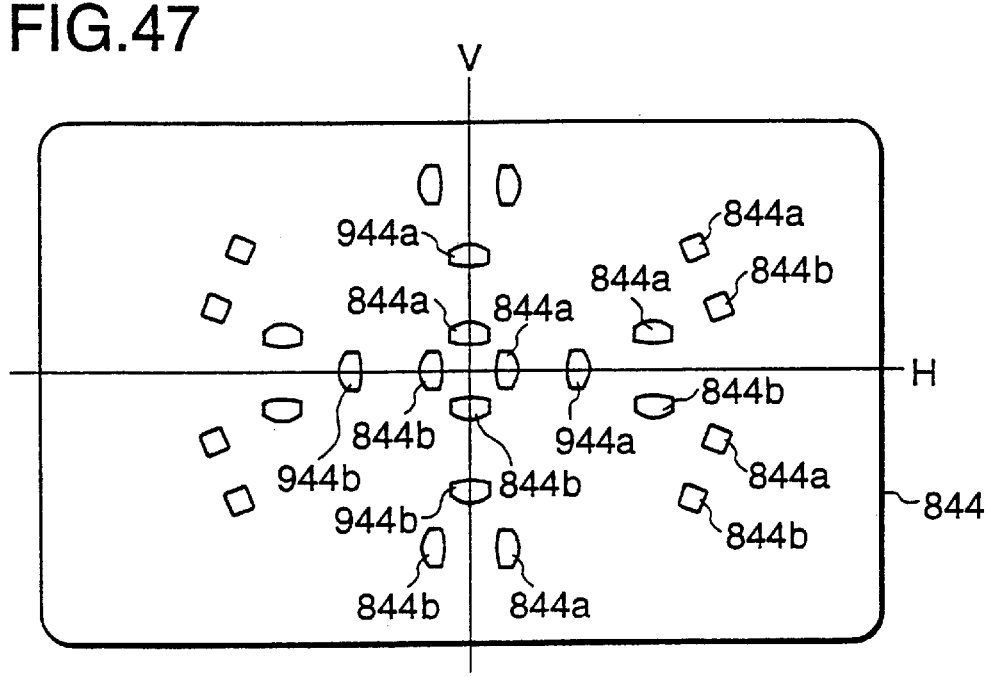
FIGS. 47, 48 and 49 are respectively front views showing the details of an aperture mask, a reforming lens array and a sensor in the sixteenth modification.
Figure 48:
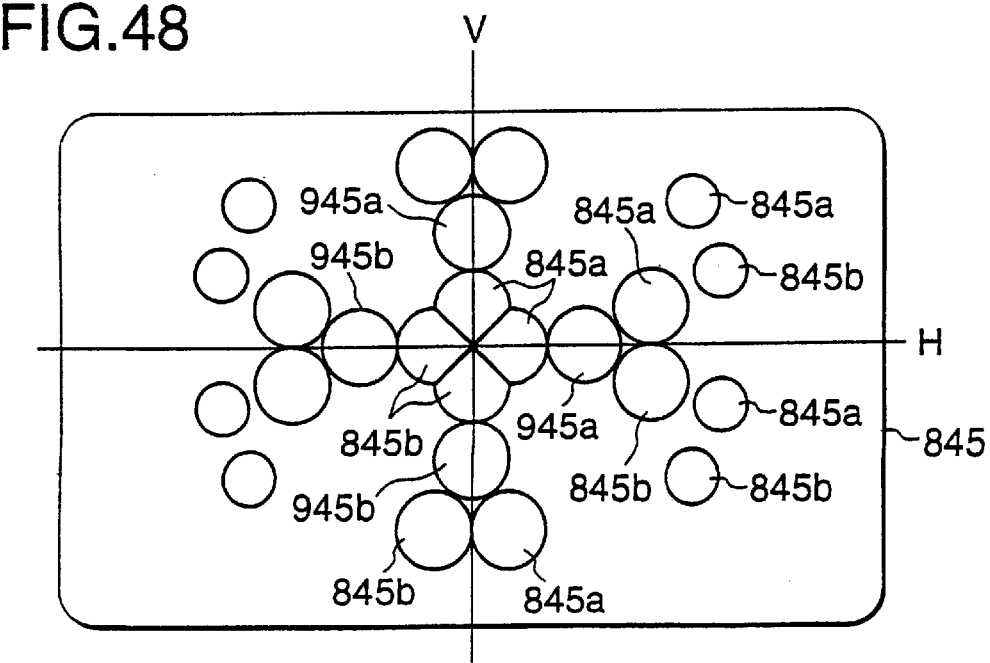
Figure 49:
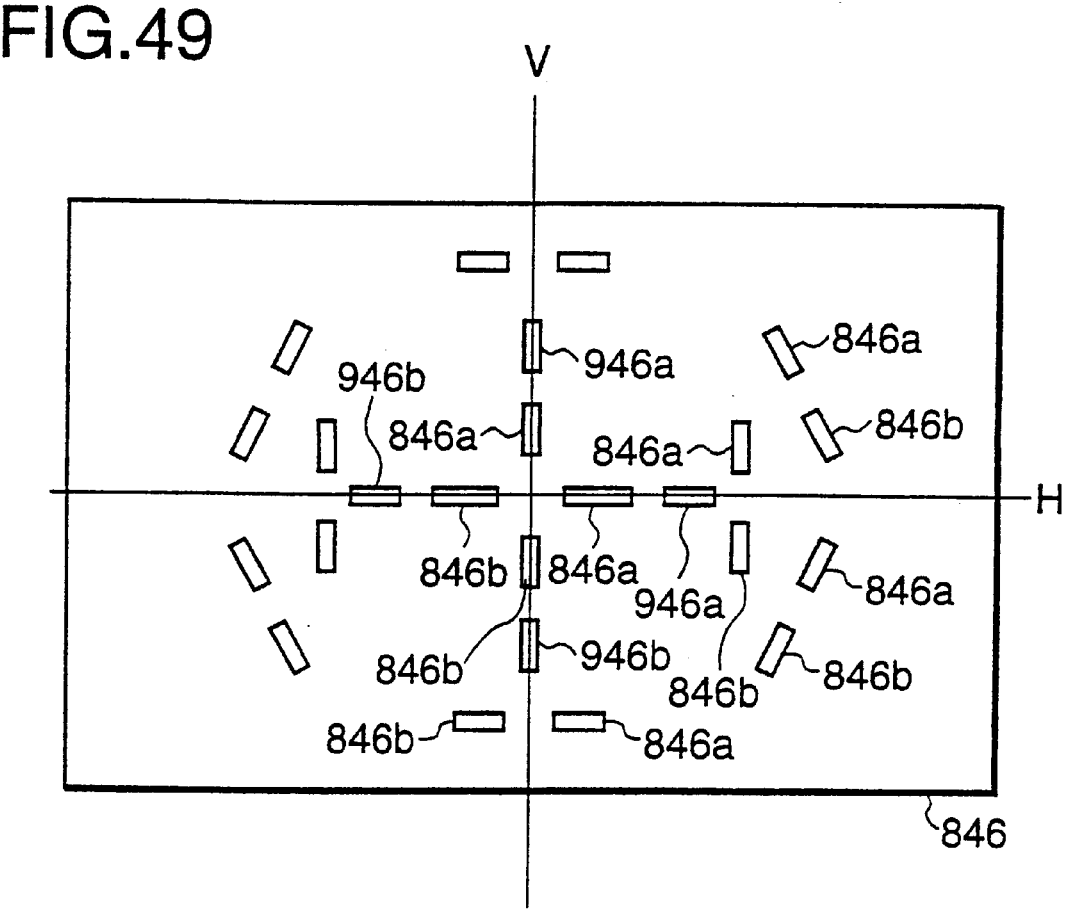

Details of the aperture mask 844, the reforming lens array 845 and the sensor chip 846 are respectively shown in FIGS. 47, 48 and 49. As can be seen from FIG. 49, each pair of photoelectric transfer device arrays 846a and 846b of the first focusing sensors corresponding to the focusing areas 31 to 40 included in the first focusing sensor group are oriented symmetrically with respect to the lateral line H and the longitudinal line V on a substrate of the sensor 846 similar to the above-mentioned fifteenth modification. Two pairs of the photoelectric transfer device arrays 946a and 946b of the focusing sensors corresponding to the focusing areas 41 and 42 are disposed on the lateral line H and the longitudinal line V outside of the photoelectric transfer device arrays 846a and 846b of the first focusing sensors corresponding to the focusing areas 31 and 32.

Corresponding to the arrangement of the photoelectric transfer device arrays 846a and 846b, 946a and 946b, openings 844a and 844b, 944a and 944b of the aperture mask 544 and reforming lenses 845a and 845b, 945a and 945b of the reforming lens array 845 are also symmetrically oriented with reference to the lateral line H or the longitudinal line V.

When the F-number of the optical lens system 201 is equal to or smaller than the second predetermined F-number and the contrasts in the sagittal direction and the meridional direction of the image are different, so focus detection can be executed by using the second focusing sensor corresponding to the focusing area 41 or 42 which outputs a signal with respect to a higher contrast.

With respect to the above-mentioned modifications, the focus detector 140 is used in the AF-SLR camera 100. However, the focus detector 140 can be used in another apparatus such as a video camera, a digital camera, and so on which uses an optical lens system.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A focus detector for detecting a focus of an optical lens system using light flux passing through the optical lens system, comprising:
   a first pair of sensors which is disposed in a first region where light flux passing through an optical lens system having a first predetermined F-number reaches and having a first base length;
   a second pair of sensors which is disposed in a second region where light flux passing through an optical lens system having a second predetermined F-number smaller than the first predetermined F-number reaches and having a second base length longer than the first base length;
   a defocus quantity calculator for calculating first and second quantities of defocus of an optical lens system from output data of the first and second pairs of sensors respectively; and
   a controller for selecting output data of one pair of sensors from the first and second pairs of sensors in accordance with at least one of the first and second quantities of defocus.

2. The focus detector in accordance with claim 1, wherein the first pair of sensors and the second pair of sensors are integrated in a unit.

3. The focus detector in accordance with claim 1, wherein reforming lenses are provided corresponding to each of the first and second pairs of sensors.

4. The focus detector in accordance with claim 1, wherein the second quantity of defocus has a limit value associated with the second base length, and the controller compares the first quantity of defocus with the limit value for selecting output data from one pair of sensors.

5. The focus detector in accordance with claim 4, wherein the controller selects output data from the first pair of sensors when the first quantity of defocus is larger than the limit value.

6. The focus detector in accordance with claim 4, wherein the controller selects output data from the second pair of sensors when the first quantity of defocus is equal to or smaller than the limit value.

7. Optical equipment having a focus detector for detecting a focus of an optical lens system using light flux passing through the optical lens system, comprising:
- a first pair of sensors which is disposed in a first region where light flux passing through an optical lens system having a first predetermined F-number reaches and having a first base length;
- a second pair of sensors which is disposed in a second region where light flux passing through an optical lens system having a second predetermined F-number smaller than the first predetermined F-number reaches and having a second base length longer than the first base length;
- a defocus quantity calculator for calculating first and second quantities of defocus of an optical lens system from output data of the first and second pairs of sensors respectively;
- a contrast calculator for calculating first and second contrast values from output data of the first and second pairs of sensors respectively; and
- a controller for selecting output data of one pair of sensors from the first and second pairs of sensors in accordance with the first and second quantities of defocus and the first and second contrast values.

8. The optical equipment in accordance with claim 7, wherein the first pair of sensors and the second pair of sensors are integrated in a unit.

9. The optical equipment in accordance with claim 7, wherein reforming lenses are provided corresponding to each of the first and second pairs of sensors.

10. The optical equipment in accordance with claim 7, wherein the second quantity of defocus has a limit value associated with the second base length, and the controller selects output data from the second pair of sensors when the second contrast value is larger than a predetermined value and the second quantity of defocus is equal to or smaller than the limit value.

11. The optical equipment in accordance with claim 7, wherein the second quantity of defocus has a limit value associated with the second base length, and the controller compares the first quantity of defocus with the limit value for selecting output data from one pair of sensors.

12. The optical equipment in accordance with claim 11, wherein the controller selects output data from the first pair of sensors when the first quantity of defocus is larger than the limit value.

13. The optical equipment in accordance with claim 11, wherein the controller selects output data from the second pair of sensors when the first quantity of defocus is equal to or smaller than the limit value.

14. The optical equipment of claim 7, wherein the first pair of sensors is separate and distinct from the second pair of sensors.

* * * * *